(12) United States Patent
Kim et al.

(10) Patent No.: US 11,204,412 B2
(45) Date of Patent: Dec. 21, 2021

(54) LIDAR DEVICE

(71) Applicant: SOS LAB Co., Ltd., Gwangju (KR)

(72) Inventors: Dong Kyu Kim, Gwangju (KR); Chan M Lim, Yongin-si (KR); Hoon Il Jeong, Chungcheongnam-do (KR)

(73) Assignee: SOS LAB Co., Ltd., Gwangju (KR)

( * ) Notice: Subject to any disclaimer, the term of this patent is extended or adjusted under 35 U.S.C. 154(b) by 0 days.

(21) Appl. No.: 17/325,854

(22) Filed: May 20, 2021

(65) Prior Publication Data

US 2021/0364603 A1    Nov. 25, 2021

(30) Foreign Application Priority Data

May 22, 2020  (KR) .......................... 10-2020-0061857
Dec. 22, 2020  (KR) .......................... 10-2020-0180406

(51) Int. Cl.
*G01S 7/48* (2006.01)
*G01S 7/481* (2006.01)

(52) U.S. Cl.
CPC .......... *G01S 7/4815* (2013.01); *G01S 7/4816* (2013.01)

(58) Field of Classification Search
None
See application file for complete search history.

(56) References Cited

U.S. PATENT DOCUMENTS

| | | | | |
|---|---|---|---|---|
| 4,830,485 | A | * | 5/1989 | Penney ................. G01S 7/4816 250/227.32 |
| 2010/0008588 | A1 | * | 1/2010 | Feldkhun ........... G01B 11/2527 382/206 |

| | | | | |
|---|---|---|---|---|
| 2015/0131080 | A1 | * | 5/2015 | Retterath ................ G01S 17/93 356/5.01 |
| 2017/0219426 | A1 | * | 8/2017 | Pacala ..................... G01S 7/497 |
| 2019/0018119 | A1 | | 1/2019 | Laifenfeld et al. |

(Continued)

FOREIGN PATENT DOCUMENTS

KR   10-2019-0087615 A    7/2019
KR        10-2083909 B1    3/2020

OTHER PUBLICATIONS

PCT International Search Report and Written Opinion, PCT Application No. PCT/KR2020/018097, dated Mar. 22, 2021, 14 pages.

(Continued)

*Primary Examiner* — Hovhannes Baghdasaryan
(74) *Attorney, Agent, or Firm* — Fenwick & West LLP

(57) ABSTRACT

A LiDAR device comprising: a transmission module including a laser emitting array and a first lens assembly, wherein the laser emitting array is configured to emit a plurality of lasers at a first wavelength and wherein the first lens assembly is configured to steer the plurality of lasers at different angles within a first angle range; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprise: at least four lens layers including a first lens layer, a second lens layer, a third lens layer and a fourth lens layer; at least two gap layers including a first gap layer and a second gap layer; and a filter layer located in the first gap layer.

16 Claims, 49 Drawing Sheets

(56) References Cited

U.S. PATENT DOCUMENTS

2019/0250257 A1 8/2019 Finkelstein et al.
2019/0383926 A1 12/2019 Crouch et al.

OTHER PUBLICATIONS

Vornicu, I. et al., "Compact Real-Time Inter-Frame Histogram Builder for 15-Bits High-Speed ToF-Imagers Based on Single-Photon Detection," IEEE Sensors Journal, Mar. 15, 2019, pp. 2181-2190, vol. 19, No. 6.

* cited by examiner

| Field angle | R1 | R2 | R3 | R4 | R5 |
|---|---|---|---|---|---|
| 0 | 0.00 | 0.89 | 0.89 | 0.89 | 0.89 |
| 3 | 1.43 | 0.37 | 2.25 | 1.68 | 1.68 |
| 6 | 2.85 | 1.68 | 3.60 | 2.96 | 2.96 |
| 9 | 4.25 | 3.01 | 4.92 | 4.30 | 4.30 |
| 12 | 5.64 | 4.34 | 6.22 | 5.64 | 5.64 |
| 15 | 6.99 | 5.66 | 7.48 | 6.96 | 6.96 |
| 18 | 8.31 | 6.94 | 8.70 | 8.23 | 8.23 |
| 21 | 9.58 | 8.18 | 9.86 | 9.46 | 9.46 |
| 24 | 10.79 | 9.36 | 10.97 | 10.62 | 10.62 |
| 27 | 11.94 | 10.45 | 12.01 | 11.70 | 11.70 |
| 30 | 13.00 | 11.45 | 13.00 | 12.67 | 12.67 |
| Max | 13.00 | 11.45 | 13.00 | 12.67 | 12.67 |

(b)

| Field angle | R1 | R2 | R3 | R4 | R5 |
|---|---|---|---|---|---|
| 0 | 0.00 | 27.87 | 27.87 | 27.87 | 27.87 |
| 3 | 0.15 | 26.23 | 27.73 | 27.47 | 27.47 |
| 6 | 0.31 | 24.74 | 27.69 | 27.12 | 27.12 |
| 9 | 0.52 | 23.37 | 27.75 | 26.81 | 26.81 |
| 12 | 0.80 | 22.14 | 27.86 | 26.55 | 26.55 |
| 15 | 1.16 | 21.03 | 28.02 | 26.33 | 26.33 |
| 18 | 1.63 | 20.05 | 28.20 | 26.15 | 26.15 |
| 21 | 2.24 | 19.19 | 28.39 | 26.02 | 26.02 |
| 24 | 3.01 | 18.47 | 28.58 | 25.94 | 25.94 |
| 27 | 3.96 | 17.94 | 28.76 | 25.92 | 25.92 |
| 30 | 5.12 | 18.78 | 28.90 | 25.96 | 25.96 |
| Max | 5.12 | 27.87 | 28.90 | 27.87 | 27.87 |

LIDAR DEVICE

CROSS-REFERENCE TO RELATED APPLICATION

This application claims priority to and the benefit of Korean Patent Application No. 10-2020-0061857, filed on May 22, 2020, Korean Patent Application No. 10-2020-0180406, filed on Dec. 22, 2020, the disclosure of which is incorporated herein by reference in its entirety.

TECHNICAL FIELD

The present disclosure relates to a lens assembly and a light detection and ranging (LiDAR) device including the lens assembly, and more particularly, to a lens assembly including a filter layer and a lens layer, and a LiDAR device using the same.

BACKGROUND

In recent years, light detection and ranging (LiDAR) has been in the spotlight in conjunction with the interest of an autonomous vehicle and an unmanned vehicle. A LiDAR device is a device that obtains ambient distance information using lasers, and is being applied to various fields such as drones and airplanes as well as automobiles due to the advantage of being able to grasp objects in three dimensions with excellent precision and resolution.

Meanwhile, in order to increase a measuring distance and improve accuracy in a LiDAR device, it is important to reduce noise caused by external light obtained by the LiDAR device.

SUMMARY OF THE INVENTION

An aspect of the present disclosure relates to a lens assembly for distributing a plurality of obtained lasers to different detectors while reducing noise caused by external light.

According to an embodiment, a Light Detection And Ranging (LiDAR) device comprises a transmission module including a laser emitting array and a first lens assembly, wherein the laser emitting array is configured to emit a plurality of lasers at a first wavelength and wherein the first lens assembly is configured to steer the plurality of lasers at different angles within a first angle range; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprises: at least four lens layers including a first lens layer, a second lens layer, a third lens layer and a fourth lens layer; at least two gap layers including a first gap layer and a second gap layer; and a filter layer located in the first gap layer; wherein the second lens assembly is designed so that an angle at which at least a portion of a plurality of light rays of a plurality of parallel lights incident on the second lens assembly within the first angle range is incident to a cross section of the first gap layer is (0) to (a) degree, wherein the second lens assembly is designed so that an angle at which at least a portion of a plurality of light rays of a plurality of parallel lights incident on the second lens assembly within the first angle range is incident to a cross section of the second gap layer is (0) to (b) degree, wherein the (a) degree is smaller than the (b) degree, wherein the filter layer is designed to have a first central wavelength for a light incident on the filter layer at the (0) degree, a second central wavelength for a light incident on the filter layer at the (a) degree, and a third central wavelength for a light incident on the filter layer at the (b) degree, wherein the filter layer is designed to have a bandwidth of at least (the first central wavelength–the second central wavelength) nm, wherein the first wavelength is designed to be smaller than the first central wavelength but greater than the second central wavelength.

According to another embodiment, a Light Detection And Ranging (LiDAR) device comprises a transmission module including a laser emitting array and a first lens assembly, wherein the laser emitting array is configured to emit a plurality of lasers and wherein the first lens assembly is configured to steer the plurality of lasers at different angles; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprises: a reception lens layer including at least two of lens layer; and a filter layer located between the at least two of lens layer; wherein the second lens assembly is designed so that a central wavelength of a first transmission band for light incident to an entrance pupil of the second lens assembly at an angle of 30 degrees is shifted by 15 nm or less from a central wavelength of a second transmission band for light incident to the entrance pupil at an angle of 0 degrees.

According to another embodiment, a Light Detection And Ranging (LiDAR) device comprises a transmission module including a laser emitting array and a first lens assembly, wherein the laser emitting array is configured to emit a plurality of lasers and wherein the first lens assembly is configured to steer the plurality of lasers at different angles; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprises: a reception lens layer including at least two of lens layer; and a filter layer located between the at least two of lens layer; wherein the second lens assembly is designed so that light incident to an entrance pupil of the second lens assembly at an angle of 20 degrees is received by the first detector, wherein the second lens assembly is designed so that light incident to the entrance pupil at an angle of 0 degrees is received by the second detector, wherein the first detector receives light in a first wavelength band including a first wavelength, and the second detector receives light in a second wavelength band including a second wavelength, wherein the first wavelength is not included in the second wavelength band, and the second wavelength is not included in the first wavelength band, wherein the first wavelength is shifted to 10 nm or less from the second wavelength.

According to an embodiment of the present invention, a lens assembly for distributing a plurality of lasers to different detectors and reducing noise caused by external light may be provided.

According to an embodiment of the present invention, a lidar device including a lens assembly for distributing a plurality of lasers to different detectors and reducing noise caused by external light may be provided.

Solutions of the present disclosure are not limited to the above-mentioned solutions, and solutions that have not been mentioned will be clearly understood by those skilled in the art from the following description and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 42 is a diagram for describing incident angles of light rays of parallel light incident on a lens assembly according to one embodiment;

DETAILED DESCRIPTION OF EXEMPLARY EMBODIMENTS

Figure 1:
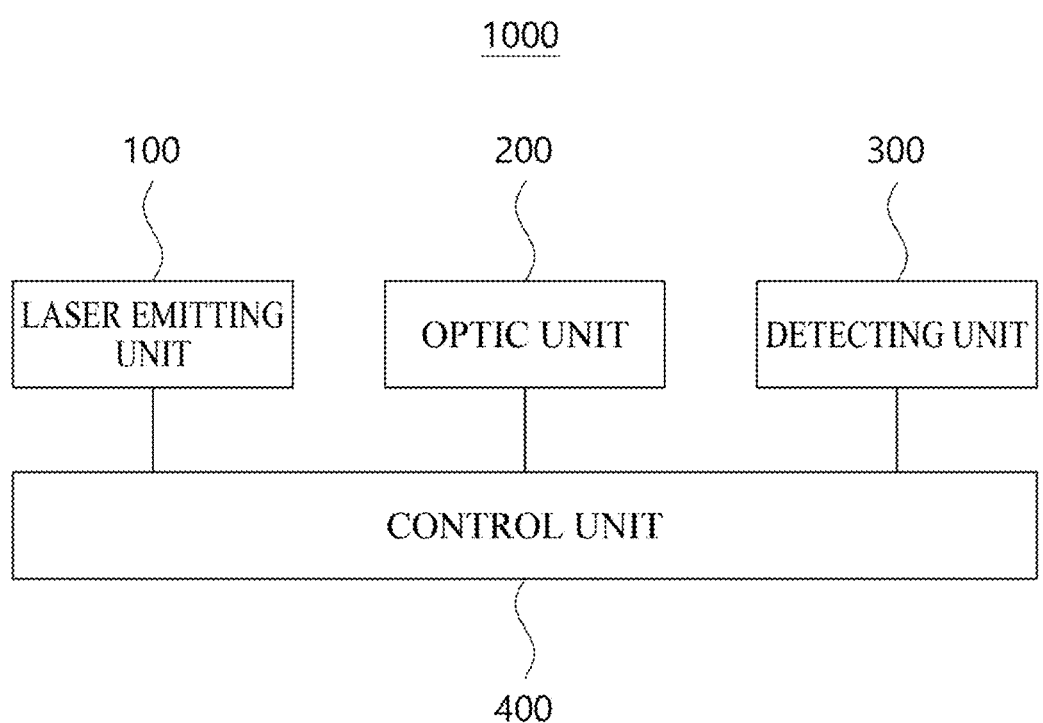
FIG. 1 is a diagram for describing a light detection and ranging (LiDAR) device according to one embodiment.

Embodiments described in this specification are intended to clearly explain the spirit of the invention to those skilled in the art. Therefore, the present disclosure is not limited by the embodiments, and the scope of the present disclosure should be interpreted as encompassing modifications and variations without departing from the spirit of the invention.

Terms used in this specification are selected from among general terms, which are currently widely used, in consideration of functions in the present disclosure and may have meanings varying depending on intentions of those skilled in the art, customs in the field of art, the emergence of new technologies, or the like. If a specific term is used with a specific meaning, the meaning of the term will be described specifically. Accordingly, the terms used in this specification should not be defined as simple names of the components but be defined based on the actual meaning of the terms and the whole context throughout the present specification.

The accompanying drawings are to facilitate the explanation of the present disclosure, and the shape in the drawings may be exaggerated for the purpose of convenience of explanation, so the present disclosure should not be limited by the drawings.

When it is determined that detailed descriptions of well-known elements or functions related to the present disclosure may obscure the subject matter of the present disclosure, detailed descriptions thereof will be omitted herein as necessary.

According to an embodiment, there is provided A Light Detection And Ranging (LiDAR) device comprising: a transmission module including a laser emitting array and a first lens assembly, wherein the laser emitting array is configured to emit a plurality of lasers at a first wavelength and wherein the first lens assembly is configured to steer the plurality of lasers at different angles within a first angle range; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprises: at least four lens layers including a first lens layer, a second lens layer, a third lens layer and a fourth lens layer; at least two gap layers including a first gap layer and a second gap layer; and a filter layer located in the first gap layer; wherein the second lens assembly is designed so that an angle at which at least a portion of a plurality of light rays of a plurality of parallel lights incident on the second lens assembly within the first angle range is incident to a cross section of the first gap layer is (0) to (a) degree, wherein the second lens assembly is designed so that an angle at which at least a portion of a plurality of light rays of a plurality of parallel lights incident on the second lens assembly within the first angle range is incident to a cross section of the second gap layer is (0) to (b) degree, wherein the (a) degree is smaller than the (b) degree, wherein the filter layer is designed to have a first central wavelength for a light incident on the filter layer at the (0) degree, a second central wavelength for a light incident on the filter layer at the (a) degree, and a third central wavelength for a light incident on the filter layer at the (b) degree, wherein the filter layer is designed to have a bandwidth of at least (the first central wavelength–the second central wavelength) nm, wherein the first wavelength is designed to be smaller than the first central wavelength but greater than the second central wavelength.

Here, the first wavelength is designed to be greater than (the third central wavelength+the bandwidth/2) nm.

Here, the bandwidth is designed to be at least ((the first central wavelength–the first wavelength)*2) nm.

Here, the bandwidth is designed to be at least ((the first central wavelength–the first wavelength)*2) nm or less.

Here, the bandwidth is designed to be at least ((the first central wavelength–the first wavelength)*2) nm or more.

Here, the filter layer is designed so that a transmission band for the light incident on the filter layer at the (0) degree overlaps a transmission band for the light incident on the filter layer at the (a) degree.

Here, the filter layer is designed so that a transmission band for the light incident on the filter layer at the (0) degree does not overlap a transmission band for the light incident on the filter layer at the (a) degree.

Here, the filter layer is designed so that a transmission band for the light incident on the filter layer at the (0) degree and a transmission band for the light incident on the filter layer at the (a) degree share at least one wavelength band.

Here, the filter layer is designed so that the transmission band for the light incident on the filter layer at the (0) degree and a transmission band for the light incident on the filter layer at the (b) degree do not share at least one wavelength band.

Here, the number of lens layers included in each of the first lens assembly and the second lens assembly is the same.

Here, wherein a first laser emitted from a first laser emitting unit included in the laser emitting array is irradiated in a first direction through the first lens assembly, wherein the first laser is received by a first detector included in the laser detecting array through the second lens assembly, wherein a second laser emitted from a second laser emitting unit included in the laser emitting array is irradiated in a second direction through the first lens assembly, wherein the second laser is received by a second detector included in the laser detecting array through the second lens assembly.

Here, a wavelength band of ambient light received by the first detector is different from a wavelength band of ambient light received by the second detector.

According to another embodiment, there is provided A Light Detection And Ranging (LiDAR) device comprising: a transmission module including a laser emitting array and a first lens assembly, wherein the laser emitting array is configured to emit a plurality of lasers and wherein the first lens assembly is configured to steer the plurality of lasers at different angles; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprises: a reception lens layer including at least two of lens layer; and a filter layer located between the at least two of lens layer; wherein the second lens assembly is designed so that a central wavelength of a first transmission band for light incident to an entrance pupil of the second lens assembly at an angle of 30 degrees is shifted by 15 nm or less from a central wavelength of a second transmission band for light incident to the entrance pupil at an angle of 0 degrees.

Here, the number of the reception lens layer is equal to the number of a transmission lens layer included in the first lens assembly.

Here, wherein a first laser emitted from a first laser emitting unit included in the laser emitting array is irradiated in a first direction through the first lens assembly, wherein the first laser is received by a first detector included in the laser detecting array through the second lens assembly, wherein a second laser emitted from a second laser emitting unit included in the laser emitting array is irradiated in a second direction through the first lens assembly, wherein the second laser is received by a second detector included in the laser detecting array through the second lens assembly.

According to another embodiment, there is provided A Light Detection And Ranging (LiDAR) device comprising: a transmission module including a laser emitting array and a first lens assembly, wherein the laser emitting array is configured to emit a plurality of lasers and wherein the first lens assembly is configured to steer the plurality of lasers at different angles; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprises: a reception lens layer including at least two of lens layer; and a filter layer located between the at least two of lens layer; wherein the second lens assembly is designed so that light incident to an entrance pupil of the second lens assembly at an angle of 20 degrees is received by the first detector, wherein the second lens assembly is designed so that light incident to the entrance pupil at an angle of 0 degrees is received by the second detector, wherein the first detector receives light in a first wavelength band including a first wavelength, and the second detector receives light in a second wavelength band including a second wavelength, wherein the first wavelength is not included in the second wavelength band, and the second wavelength is not included in the first wavelength band, wherein the first wavelength is shifted to 10 nm or less from the second wavelength.

Hereinafter, a LiDAR device of the present disclosure will be described. A LiDAR device is a device for detecting a distance to an object and the location of an object using a laser. For example, a LiDAR device may emit a laser beam. When the emitted laser beam is reflected by an object, the LiDAR device may receive the reflected laser beam and measure a distance between the object and the LiDAR device and the location of the object. In this case, the distance from the object and the location of the object may be expressed in a coordination system. For example, the distance from the object and the location of the object may be expressed in a spherical coordinate system (r, θ, φ). However, the present disclosure is not limited thereto, and the distance and location may be expressed in a Cartesian coordinate system (X, Y, Z) or a cylindrical coordinate system (r, θ, z).

Also, the LiDAR device may use laser beams output from the LiDAR device and reflected by an object in order to measure a distance from the object.

The LiDAR device according to an embodiment may use a time of flight (TOF) of a laser beam, which is the time taken by a laser beam to be detected after being emitted, in order to measure the distance from the object. For example, the LiDAR device may measure the distance from the object using a difference between a time value based on an emitting time of an emitted laser beam and a time value based on a detection time of a detected laser beam reflected by the object.

Also, the LiDAR device may measure the distance from the object using a difference between a time value at which an emitted laser beam is detected immediately without reaching an object and a time value based on a detection time of a detected laser beam reflected by the object.

There may be a difference between a time point at which the LiDAR device transmits a trigger signal for emitting a laser beam using a control unit and an actual emission time point, which is a time when the laser beam is actually emitted from a laser beam output element. Actually, no laser beam is emitted in a period between the time point of the trigger signal and the actual emission time point. Thus, when the period is included in the ToF of the laser beam, precision may be decreased.

The actual emission time point of the laser beam may be used to improve the precision of the measurement of the TOF of the laser beam. However, it may be difficult to determine the actual emission time point of the laser beam. Therefore, a laser beam should be directly delivered to a detecting unit as soon as or immediately after the laser beam is emitted from the laser emitting element without reaching the object.

For example, an optic may be disposed on an upper portion of the laser emitting element, and thus the optic may enable a laser beam emitted from the laser emitting element to be detected by a detecting unit immediately without reaching an object. The optic may be a mirror, a lens, a prism, a metasurface, or the like, but the present disclosure is not limited thereto. The optic may include one optic or a plurality of optics.

Also, for example, a detecting unit may be disposed on an upper portion of the laser emitting element, and thus a laser beam emitted from the laser emitting element may be detected by the detecting unit immediately without reaching an object. The detecting unit may be spaced a distance of 1 mm, 1 μm, 1 nm, or the like from the laser emitting element, but the present disclosure is not limited thereto. Alternatively, the detecting unit may be adjacent to the laser emitting element with no interval therebetween. An optic may be present between the detecting unit and the laser emitting element, but the present disclosure is not limited thereto.

Also, the LiDAR device according to an embodiment may use a triangulation method, an interferometry method, a phase shift measurement, and the like rather than the TOF method to measure a distance to an object, but the present disclosure is not limited thereto.

A LiDAR device according to an embodiment may be installed in a vehicle. For example, the LiDAR device may be installed on a vehicle's roof, hood, headlamp, bumper, or the like.

Also, a plurality of LiDAR devices according to an embodiment may be installed in a vehicle. For example, when two LiDAR devices are installed on a vehicle's roof, one LiDAR device is for monitoring an area in front of the vehicle, and the other one is for monitoring an area behind the vehicle, but the present disclosure is not limited thereto. Also, for example, when two LiDAR devices are installed on a vehicle's roof, one LiDAR device is for monitoring an area to the left of the vehicle, and the other one is for monitoring an area to the right of the vehicle, but the present disclosure is not limited thereto.

Also, the LiDAR device according to an embodiment may be installed in a vehicle. For example, when the LiDAR device is installed in a vehicle, the LiDAR device is for recognizing a driver's gesture while driving, but the present disclosure is not limited thereto. Also, for example, when the LiDAR device is installed inside or outside a vehicle, the LiDAR device is for recognizing a driver's face, but the present disclosure is not limited thereto.

A LiDAR device according to an embodiment may be installed in an unmanned aerial vehicle. For example, the LiDAR device may be installed in an unmanned aerial vehicle (UAV) System, a drone, a remotely piloted vehicle (RPV), an unmanned aircraft system (UAS), a remotely piloted air/aerial vehicle (RPAV), a remotely piloted aircraft system (RPAS), or the like.

Also, a plurality of LiDAR devices according to an embodiment may be installed in an unmanned aerial vehicle. For example, when two LiDAR devices are installed in an unmanned aerial vehicle, one LiDAR device is for monitoring an area in front of the unmanned aerial vehicle, and the other one is for monitoring an area behind the unmanned aerial vehicle, but the present disclosure is not limited thereto. Also, for example, when two LiDAR devices are installed in an unmanned aerial vehicle, one LiDAR device is for monitoring an area to the left of the aerial vehicle, and the other one is for monitoring an area to the right of the aerial vehicle, but the present disclosure is not limited thereto.

A LiDAR device according to an embodiment may be installed in a robot. For example, the LiDAR device may be installed in a personal robot, a professional robot, a public service robot, or other industrial robots or manufacturing robots.

Also, a plurality of LiDAR devices according to an embodiment may be installed in a robot. For example, when two LiDAR devices are installed in a robot, one LiDAR device is for monitoring an area in front of the robot, and the other one is for monitoring an area behind the robot, but the present disclosure is not limited thereto. Also, for example, when two LiDAR devices are installed in a robot, one LiDAR device is for monitoring an area to the left of the robot, and the other one is for monitoring an area to the right of the robot, but the present disclosure is not limited thereto.

Also, a LiDAR device according to an embodiment may be installed in a robot. For example, when the LiDAR device is installed in a robot, the LiDAR device is for recognizing a human face, but the present disclosure is not limited thereto.

Also, a LiDAR device according to an embodiment may be installed for industrial security. For example, the LiDAR device may be installed in a smart factory for the purpose of industrial security.

Also, a plurality of LiDAR devices according to an embodiment may be installed in a smart factory for the purpose of industrial security. For example, when two LiDAR devices are installed in a smart factory, one LiDAR device is for monitoring an area in front of the smart factory, and the other one is for monitoring an area behind the smart factory, but the present disclosure is not limited thereto. Also, for example, when two LiDAR devices are installed in a smart factory, one LiDAR device is for monitoring an area to the left of the smart factory, and the other one is for monitoring an area to the right of the smart factory, but the present disclosure is not limited thereto.

Also, a LiDAR device according to an embodiment may be installed for industrial security. For example, when the LiDAR device is installed for industrial security, the LiDAR device is for recognizing a human face, but the present disclosure is not limited thereto.

Various embodiments of elements of the LiDAR device will be described in detail below.

FIG. 1 is a diagram illustrating a LiDAR device according to an embodiment.

Referring to FIG. 1, a LiDAR device 1000 according to an embodiment may include a laser emitting unit 100.

In this case, the laser emitting unit 100 according to an embodiment may emit a laser beam.

Also, the laser emitting unit 100 may include one or more laser emitting elements. For example, the laser emitting unit 100 may include a single laser emitting element and may include a plurality of laser emitting elements. Also, when the laser emitting unit 100 includes a plurality of laser emitting elements, the plurality of laser emitting elements may constitute one array.

Also, the laser emitting unit 100 may include a laser diode (LD), a solid-state laser, a high power laser, a light-emitting diode (LED), a vertical-cavity surface-emitting laser (VC-SEL), an external cavity diode laser (ECDL), and the like, but the present disclosure is not limited thereto.

Also, the laser emitting unit 100 may output a laser beam of a certain wavelength. For example, the laser emitting unit 100 may output a laser beam with a wavelength of 905 nm or a laser beam with a wavelength of 1550 nm. Also, for example, the laser emitting unit 100 may output a laser beam with a wavelength of 940 nm. Also, for example, the laser emitting unit 100 may output a laser beam with a plurality of wavelengths ranging between 800 nm and 1000 nm. Also, when the laser emitting unit 100 includes a plurality of laser emitting elements, some of the plurality of laser emitting elements may output a laser beam with a wavelength of 905 nm, and the others may output a laser beam with a wavelength of 1500 nm.

Referring to FIG. 1 again, the LiDAR device 1000 according to an embodiment may include an optic unit 200.

Herein, the optic unit may be variously expressed as a steering unit, a scanning unit, etc., but the present disclosure is not limited thereto.

In this case, the optic unit 200 according to an embodiment may change a flight path of a laser beam. For example, the optic unit 200 may change a flight path of a laser beam such that a laser beam emitted from the laser emitting unit 100 is directed to a scanning region. Also, for example, the optic unit 200 may change a flight path of laser beam such that a laser beam reflected by an object located in the scanning region is directed to a detecting unit.

In this case, the optic unit 200 according to an embodiment may change a flight path of laser beam by reflecting a laser beam. For example, the optic unit 200 may change flight path of a laser beam by reflecting a laser beam emitted from the laser emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to reflect laser beams. For example, the optic unit 200 may include a mirror, a resonance scanner, a micro-electromechanical system (MEMS) mirror, a voice coil motor (VCM), a polygonal mirror, a rotating mirror, or a galvano mirror, and the like, but the present disclosure is not limited thereto.

Also, the optic unit 200 according to an embodiment may change a flight path of laser beam by refracting laser beams. For example, the optic unit 200 may change a flight path of laser beam by refracting a laser beam emitted from the laser emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to refract laser beams. For example, the optic unit 200 may include lenses, prisms, microlenses, or microfluidic lenses, but the present disclosure is not limited thereto.

Also, the optic unit 200 according to an embodiment may change a flight path of laser beam by changing the phase of a laser beam. For example, the optic unit 200 may change a flight path of laser beam by changing the phase of a laser beam emitted from the laser emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to change the phase of a laser beam. For example, the optic unit 200 may include an optical phased array (OPA), a metalens, a metasurface, or the like, but the present disclosure is not limited thereto.

Also, the optic unit 200 according to an embodiment may include one or more optic means. Also, for example, the optic unit 200 may include a plurality of optic means.

Referring to FIG. 1 again, the LiDAR device 1000 according to an embodiment may include a detecting unit 300.

Herein, the detecting unit may be variously expressed as a light receiving unit, a sensor unit, etc., but the present disclosure is not limited thereto.

In this case, the detecting unit 300 according to an embodiment may detect laser beams. For example, the detecting unit may detect a laser beam reflected by an object located in the scanning region.

Also, the detecting unit 300 according to an embodiment may receive a laser beam and generate an electric signal based on the received laser beam. For example, the detecting unit 300 may detect a laser beam reflected by an object located in the scanning region and generate an electric signal based on the received laser beam. Also, for example, the detecting unit 300 may receive a laser beam reflected by an object located in the scanning region through one or more optical means and generate an electric signal based on the received laser beam. Also, for example, the detecting unit 300 may receive a laser beam reflected by an object located in the scanning region through an optical filter and generate an electric signal based on the received laser beam.

Also, the detecting unit 300 according to an embodiment may detect the laser beam based on the generated electric signal. For example, the detecting unit 300 may detect the laser beam by comparing the magnitude of the generated electric signal to a predetermined threshold, but the present disclosure is not limited thereto. Also, for example, the detecting unit 300 may detect the laser beam by comparing the rising edge, falling edge, or the median of the rising edge and the falling edge of the generated electric signal to a predetermined threshold, but the present disclosure is not limited thereto. Also, for example, the detecting unit 300 may detect the laser beam by comparing the peak value of the generated electric signal to a predetermined threshold, but the present disclosure is not limited thereto.

Also, the detecting unit 300 according to an embodiment may include various detecting elements. For example, the detecting unit 300 may include a PN photodiode, a phototransistor, a PIN photodiode, an avalanche photodiode (APD), a single-photon avalanche diode (SPAD), silicon photomultipliers (SiPM), a time-to-digital converter (TDC), a comparator, a complementary metal-oxide-semiconductor (CMOS), a charge-coupled device (CCD), or the like, but the present disclosure is not limited thereto.

For example, the detecting unit 300 may be a two-dimensional (2D) SPAD array, but the present disclosure is not limited thereto. Also, for example, the SPAD array may include a plurality of SPAD units, and each SPAD unit may include a plurality of SPAD pixels.

In this case, the detecting unit 300 may generate a histogram by accumulating a plurality of data sets based on output signals of the detecting elements N times using the 2D SPAD array. For example, the detecting unit 300 may use the histogram to detect a reception time point of a laser beam that is reflected by an object and received.

For example, the detecting unit 300 may use the histogram to determine the peak time point of the histogram as the reception time point at which the laser beam reflected by the object is received, but the present disclosure is not limited thereto. Also, for example, the detecting unit 300 may use the histogram to determine a time point at which the histogram is greater than or equal to a predetermined value as the reception time point at which the laser beam reflected by the object is received, but the present disclosure is not limited thereto.

Also, the detecting unit 300 according to an embodiment may include one or more detecting elements. For example, the detecting unit 300 may include a single detecting element and may also include a plurality of detecting elements.

Also, the detecting unit 300 according to an embodiment may include one or more optical elements. For example, the detecting unit 300 may include an aperture, a microlens, a converging lens, a diffuser, or the like, but the present disclosure is not limited thereto.

Also, the detecting unit 300 according to an embodiment may include one or more optical filters. The detecting unit 300 may detect a laser beam reflected by an object through an optical filter. For example, the detecting unit 300 may include a band-pass filter, a dichroic filter, a guided-mode resonance filter, a polarizer, a wedge filter, or the like, but the present disclosure is not limited thereto.

Referring to FIG. 1 again, the LiDAR device 1000 according to an embodiment may include a processor 400.

Herein, the processor may be variously expressed as a processor or the like, but the present disclosure is not limited thereto.

In this case, the processor 400 according to an embodiment may control the operation of the laser emitting unit 100, the optic unit 200, or the detecting unit 300.

Also, the processor 400 according to an embodiment may control the operation of the laser emitting unit 100.

For example, the processor 400 may control an emission time point of a laser emitting from the laser emitting unit 100. Also, the processor 400 may control the power of the laser emitting from the laser emitting unit 100. Also, the processor 400 may control the pulse width of the laser emitting from the laser emitting unit 100. Also, the processor 400 may control the cycle of the laser emitting from the laser emitting unit 100. Also, when the laser emitting unit 100 includes a plurality of laser emitting elements, the processor 400 may control the laser emitting unit 100 to operate some of the plurality of laser emitting elements.

Also, the processor 400 according to an embodiment may control the operation of the optic unit 200.

For example, the processor 400 may control the operating speed of the optic unit 200. In detail, the optic unit 200 may control the rotational speed of a rotating mirror when including the rotating mirror and may control the repetition cycle of a MEMS mirror when including the MEMS mirror, but the present disclosure is not limited thereto.

Also, for example, the processor 400 may control the operation status of the optic unit 200. In detail, the optic unit 200 may control the operation angle of a MEMS mirror when including the MEMS mirror, but the present disclosure is not limited thereto.

Also, the processor 400 according to an embodiment may control the operation of the detecting unit 300.

For example, the processor 400 may control the sensitivity of the detecting unit 300. In detail, the processor 400 may control the sensitivity of the detecting unit 300 by adjusting a predetermined threshold, but the present disclosure is not limited thereto.

Also, for example, the processor 400 may control the operation of the detecting unit 300. In detail, the processor 400 may control the turn-on and -off of the detecting unit 300, and when including a plurality of detecting elements, the processor 400 may control the operation of the detecting unit 300 to operate some of the plurality of detecting elements.

Also, the processor 400 according to an embodiment may determine a distance from the LiDAR device 1000 to an object located in a scanning region based on a laser beam detected by the detecting unit 300.

For example, the processor 400 may determine the distance to the object located in the scanning region based on a time point at which the laser beam is emitted from the laser emitting unit 100 and a time point at which the laser beam is detected by the detecting unit 300. Also, for example, the processor 400 may determine the distance to the object located in the scanning region based on a time point at which a laser beam emitted from the laser beam is detected by the detecting unit 300 immediately without reaching the object and a time point at which a laser beam reflected by the object is sensed by the detecting unit 300.

There may be a difference between a time point at which the LiDAR device 1000 transmits a trigger signal for emitting a laser beam using a processor 400 and an actual emission time point, which is a time when the laser beam is actually emitted from a laser emitting element. Actually, no laser beam is emitted in a period between the time point of the trigger signal and the actual emission time point. Thus, when the period is included in the ToF of the laser beam, precision may be decreased.

The actual emission time point of the laser beam may be used to improve the precision of the measurement of the TOF of the laser beam. However, it may be difficult to determine the actual emission time point of the laser beam. Therefore, a laser beam should be detected to the detecting unit 300 as soon as or immediately after the laser beam is emitted from a laser emitting element without reaching an object.

For example, an optic may be disposed on an upper portion of the laser emitting element, and thus the optic may enable a laser beam emitted from the laser emitting element to be detected by the detecting unit 300 directly without reaching an object. The optic may be a mirror, a lens, a prism, a metasurface, or the like, but the present disclosure is not limited thereto. The optic may include one optic or a plurality of optics.

Also, for example, the detecting unit 300 may be disposed on an upper portion of the laser emitting element, and thus a laser beam emitted from the laser emitting element may be detected by the detecting unit 300 directly without reaching an object. The detecting unit 300 may be spaced a distance of 1 mm, 1 μm, 1 nm, or the like from the laser emitting element, but the present disclosure is not limited thereto. Alternatively, the detecting unit 300 may be adjacent to the laser emitting element with no interval therebetween. An optic may be present between the detecting unit 300 and the laser emitting element, but the present disclosure is not limited thereto.

In detail, the laser emitting unit 100 may emit a laser beam, and the processor 400 may acquire a time point at which the laser beam is emitted from the laser emitting unit 100. When the laser beam emitted from the laser emitting unit 100 is reflected by an object located in the scanning region, the detecting unit 300 may detect a laser beam reflected by the object, and the processor 400 may acquire a time point at which the laser beam is detected by the detecting unit 300 and may determine a distance to the object located in the scan region based on the emission time point and the detection time point of the laser beam.

Also, in detail, the laser beam may be emitted from the laser emitting unit 100, and the laser beam emitted from the laser emitting unit 100 may be detected by the detecting unit 300 directly without reaching the object located in the scanning region. In this case, the processor 400 may acquire a time point at which the laser beam is detected without reaching the object. When the laser beam emitted from the laser emitting unit 100 is reflected by the object located in the scanning region, the detecting unit 300 may detect the laser beam reflected by the object, and the processor 400 may acquire the time point at which the laser beam is detected by the detecting unit 300. In this case, the processor 400 may determine the distance to the object located in the scanning region based on the detection time point of the laser beam that does not reach the object and the detection time point of the laser beam that is reflected by the object.

Figure 2:
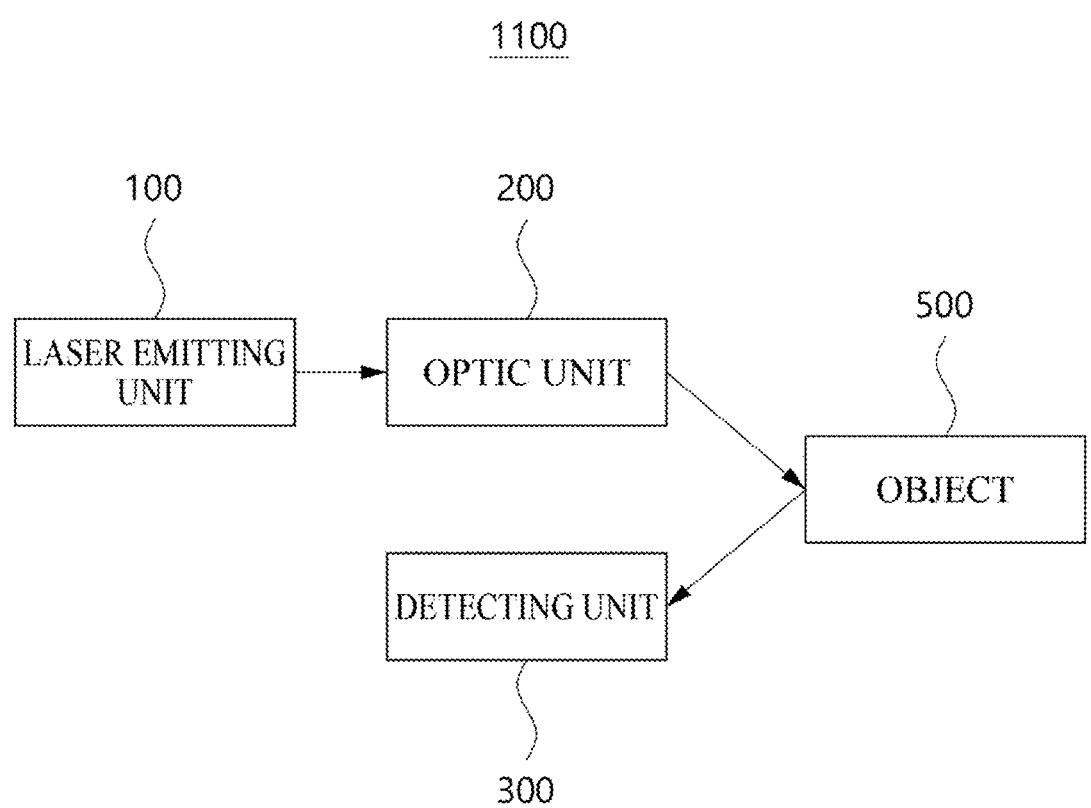
FIG. 2 is a diagram illustrating a LiDAR device according to one embodiment.

FIG. 2 is a diagram showing a LiDAR device according to an embodiment.

Referring to FIG. 2, a LiDAR device 1100 according to an embodiment may include a laser emitting unit 100, an optic unit 200, and a detecting unit 300.

The laser emitting unit 100, the optic unit 200, and the detecting unit 300 have been described with reference to FIG. 1, and thus a detailed description thereof will be omitted.

A laser beam emitted from the laser emitting unit 100 may pass through the optic unit 200. In addition, the laser beam passing through the optic unit 200 may be irradiated toward an object 500. Further, the laser beam reflected from the object 500 may be received by the detecting unit 300.

Figure 3:
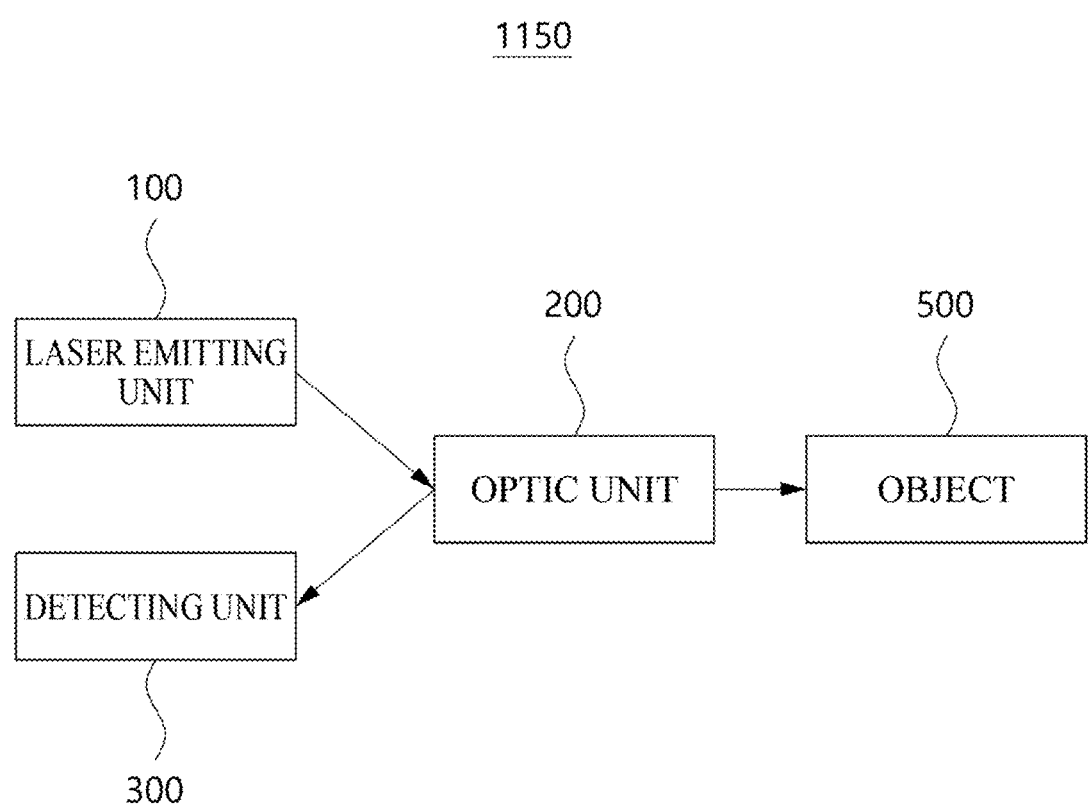
FIG. 3 is a diagram illustrating a LiDAR device according to another embodiment.

FIG. 3 is a diagram illustrating a LiDAR device according to another embodiment.

Referring to FIG. 3, a LiDAR device 1150 according to another embodiment may include a laser emitting unit 100, an optic unit 200, and a detecting unit 300.

The laser emitting unit 100, the optic unit 200, and the detecting unit 300 have been described with reference to FIG. 1, and thus detailed descriptions thereof will be omitted.

A laser beam emitted from the laser emitting unit 100 may pass through the optic unit 200. In addition, the laser beam passing through the optic unit 200 may be irradiated toward an object 500. In addition, the laser beam reflected from the object 500 may pass through the optic unit 200 again.

At this point, the optic unit, through which the laser beam before being irradiated to the object has passed, and the optic unit, through which the laser beam that is reflected from the object has passed, may be physically the same optic unit, but may be physically different optic units.

The laser beam passing through the optic unit 200 may be received by the detecting unit 300.

Hereinafter, various embodiments of a laser emitting unit including a vertical-cavity-surface-emitting laser (VCSEL) will be described in detail.

Figure 4:
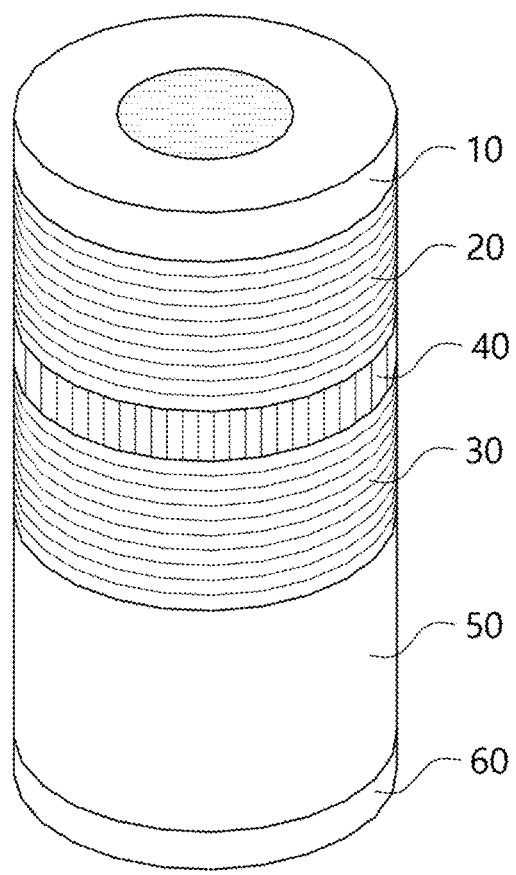
FIG. 4 is a diagram illustrating a laser emitting unit according to one embodiment.

FIG. 4 is a diagram showing a laser beam output unit according to an embodiment.

Referring to FIG. 4, a laser emitting unit 100 according to an embodiment may include a VCSEL emitter 110.

The VCSEL emitter 110 according to an embodiment may include an upper metal contact 10, an upper distributed Bragg reflector (DBR) layer 20, an active layer 40 (quantum well), a lower DBR layer 30, a substrate 50, and a lower metal contact 60.

Also, the VCSEL emitter 110 according to an embodiment may emit a laser beam perpendicularly to an upper surface. For example, the VCSEL emitter 110 may emit a laser beam perpendicularly to the surface of the upper metal contact 10. Also, for example, the VCSEL emitter 110 may emit a laser beam perpendicularly to the active layer 40.

The VCSEL emitter 110 according to an embodiment may include the upper DBR layer 20 and the lower DBR layer 30.

The upper DBR layer 20 and the lower DBR layer 30 according to an embodiment may include a plurality of reflective layers. For example, the plurality of reflective layers may be arranged such that a reflective layer with high reflectance alternates with a reflective layer with low reflectance. In this case, the thickness of the plurality of reflective layers may be a quarter of the wavelength of the laser beam emitted from the VCSEL emitter 110.

Also, the upper DBR layer 20 and the lower DBR layer 30 according to an embodiment may be doped in n-type or p-type. For example, the upper DBR layer 20 may be doped in p-type, and the lower DBR layer 30 may be doped in n-type. Alternatively, for example, the upper DBR layer 20 may be doped in n-type, and the lower DBR layer 30 may be doped in p-type.

Also, according to an embodiment, the substrate 50 may be disposed between the lower DBR layer 30 and the lower metal contact 60. The substrate 50 may be a p-type substrate when the lower DBR layer 30 is doped in p-type, and the substrate 50 may be an n-type substrate when the lower DBR layer 30 is doped in n-type.

The VCSEL emitter 110 according to an embodiment may include the active layer 40.

The active layer 40 according to an embodiment may be disposed between the upper DBR layer 20 and the lower DBR layer 30.

The active layer 40 according to an embodiment may include a plurality of quantum wells that generate laser beams. The active layer 40 may emit laser beams.

The VCSEL emitter 110 according to an embodiment may include a metal contact for electrical connection to a power source or the like. For example, the VCSEL emitter 110 may include the upper metal contact 10 and the lower metal contact 60.

Also, the VCSEL emitter 110 according to an embodiment may be electrically connected to the upper DBR layer 20 and the lower DBR layer 30 through the metal contact.

For example, when the upper DBR layer 20 is doped in p-type and the lower DBR layer 30 is doped in n-type, p-type power may be supplied to the upper metal contact 10 to electrically connect the VCSEL emitter 110 to the upper DBR layer 20, and n-type power may be supplied to the lower metal contact 60 to electrically connect the VCSEL emitter 110 to the lower DBR layer 30.

Also, for example, when the upper DBR layer 20 is doped in n-type and the lower DBR layer 30 is doped in p-type, n-type power may be supplied to the upper metal contact 10 to electrically connect the VCSEL emitter 110 to the upper DBR layer 20, and p-type power may be supplied to the lower metal contact 60 to electrically connect the VCSEL emitter 110 to the lower DBR layer 30.

The VCSEL emitter 110 according to an embodiment may include an oxidation area. The oxidation area may be disposed on an upper portion of the active layer.

The oxidation area according to an embodiment may have electrical insulation. For example, an electrical flow to the oxidation area may be restricted. For example, an electrical connection to the oxidation area may be restricted.

Also, the oxidation area according to an embodiment may serve as an aperture. In detail, since the oxidation area has electrical insulation, a beam generated from the active layer 40 may be emitted to only areas other than the oxidation area.

The laser emitting unit according to an embodiment may include a plurality of VCSEL emitters 110.

Also, the laser emitting unit according to an embodiment may turn on the plurality of VCSEL emitters 110 at once or individually.

The laser emitting unit according to an embodiment may emit laser beams of various wavelengths. For example, the laser emitting unit may emit a laser beam with a wavelength of 905 nm. Also, for example, the laser emitting unit may emit a laser beam with a wavelength of 1550 nm.

Also, the wavelength of the laser beam emitted from the laser emitting unit according to an embodiment may vary depending on the surrounding environment. For example, as the temperature of the surrounding environment increases, the wavelength of the laser beam emitted from the laser emitting unit may increase. Alternatively, for example, as the temperature of the surrounding environment decreases, the wavelength of the laser beam emitted from the laser emitting unit may decrease. The surrounding environment may include temperature, humidity, pressure, dust concentration, ambient light amount, altitude, gravity, acceleration, and the like, but the present disclosure is not limited thereto.

The laser emitting unit may emit a laser beam perpendicularly to a support surface. Alternatively, the laser emitting unit may emit a laser beam perpendicularly to an emission surface.

Figure 5:
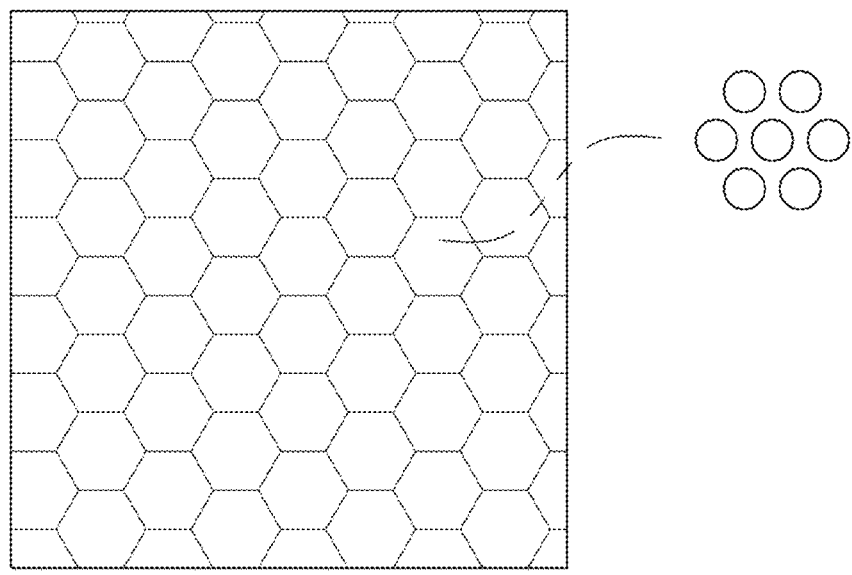
FIG. 5 is a diagram illustrating a vertical-cavity-surface-emitting laser (VCSEL) unit according to one embodiment.

FIG. 5 is a diagram showing a VCSEL unit according to an embodiment.

Referring to FIG. 5, a laser emitting unit 100 according to an embodiment may include a VCSEL unit 130.

The VCSEL unit 130 according to an embodiment may include a plurality of VCSEL emitters 110. For example, the plurality of VCSEL emitters 110 may be arranged in a honeycomb structure, but the present disclosure is not limited thereto. In this case, one honeycomb structure may include seven VCSEL emitters 110, but the present disclosure is not limited thereto.

Also, the VCSEL emitters 110 included in the VCSEL unit 130 according to an embodiment may be oriented in the same direction. For example, 400 VCSEL emitters 110 included in one VCSEL unit 130 may be oriented in the same direction.

Also, the VCSEL unit 130 may be distinguished by the direction in which the laser beam is emitted. For example, when N VCSEL emitters 110 emit laser beams in a first direction and M VCSEL emitters 110 emit laser beams in a second direction, the N VCSEL emitters 110 may be distinguished as first VCSEL units, and the M VCSEL emitters 110 may be distinguished as second VCSEL units.

Also, the VCSEL unit 130 according to an embodiment may include a metal contact. For example, the VCSEL unit 130 may include a p-type metal and an n-type metal. Also, for example, a plurality of VCSEL emitters 110 included in the VCSEL unit 130 share the metal contact.

Figure 6:
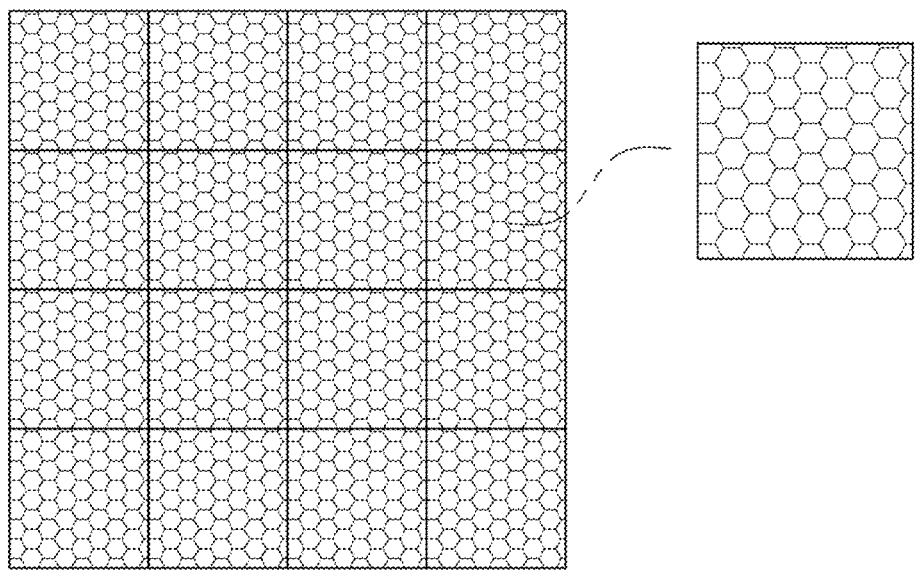
FIG. 6 is a diagram illustrating a VCSEL array according to one embodiment.

FIG. 6 is a diagram showing a VCSEL array according to an embodiment.

Referring to FIG. 6, a laser emitting unit 100 according to an embodiment may include a VCSEL array 150. FIG. 6 shows 8×8 VCSEL arrays, but the present disclosure is not limited thereto.

The VCSEL array 150 according to an embodiment may include a plurality of VCSEL units 130. For example, the plurality of VCSEL units 130 may be arranged in a matrix structure, but the present disclosure is not limited thereto.

For example, the plurality of VCSEL units 130 may be an N×N matrix, but the present disclosure is not limited thereto. Also, for example, the plurality of VCSEL units 130 may be an N×M matrix, but the present disclosure is not limited thereto.

Also, the VCSEL array 150 according to an embodiment may include a metal contact. For example, the VCSEL array 150 may include a p-type metal and an n-type metal. In this case, the plurality of VCSEL units 130 may share the metal contacts or may have respective metal contacts rather than sharing the metal contacts.

Figure 7:
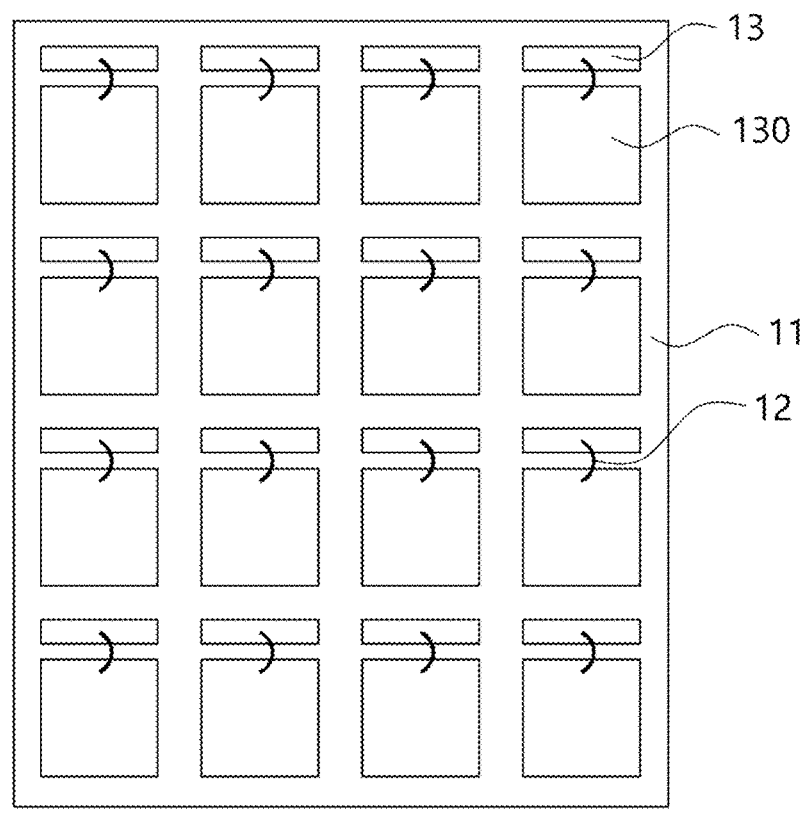
FIG. 7 is a side view illustrating a VCSEL array and a metal contact according to one embodiment.

FIG. 7 is a diagram showing a VCSEL array and a metal contact according to an embodiment.

Referring to FIG. 7, a laser emitting unit 100 according to an embodiment may include a VCSEL array 151. FIG. 7 shows 4×4 VCSEL arrays, but the present disclosure is not limited thereto. The VCSEL array 151 may include a first metal contact 11, a wire 12, a second metal contact 13, and a VCSEL unit 130.

The VCSEL array 151 according to an embodiment may include a plurality of VCSEL units 130 arranged in a matrix structure. In this case, the plurality of VCSEL units 130 may be connected to the metal contacts independently. For example, the plurality of VCSEL units 130 may be connected to the first metal contact 11 together because the VCSEL units 130 share the first metal contact 11. However, the plurality of VCSEL units 130 may be connected to the second metal contact independently because the VCSEL units 130 do not share the second metal contact 13. Also, for example, the plurality of VCSEL units 130 may be connected to the first metal contact 11 directly and may be connected to the second metal contact 13 through wires 12. In this case, the number of wires 12 required may be equal to the number of VCSEL units 130. For example, when the VCSEL array 151 includes a plurality of VCSEL units 130 arranged in an N×M matrix structure, the number of wires 12 may be N*M.

Also, the first metal contact 11 and the second metal contact 13 according to an embodiment may be different from each other. For example, the first metal contact 11 may be an n-type metal, and the second metal contact 13 may be a p-type metal. On the contrary, the first metal contact 11 may be a p-type metal, and the second metal contact 13 may be an n-type metal.

Figure 8:
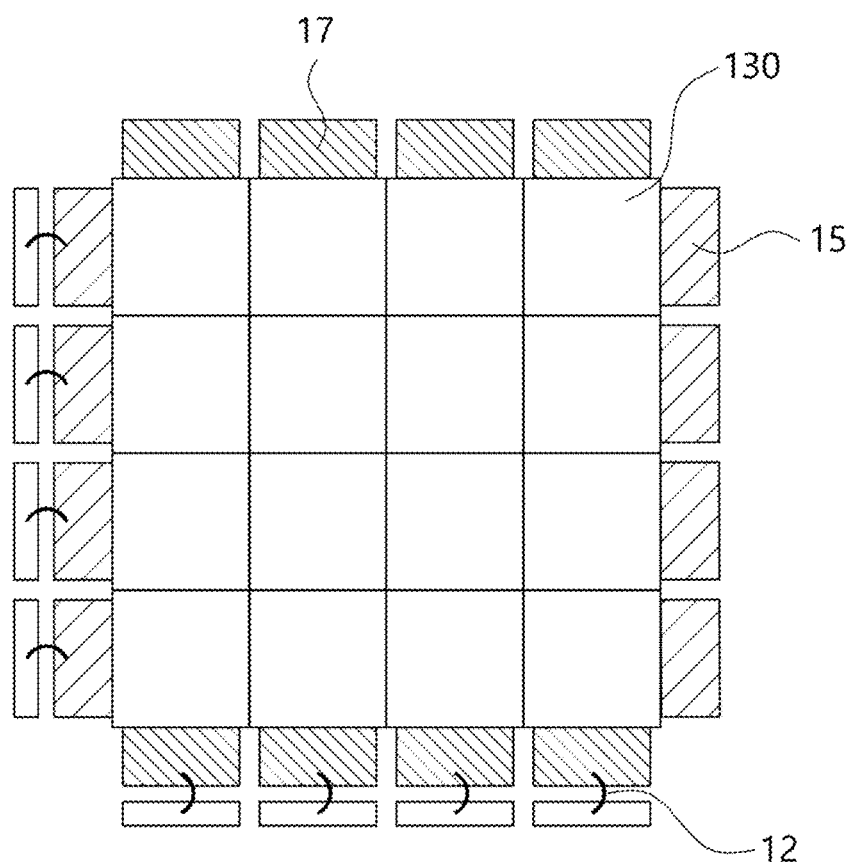
FIG. 8 is a diagram illustrating a VCSEL array according to one embodiment.

FIG. 8 is a diagram showing a VCSEL array according to an embodiment.

Referring to FIG. 8, a laser emitting unit 100 according to an embodiment may include a VCSEL array 153. FIG. 8 shows 4×4 VCSEL arrays, but the present disclosure is not limited thereto.

The VCSEL array 153 according to an embodiment may include a plurality of VCSEL units 130 arranged in a matrix structure. In this case, the plurality of VCSEL units 130 may share a metal contact or may have respective metal contacts rather than sharing a metal contact. For example, the plurality of VCSEL units 130 may share a first metal contact 15 in units of rows. Also, for example, the plurality of VCSEL units 130 may share a second metal contact 17 in units of columns.

Also, the first metal contact 15 and the second metal contact 17 according to an embodiment may be different from each other. For example, the first metal contact 15 may be an n-type metal, and the second metal contact 17 may be a p-type metal. On the contrary, the first metal contact 15 may be a p-type metal, and the second metal contact 17 may be an n-type metal.

Also, the VCSEL unit 130 according to an embodiment may be electrically connected to the first metal contact 15 and the second metal contact 17 through wires 12.

The VCSEL array 153 according to one embodiment may operate to be addressable. For example, the plurality of VCSEL units 130 included in the VCSEL array 153 may operate independently of the other VCSEL units.

For example, when power is supplied to the first metal contact 15 in a first row and the second metal contact 17 in a first column, the VCSEL unit in a first row and first column may operate. In addition, for example, when power is supplied to the first metal contact 15 in the first row and the second metal contacts 17 in the first and third columns, the VCSEL unit in the first row and first column and the VCSEL unit in the first row and third column may operate.

According to one embodiment, the VCSEL units 130 included in the VCSEL array 153 may operate with a predetermined pattern.

For example, the VCSEL units 130 may operate with a predetermined pattern, such as, after the VCSEL unit in the first row and first column operates, the VCSEL unit in a first row and second column, the VCSEL unit in the first row and third column, the VCSEL unit in a first row and fourth column, the VCSEL unit in a second row and first column, the VCSEL unit in a second row and second column, and the like operate in this order, and the VCSEL unit in a fourth row and fourth column operates at the last.

Further, for example, the VCSEL units 130 may operate with a predetermined pattern, such as, after the VCSEL unit in the first row and first column operates, the VCSEL unit in the second row and first column, the VCSEL unit in a third row and first column, the VCSEL unit in a fourth row and first column, the VCSEL unit in the first row and second column, the VCSEL unit in the second row and second column, and the like operate in this order, and the VCSEL unit in the fourth row and fourth column operates at the last.

According to another embodiment, the VCSEL units 130 included in the VCSEL array 153 may operate with an irregular pattern. Alternatively, the VCSEL units 130 included in the VCSEL array 153 may operate without having a pattern.

For example, VCSEL units 130 may operate randomly. When the VCSEL units 130 operate randomly, interference between the VCSEL units 130 may be prevented.

There may be various methods of directing a laser beam emitted from a laser emitting unit to an object. Among the methods, a flash scheme uses a laser beam spreading toward an object through the divergence of the laser beam. In order to direct a laser beam to an object located at a remote distance, the flash scheme requires a high-power laser beam. The high-power laser beam requires a high voltage to be applied, thereby increasing power. Also, the high-power laser beam may damage human eyes, and thus there is a limit to the distance that can be measured by a LiDAR device using the flash scheme.

A scanning scheme is a scheme for directing a laser beam emitted from a laser emitting unit in a specific direction. The scanning scheme can reduce laser power loss by causing a laser beam to travel in a specific direction. Since the laser power loss can be reduced, the scanning scheme may have a longer distance that can be measured by a LiDAR device than the flash scheme even when the same laser power is used. Also, since the scanning scheme has lower laser power required to measure the same distance than the flash scheme, it is possible to improve safety for human eyes.

Laser beam scanning may include collimation and steering. For example, the laser beam scanning may collimate a laser beam and then steer the collimated laser beam. Also, for example, the laser beam scanning may steer a laser beam and then collmate the steered laser beam.

Various embodiments of an optic unit including a Beam Collimation and Steering Component (BCSC) will be described in detail below.

Figure 9:
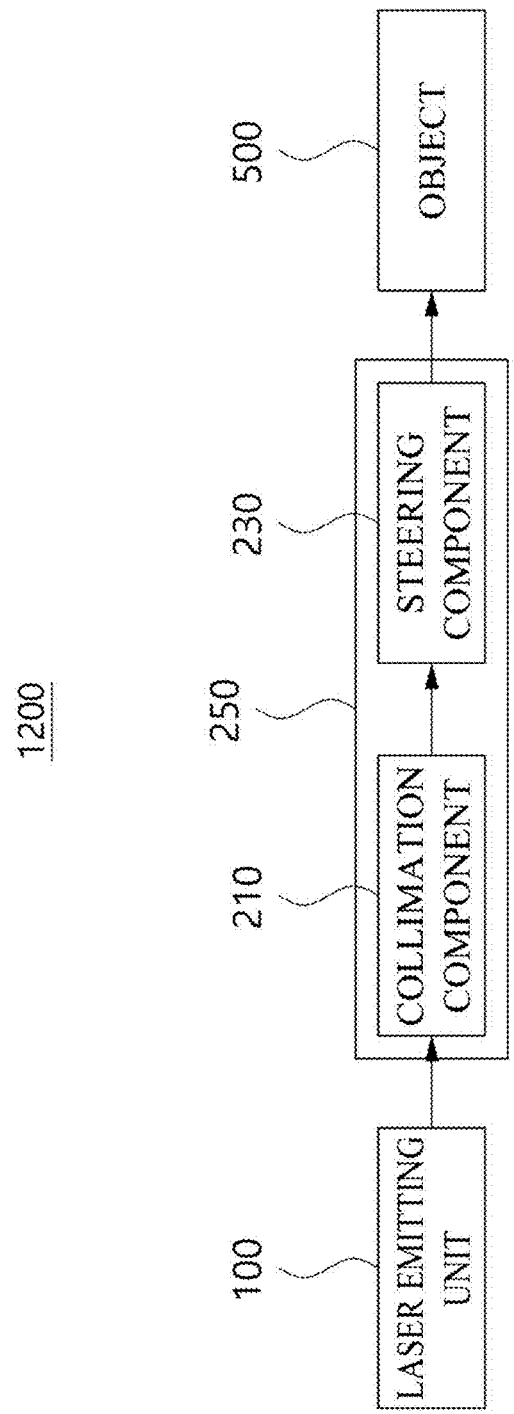
FIG. 9 is a diagram for describing a LiDAR device according to one embodiment.

FIG. 9 is a diagram illustrating a LiDAR device according to an embodiment.

Referring to FIG. 9, a LiDAR device 1200 according to an embodiment may include a laser emitting unit 100 and an optic unit. In this case, the optic unit may include a BCSC 250. Also, the BCSC 250 may include a collimation component 210 and a steering component 230.

The BCSC 250 according to an embodiment may be configured as follows. The collimation component 210 may collimate a laser beam first, and then the collimated laser beam may be steered through the steering component 230. Alternatively, the steering component 230 may steer a laser beam first, and then the steered laser beam may be collimated through the collimation component 210.

Also, an optical path of the LiDAR device 1200 according to an embodiment is as follows. A laser beam emitted from the laser emitting unit 100 may be directed to the BCSC 250. The laser beam directed to the BCSC 250 may be collimated by the collimation component 210 and directed to the steering component 230. The laser beam directed to the steering component 230 may be steered and directed to an object. The laser beam directed to the object 500 may be reflected by the object 500 and directed to the detecting unit.

Even though laser beams emitted from the laser emitting unit have directivity, there may be some degree of divergence as the laser beams go straight. Due to the divergence, the laser beams emitted from the laser emitting unit may not be incident on the object, or even if the laser beams are incident, a very small number of laser beams may be incident.

When the degree of divergence of the laser beams is large, the amount of laser beam incident on the object decreases, and the amount of laser beam reflected by the object and directed to the detecting unit becomes very small due to the divergence. Thus, a desired measurement result may not be obtained. Alternatively, when the degree of divergence of the laser beams is large, a distance that can be measured by a LiDAR device may decrease, and thus a distant object may not be subjected to measurement.

Accordingly, by reducing the degree of divergence of a laser beam emitted from a laser emitting unit before the laser beam is incident on an object, it is possible to improve the efficiency of a LiDAR device. A collimation component of the present disclosure can reduce the degree of divergence of a laser beam. A laser beam having passed through the collimation component may become parallel light. Alternatively, a laser beam having passed through the collimation component may have a degree of divergence ranging from 0.4 degrees to 1 degree.

When the degree of divergence of a laser beam is reduced, the amount of light incident on an object may be increased. When the amount of light incident on an object is increased, the amount of light reflected by the object may be increased and thus it is possible to efficiently receive the laser beam. Also, when the amount of light incident on an object is increased, it is possible to measure an object at a great distance with the same beam power compared to before the laser beam is collimated.

Figure 10:
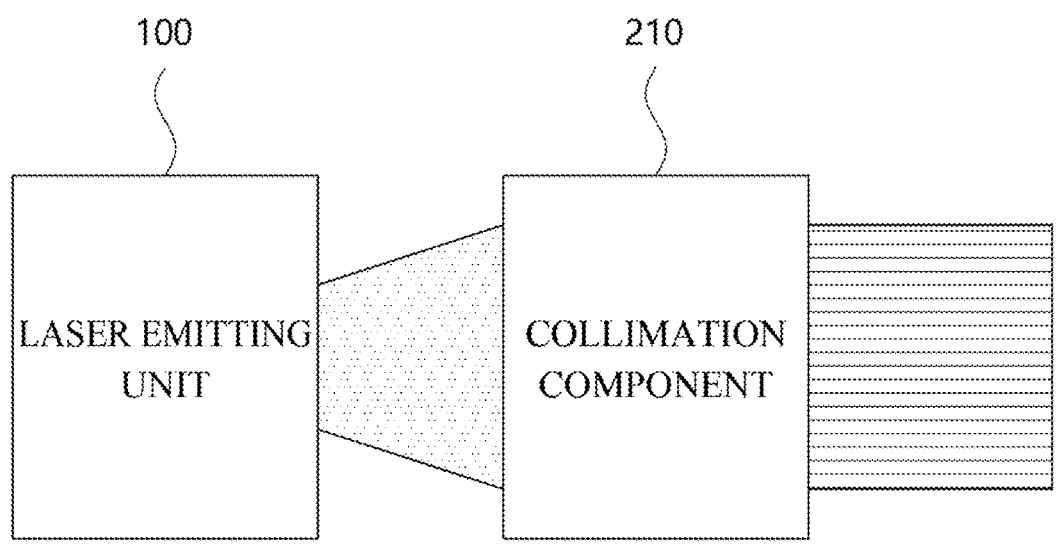
FIG. 10 is a diagram for describing a collimation component according to one embodiment.

FIG. 10 is a diagram illustrating a collimation component according to an embodiment.

Referring to FIG. 10, a collimation component 210 according to an embodiment may be disposed in a direction in which a laser beam emitted from a laser emitting unit 100 emits. The collimation component 210 may adjust the degree of divergence of a laser beam. The collimation component 210 may reduce the degree of divergence of a laser beam.

For example, the angle of divergence of a laser beam emitted from the laser emitting unit 100 may range from 16 degrees to 30 degrees. In this case, after the laser beam emitted from the laser emitting unit 100 passes through the collimation component 210, the angle of divergence of the laser beam may range from 0.4 degrees to 1 degree.

Figure 11:
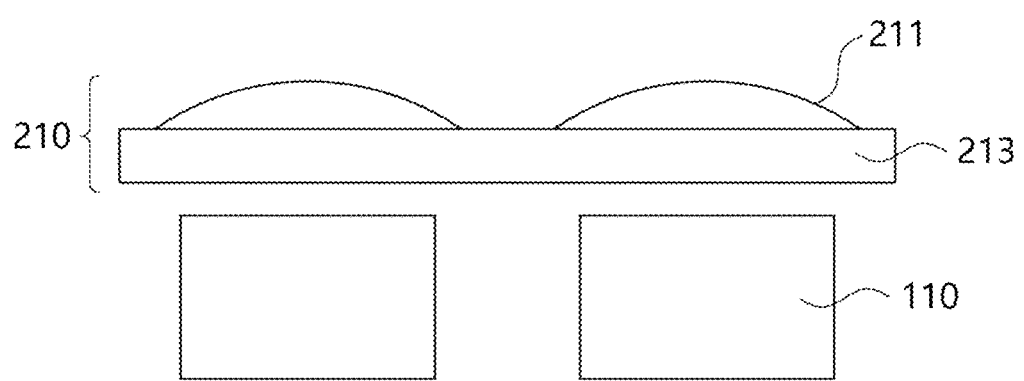
FIG. 11 is a diagram for describing a collimation component according to one embodiment.

FIG. 11 is a diagram illustrating a collimation component according to an embodiment.

Referring to FIG. 11, a collimation component 210 according to an embodiment may include a plurality of microlenses 211 and a substrate 213.

The microlenses may have a diameter of millimeters (mm), micrometers (μm), nanometers (nm), picometers (pm), but the present disclosure is not limited thereto.

The plurality of microlenses 211 according to an embodiment may be disposed on the substrate 213. The plurality of microlenses 211 and the substrate 213 may be disposed above a plurality of VCSEL emitters 110. In this case, one of the plurality of microlenses 211 may correspond to one of the plurality of VCSEL emitters 110, but the present disclosure is not limited thereto.

Also, the plurality of microlenses 211 according to an embodiment may collimate a laser beams emitted from the plurality of VCSEL emitters 110. In this case, a laser beam emitted from one of the plurality of VCSEL emitters 110 may be collimated by one of the plurality of microlenses 211. For example, the angle of divergence of a laser beam emitted from one of the plurality of VCSEL emitters 110 may be decreased after the laser beam passes through one of the plurality of microlenses 211.

Also, the plurality of microlenses according to an embodiment may be a gradient index lens, a micro-curved lens, an array lens, a Fresnel lens, or the like.

Also, the plurality of microlenses according to an embodiment may be manufactured by a method such as molding, ion exchange, diffusion polymerization, sputtering, and etching.

Also, the plurality of microlenses according to an embodiment may have a diameter ranging from 130 μm to 150 μm. For example, the diameter of the plurality of lenses may be 140 μm. Also, the plurality of microlenses may have a thickness ranging from 400 μm to 600 μm. For example, the thickness of the plurality of microlenses may be 500 μm.

Figure 12:
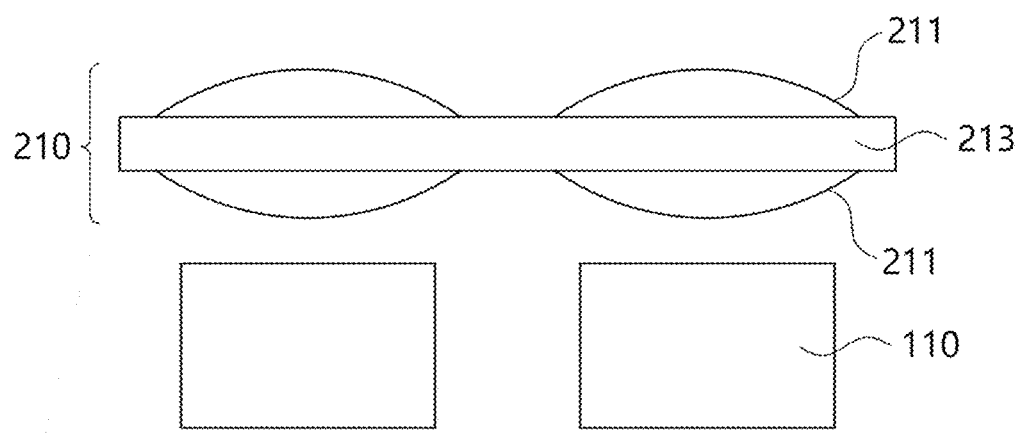
FIG. 12 is a diagram for describing a collimation component according to one embodiment.

FIG. 12 is a diagram illustrating a collimation component according to an embodiment.

Referring to FIG. 12, a collimation component 210 according to an embodiment may include a plurality of microlenses 211 and a substrate 213.

The plurality of microlenses 211 according to an embodiment may be disposed on the substrate 213. For example, the plurality of microlenses 211 may be disposed on the front surface and the rear surface of the substrate 213. In this case, the optical axis of microlenses 211 disposed on the front surface of the substrate 213 may match the optical axis of microlenses 211 disposed on the rear surface of the substrate 213.

Figure 13:
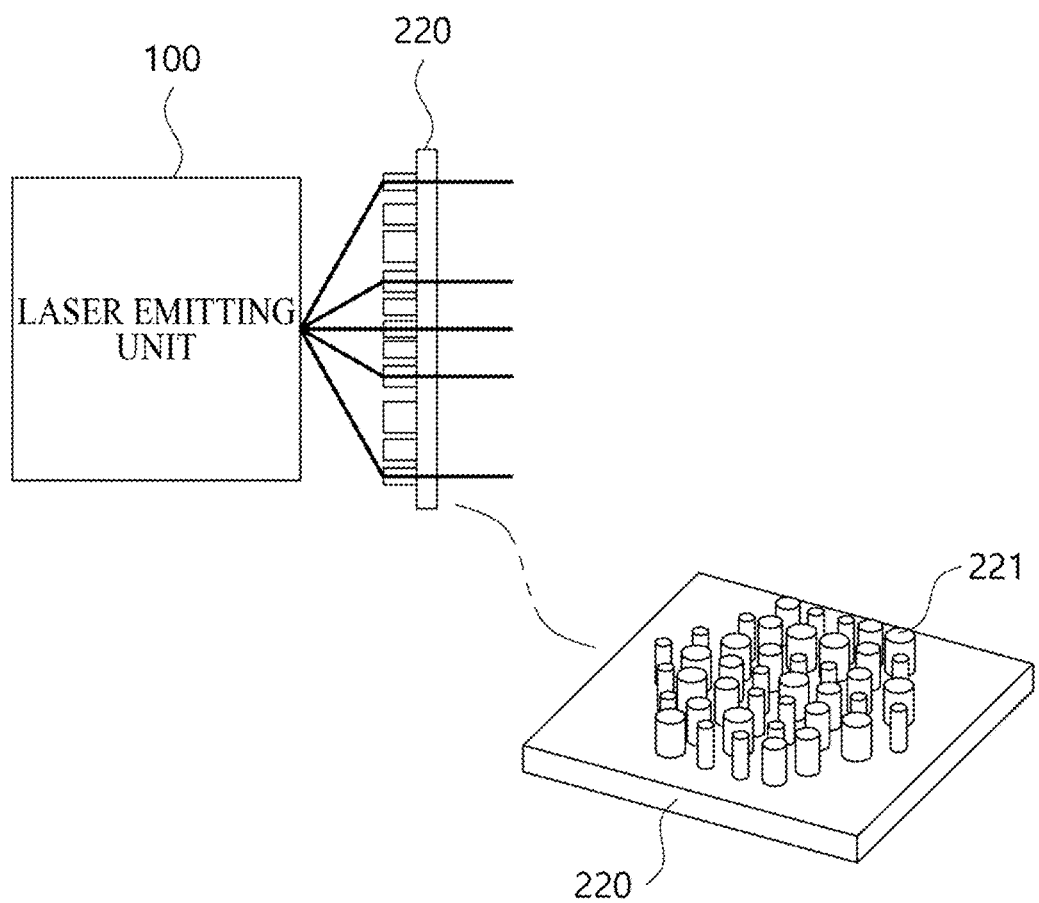
FIG. 13 is a diagram for describing a collimation component according to one embodiment.

FIG. 13 is a diagram illustrating a collimation component according to an embodiment.

Referring to FIG. 13, the collimation component according to an embodiment may include a metasurface 220.

The metasurface 220 according to an embodiment may include a plurality of nanopillars 221. For example, the plurality of nanopillars 221 may be disposed on one side of the metasurface 220. Also, for example, the plurality of nanopillars 221 may be disposed on both sides of the metasurface 220.

The plurality of nanopillars 221 may have a subwavelength size. For example, a pitch between the plurality of nanopillars 221 may be less than the wavelength of a laser beam emitted from the laser emitting unit 100. Alternatively, the width, diameter, and height of the nanopillars 221 may be less than the size of the wavelength of the laser beam.

By adjusting the phase of a laser beam emitted from the laser emitting unit 100, the metasurface 220 may refract the laser beam. The metasurface 220 may refract laser beams emitted from the laser emitting unit 100 in various directions.

The metasurface 220 may collimate a laser beam emitted from the laser emitting unit 100. Also, the metasurface 220 may reduce the angle of divergence of a laser beam emitted from the laser emitting unit 100. For example, the angle of divergence of a laser beam emitted from the laser emitting unit 100 may range from 15 degrees to 30 degrees, and the angle of divergence of a laser beam having passed the metasurface 220 may range from 0.4 degrees to 1.8 degrees.

The metasurface 220 may be disposed on the laser emitting unit 100. For example, the metasurface 220 may be disposed to the side of the emission surface of the laser emitting unit 100.

Alternatively, the metasurface 220 may be deposited on the laser emitting unit 100. The plurality of nanopillars 221 may be formed on an upper portion of the laser emitting unit 100. The plurality of nanopillars 221 may form various nanopatterns on the laser emitting unit 100.

The nanopillars 221 may have various shapes. For example, the nanopillars 221 may have a cylindrical shape, a polygonal column shape, a conical shape, a polypyramid shape, or the like. Furthermore, the nanopillars 221 may have an irregular shape.

Figure 14:
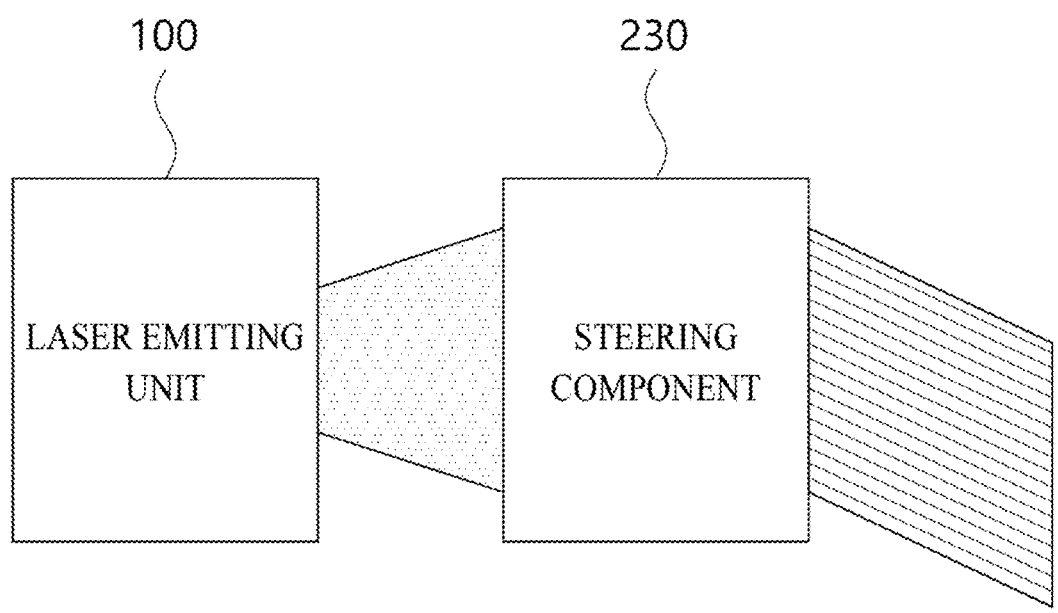
FIG. 14 is a diagram for describing a steering component according to one embodiment.

FIG. 14 is a diagram illustrating a steering component according to an embodiment.

Referring to FIG. 14, a steering component 230 according to an embodiment may be disposed in a direction in which a laser beam emitted from a laser emitting unit 100 travels. The steering component 230 may adjust the direction of a laser beam. The steering component 230 may adjust an angle between a laser beam and an optical axis of a laser light source.

For example, the steering component 230 may steer the laser beam such that the angle between the laser beam and the optical axis of the laser light source ranges from 0 degrees to 30 degrees. Alternatively, for example, the steering component 230 may steer the laser beam such that the angle between the laser beam and the optical axis of the laser light source ranges from −30 degrees to 0 degrees.

Figure 15:
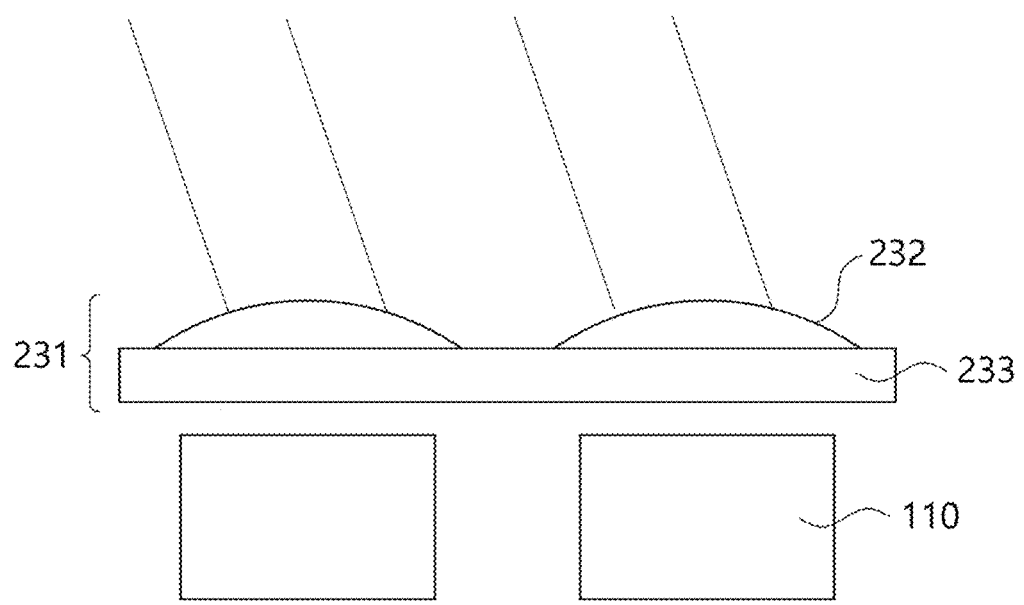
FIGS. 15 and 16 are diagrams for describing a steering component according to one embodiment.
Figure 16:
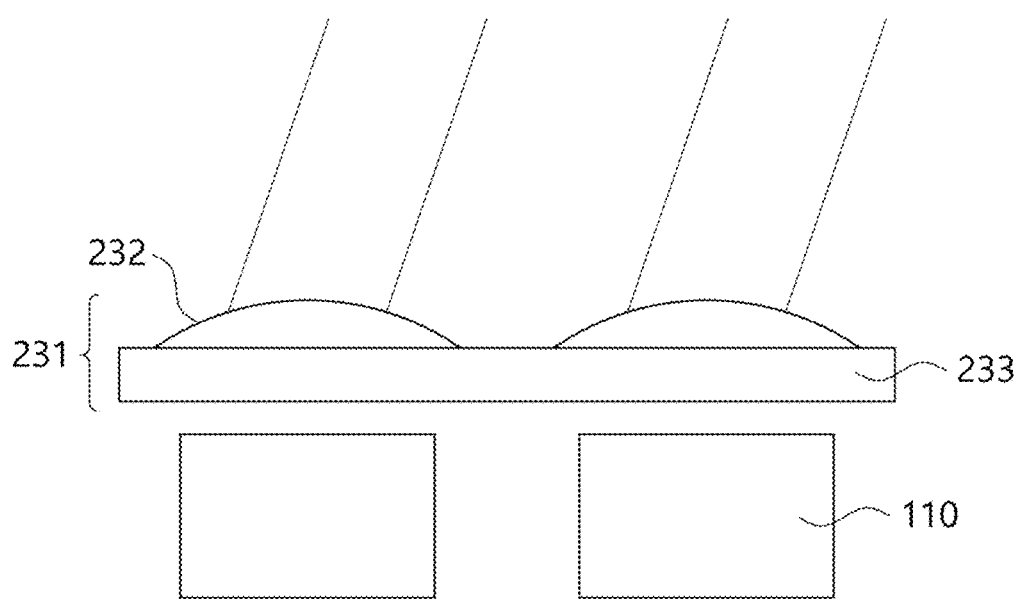

FIGS. 15 and 16 are diagrams illustrating a steering component according to an embodiment.

Referring to FIGS. 14 and 15, a steering component 231 according to an embodiment may include a plurality of microlenses 232 and a substrate 233.

The plurality of microlenses 232 according to an embodiment may be disposed on the substrate 233. The plurality of microlenses 232 and the substrate 233 may be disposed above a plurality of VCSEL emitters 110. In this case, one of the plurality of microlenses 232 may correspond to one of the plurality of VCSEL emitters 110, but the present disclosure is not limited thereto.

Also, the plurality of microlenses 232 according to an embodiment may steer laser beams emitted from the plurality of VCSEL emitters 110. In this case, a laser beam emitted from one of the plurality of VCSEL emitters 110 may be steered by one of the plurality of microlenses 232.

In this case, the optical axis of the microlens 232 may not match the optical axis of the VCSEL emitter 110. For example, referring to FIG. 14, when the optical axis of the VCSEL emitter 110 is inclined to the right with respect to the optical axis of the microlens 232, a laser beam emitted from the VCSEL emitter 110 through the microlens 232 may be directed to the left. Also, for example, referring to FIG. 15, when the optical axis of the VCSEL emitter 110 is inclined to the left with respect to the optical axis of the microlens 232, a laser beam emitted from the VCSEL emitter 110 through the microlens 232 may be directed to the right.

Also, as a distance between the optical axis of the microlens 232 and the optical axis of the VCSEL emitter 110 increases, the degree of steering of the laser beam may increase. For example, an angle between a laser beam and an optical axis of a laser light source may be larger when the distance between the optical axis of the microlens 232 and the optical axis of the VCSEL emitter 110 is 10 μm than when the distance is 1 μm.

Figure 17:
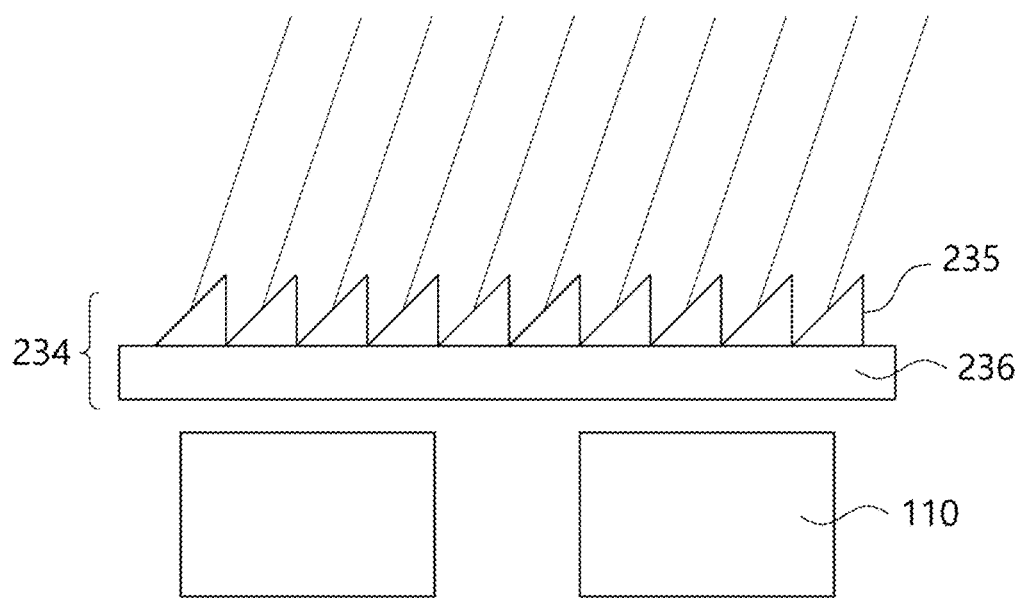
FIG. 17 is a diagram for describing a steering component according to one embodiment.

FIG. 17 is a diagram illustrating a steering component according to an embodiment.

Referring to FIG. 17, a steering component 234 according to an embodiment may include a plurality of microprisms 235 and a substrate 236.

The plurality of microprisms 235 according to an embodiment may be disposed on the substrate 236. The plurality of microprisms 235 and the substrate 236 may be disposed above a plurality of VCSEL emitters 110. In this case, one of the plurality of microprisms 235 may correspond to one of the plurality of VCSEL emitters 110, but the present disclosure is not limited thereto.

Also, the plurality of microprisms 235 according to an embodiment may steer laser beams emitted from the plurality of VCSEL emitters 110. For example, the plurality of microprisms 235 may change an angle between a laser beam and an optical axis of a laser light source.

In this case, as the angle of a microprism 235 decreases, the angle between the laser beam and the optical axis of the laser light source increases. For example, a laser beam may be steered 35 degrees when the angle of the microprism 235 is 0.05 degrees and may be steered by 15 degrees when the angle of the microprism 235 is 0.25 degrees.

Also, the plurality of microprisms 235 according to an embodiment may include a Porro prism, an Amici roof prism, a pentaprism, a Dove prism, a retroreflector prism, or the like. Also, the plurality of microprisms 235 may be formed of glass, plastic, or fluorspar. Also, the plurality of microprisms 235 may be manufactured by a method such as molding and etching.

At this point, a surface of the micro prism 235 may be polished by a polishing process so that diffused reflection due to surface roughness may be prevented.

According to one embodiment, the micro prisms 235 may be disposed on both surfaces of the substrate 236. For example, the micro prisms disposed on a first surface of the substrate 236 may steer the laser beam in a first axis, the micro prisms disposed on a second surface of the substrate 236 may steer the laser beam in a second axis.

Figure 18:
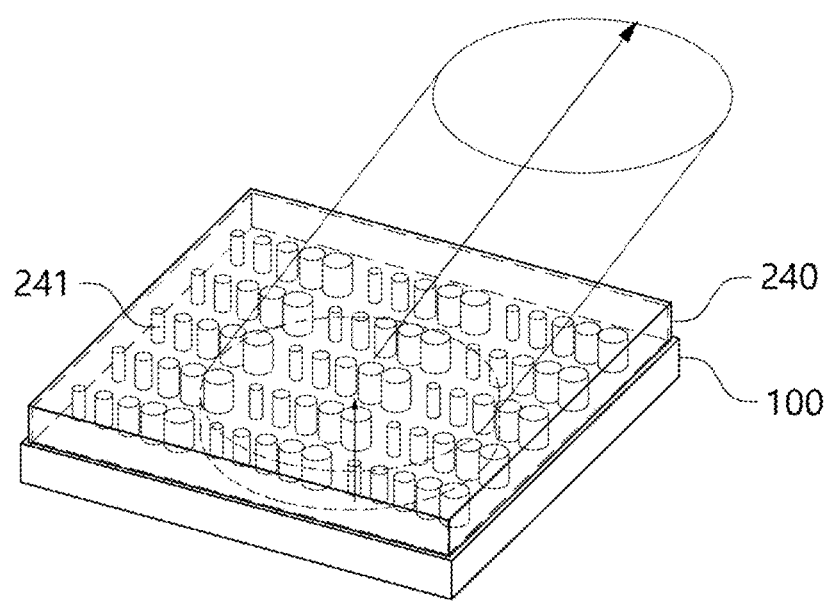
FIG. 18 is a diagram for describing a steering component according to one embodiment.

FIG. 18 is a diagram illustrating a steering component according to an embodiment.

Referring to FIG. 18, the steering component according to an embodiment may include a metasurface 240.

The metasurface 240 may include a plurality of nanopillars 241. For example, the plurality of nanopillars 241 may be disposed on one side of the metasurface 240. Also, for example, the plurality of nanopillars 241 may be disposed on both sides of the metasurface 240.

By adjusting the phase of a laser beam emitted from the laser emitting unit 100, the metasurface 240 may refract the laser beam.

The metasurface 240 may be disposed on the laser emitting unit 100. For example, the metasurface 240 may be disposed to the side of the emission surface of the laser emitting unit 100.

Alternatively, the metasurface 240 may be deposited on the laser emitting unit 100. The plurality of nanopillars 241 may be formed on an upper portion of the laser emitting unit 100. The plurality of nanopillars 241 may form various nanopatterns on the laser emitting unit 100.

The nanopillars 241 may have various shapes. For example, the nanopillars 241 may have a shape such as a circular column, a polygonal column, a circular pyramid, and a polygonal pyramid. In addition, the nanopillars 241 may have an irregular shape.

The nanopillars 241 may form various nanopatterns. The metasurface 240 may steer a laser beam emitted from the laser emitting unit 100 based on the nanopatterns.

The nanopillars 241 may form nanopatterns based on various features. The features may include the width (hereinafter referred to as W), pitch (hereinafter referred to as P), height (hereinafter referred to as H), and the number per unit length of nanopillars 241.

A nanopattern formed based on various features and a method of steering a laser beam according to the nanopattern will be described below.

Figure 19:
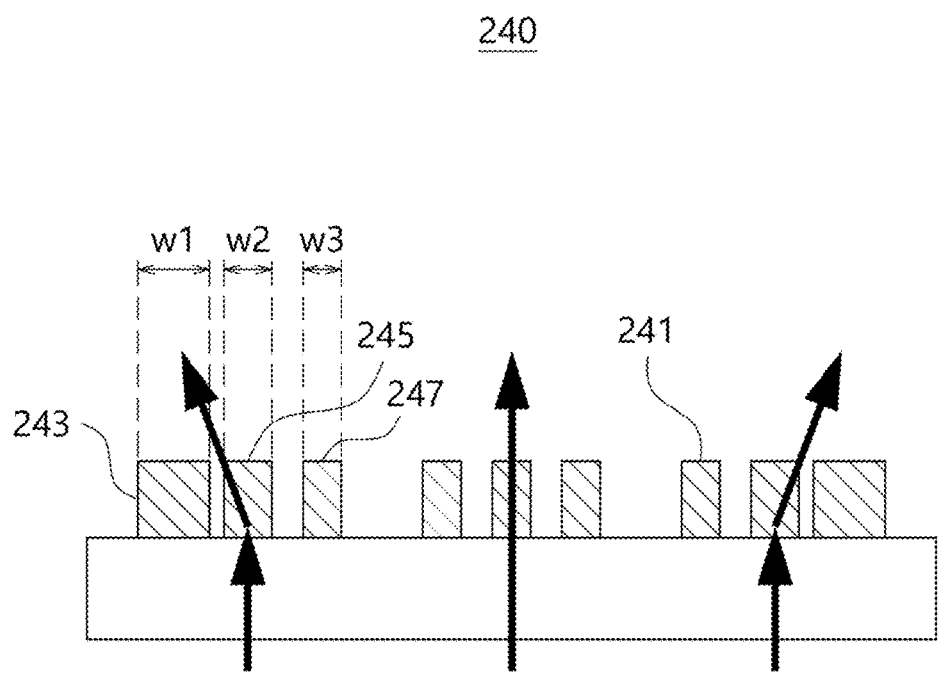
FIG. 19 is a diagram for describing a metasurface according to one embodiment.

FIG. 19 is a diagram illustrating a metasurface according to an embodiment.

Referring to FIG. 19, a metasurface 240 according to an embodiment may include a plurality of nanopillars 241 with different widths W.

The plurality of nanopillars 241 may form nanopatterns based on the widths W. For example, the plurality of nanopillars 241 may be disposed to have widths increasing in one direction (W1, W2, and W3). In this case, a laser beam emitted from a laser emitting unit 100 may be steered in a direction in which the widths W of the nanopillars 241 increase.

For example, the metasurface 240 may include a first nanopillar 243 with a first width W1, a second nanopillar 245 with a second width W2, and a third nanopillar 247 with a third width W3. The first width W1 may be greater than the second width W2 and the third width W3. The second width W2 may be greater than the third width W3. That is, the widths W of the nanopillars 241 may decrease from the first nanopillar 243 to the third nanopillar 247. In this case, when the laser beam emitted from the laser emitting unit 100 passes through the metasurface 240, the laser beam may be steered between a first direction in which the laser beam is emitted from the laser emitting unit 100 and a second direction which is a direction from the third nanopillar 247 to the first nanopillar 243.

Meanwhile, the steering angle θ of the laser beam may vary depending on a change rate of the widths W of the nanopillars 241. Here, the change rate of the widths W of the nanopillars 241 may refer to a numerical value indicating the average change of the widths W of the plurality of nanopillars 241.

The change rate of the widths W of the nanopillars 241 may be calculated based on the difference between the first width W1 and the second width W2 and the difference between the second width W2 and the third width W3.

The difference between the first width W1 and the second width W2 may be different from the difference between the second width W2 and the third width W3.

The steering angle θ of the laser beam may vary depending on the widths W of the nanopillars 241.

In detail, the steering angle θ may increase as the change rate of the widths W of the nanopillars 241 increases.

For example, the nanopillars 241 may form a first pattern with a first change rate on the basis of the widths W. Also, the nanopillars 241 may form a second pattern with a second change rate smaller than the first change rate on the basis of the widths W.

In this case, a first steering angle caused by the first pattern may be greater than a second steering angle caused by the second pattern.

Meanwhile, the steering angle θ may range from −90 degrees to 90 degrees.

Figure 20:
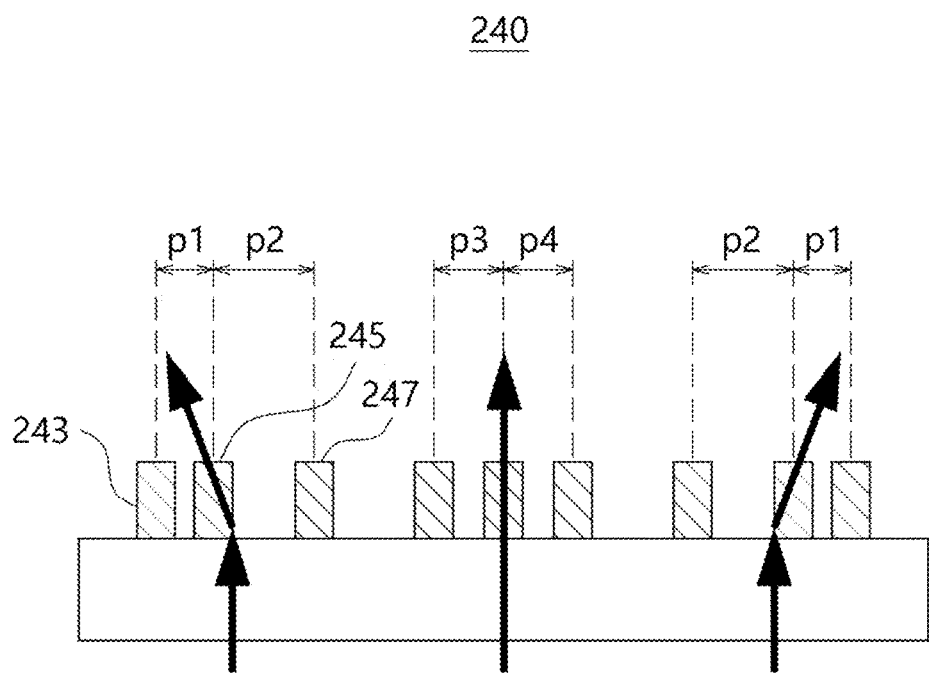
FIG. 20 is a diagram for describing a metasurface according to one embodiment.

FIG. 20 is a diagram illustrating a metasurface according to an embodiment.

Referring to FIG. 20, a metasurface 240 according to an embodiment may include a plurality of nanopillars 241 with different pitches P between adjacent nanopillars 241.

The plurality of nanopillars 241 may form nanopatterns based on a change in the pitches P between the adjacent nanopillars 241. The metasurface 240 may steer a laser beam emitted from the laser emitting unit 100 based on the nanopatterns formed based on the change in the pitches P between the nanopillars 241.

According to an embodiment, the pitches P between the nanopillars 241 may decrease in one direction. Here, a pitch P may refer to a distance between the centers of two adjacent nanopillars 241. For example, a first pitch P may refer to a distance between the center of a first nanopillar 243 and the center of a second nanopillar 245. Alternatively, the first pitch P1 may be defined as the shortest distance between the first nanopillar 243 and the second nanopillar 245.

A laser beam emitted from a laser emitting unit 100 may be steered in a direction in which the pitches P between the nanopillars 241 decrease.

The metasurface 240 may include the first nanopillar 243, the second nanopillar 245, and the third nanopillar 247. In this case, the first pitch P1 may be acquired based on a distance between the first nanopillar 243 and the second nanopillar 245. Likewise, a second pitch P2 may be acquired based on a distance between the second nanopillar 245 and the third nanopillar 247. In this case, the first pitch P1 may be smaller than the second pitch P2. That is, the pitches P may increase from the first nanopillar 243 to the third nanopillar 247.

In this case, when the laser beam emitted from the laser emitting unit 100 passes through the metasurface 240, the laser beam may be steered between a first direction in which the laser beam is emitted from the laser emitting unit 100 and a second direction which is a direction from the third nanopillar 247 to the first nanopillar 243.

The steering angle θ of the laser beam may vary depending on the pitches P between the nanopillars 241.

In detail, the steering angle θ of the laser beam may vary depending on a change rate of the pitches P between the nanopillars 241. Here, the change rate of the pitches P between the nanopillars 241 may refer to a numerical value indicating the average change of the pitches P between adjacent nanopillars 241.

The steering angle θ of the laser beam may increase as the change rate of the pitches P between the nanopillars 241 increases.

For example, the nanopillars 241 may form a first pattern with a first change rate based on the pitches P. Also, the nanopillars 241 may form a second pattern with a second change rate based on the pitches P.

In this case, a first steering angle caused by the first pattern may be greater than a second steering angle caused by the second pattern.

Meanwhile, the above-described principle of steering a laser beam according to a change in the pitches P between the nanopillars 241 is similarly applicable even to a case in which the number per unit length of nanopillars 241 changes.

For example, when the number per unit length of nanopillars 241 changes, the laser beam emitted from the laser emitting unit 100 may be steered between the first direction in which the laser beam is emitted from the laser emitting unit 100 and the second direction in which the number per unit length of nanopillars 241 increases.

Figure 21:
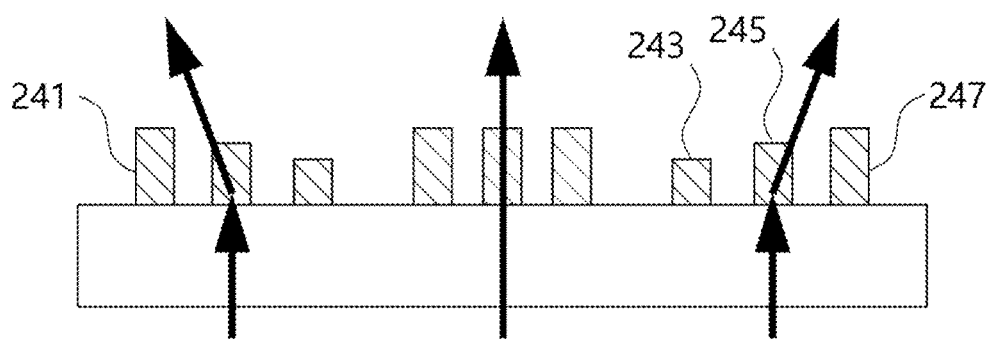
FIG. 21 is a diagram for describing a metasurface according to one embodiment.

FIG. 21 is a diagram illustrating a metasurface according to an embodiment.

Referring to FIG. 21, a metasurface 240 according to an embodiment may include a plurality of nanopillars 241 with different heights H.

The plurality of nanopillars 241 may form nanopatterns on the basis of a change in the heights H of the nanopillars 241.

According to an embodiment, the heights H1, H2, and H3 of the plurality of nanopillars 241 may increase in one direction. A laser beam emitted from a laser emitting unit 100 may be steered in a direction in which the heights H of the nanopillars 241 increase.

For example, the metasurface 240 may include a first nanopillar 243 with a first height H1, a second nanopillar 245 with a second height H2, and a third nanopillar 247 with a third height H3. The third height H3 may be greater than the first height H1 and the second height H2. The second height H2 may be greater than the first height H1. That is, the heights H of the nanopillars 241 may increase from the first nanopillar 243 to the third nanopillar 247. In this case, when the laser beam emitted from the laser emitting unit 100 passes through the metasurface 240, the laser beam may be steered between the first direction in which the laser beam is emitted from the laser emitting unit 100 and the second direction which is a direction from the first nanopillar 243 to the third nanopillar 247.

The steering angle θ of the laser beam may vary depending on the heights H of the nanopillars 241.

In detail, the steering angle θ of the laser beam may vary depending on a change rate of the heights H of the nanopillars 241. Here, the change rate of the heights H of the nanopillars 241 may refer to a numerical value indicating the average change of the heights H of adjacent nanopillars 241.

The change rate of the heights H of the nanopillars 241 may be calculated based on the difference between the first height H1 and the second height H2 and the difference between the second height H2 and the third height H3. The difference between the first height H1 and the second height H2 may be different from the difference between the second height H2 and the third height H3.

The steering angle θ of the laser beam may increase as the change rate of the heights H2 of the nanopillars 241 increases.

For example, the nanopillars 241 may form a first pattern with a first change rate on the basis of the heights H. Also, the nanopillars 241 may form a second pattern with a second change rate on the basis of the heights H.

In this case, a first steering angle caused by the first pattern may be greater than a second steering angle caused by the second pattern.

According to one embodiment, the steering component 230 may include a mirror that reflects the laser beam. For example, the steering component 230 may include a planar mirror, a polygonal mirror, a resonant mirror, a MEMS mirror, and a galvano mirror.

Alternatively, the steering component 230 may include a polygonal mirror that rotates 360 degrees about one axis, and a nodding mirror that is repeatedly driven in a predetermined range about one axis.

Figure 22:
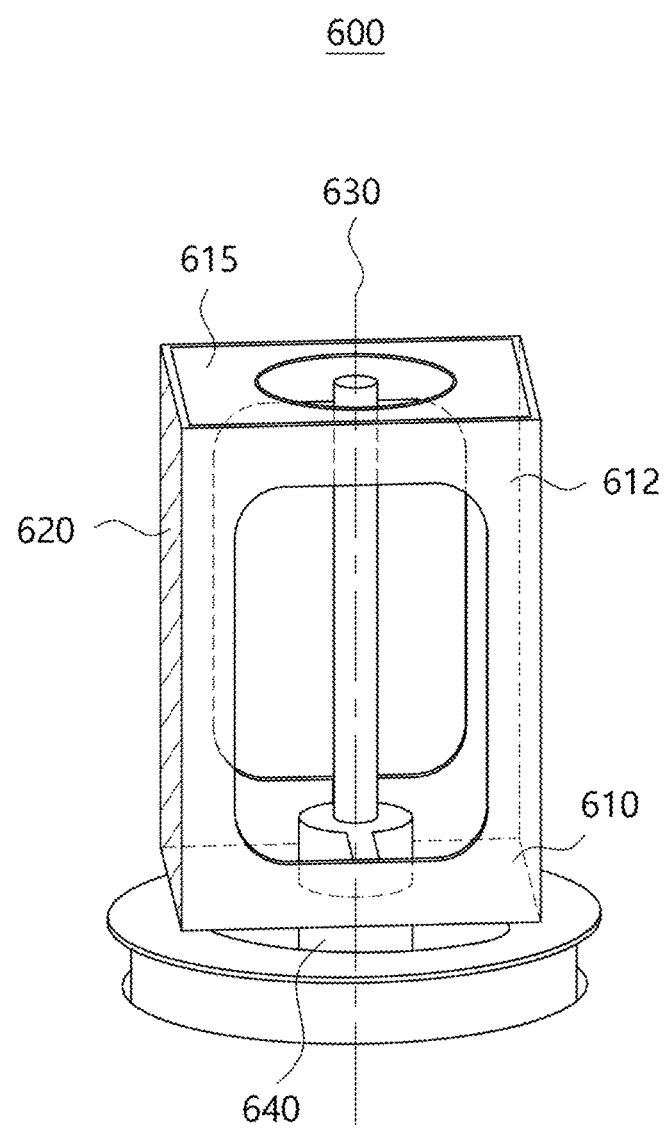
FIG. 22 is a diagram for describing a rotating polygonal mirror according to one embodiment.

FIG. 22 is a diagram for describing a polygonal mirror that is a steering component according to one embodiment.

Referring to FIG. 22, a rotating polygonal mirror 600 according to one embodiment may include reflective surfaces 620 and a body and may rotate about a rotation axis 630 vertically passing through a center of each of an upper portion 615 and a lower portion 610 of the body. However, the rotating polygonal mirror 600 may be configured with only some of the above-described components and may include more components. For example, the rotating polygonal mirror 600 may include the reflective surfaces 620 and the body, and the body may be configured with only the lower portion 610. At this point, the reflective surfaces 620 may be supported by the lower portion 610 of the body.

The reflective surfaces 620 are surfaces for reflecting the received laser, and may each include a reflective mirror, a reflective plastic, or the like, but the present disclosure is not limited thereto.

Further, the reflective surfaces 620 may be installed on side surfaces of the body except for the upper portion 615 and the lower portion 610 and may be installed such that a normal line of each thereof is orthogonal to the rotation axis 630. This may be for repetitive scanning of the same scan region by making the scan region of the laser irradiated from each of the reflective surfaces 620 the same.

Further, the reflective surfaces 620 may be installed on the side surfaces of the body except for the upper portion 615 and the lower portion 610 and may be installed such that a normal line of each thereof has a different angle from the rotation axis 630. This may be for expanding the scan region of the LiDAR device by making the scan region of the laser irradiated from each of the reflective surfaces 620 to be different.

Further, each of the reflective surfaces 620 may be formed in a rectangular shape, but is not limited thereto, and may have various shapes such as a triangular shape, a trapezoidal shape, and the like.

Further, the body is for supporting the reflective surfaces 620, and may include the upper portion 615, the lower portion 610, and a column 612 connecting the upper portion 615 and the lower portion 610. In this case, the column 612 may be installed to connect the centers of the upper portion 615 and the lower portion 610 of the body, may be installed to connect each vertex of the upper portion 615 and the lower portion 610 of the body, or may be installed to connect each corner of the upper portion 615 and the lower portion 610 of the body, but is limited to a structure for connecting and supporting the upper portion 615 and the lower portion 610 of the body.

Further, the body may be fastened to a driving unit 640 to receive a driving force for rotating, may be fastened to the driving unit 640 through the lower portion 610 of the body, or may be fastened to the driving unit 640 through the upper portion 615 of the body.

In addition, a shape of each of the upper portion 615 and the lower portion 610 of the body may be a polygonal shape. In this case, the shapes of the upper portion 615 and the lower portion 610 of the body may be identical, but are not limited thereto, and may be different from each other.

Further, a size of each of the upper portion 615 and the lower portion 610 of the body may be the same. However, the present disclosure is not limited thereto, and the sizes of the upper portion 615 and the lower portion 610 of the body may be different from each other.

Further, the upper portion 615 and/or the lower portion 610 of the body may include an empty space through which air may pass.

In FIG. 22, the rotating polygonal mirror 600 is illustrated as being a hexahedron in a shape of a tetragonal column including four reflective surfaces 620, but the number of the reflective surfaces 620 of the rotating polygonal mirror 600 is not necessarily four, and the rotating polygonal mirror 600 is not necessarily a hexahedron in the shape of a tetragonal column.

Further, in order to detect a rotation angle of the rotating polygonal mirror 600, the LiDAR device may further include an encoder unit. In addition, the LiDAR device may control the operation of the rotating polygonal mirror 600 using the detected rotation angle. In this case, the encoder unit may be included in the rotating polygonal mirror 600 and may be disposed to be spaced apart from the rotating polygonal mirror 600.

A required field of view (FOV) of the LiDAR device may be different depending on the application. For example, in a case of a fixed LiDAR device for three-dimensional (3D) mapping, the widest viewing angle may be required in vertical and horizontal directions, and in a case of a LiDAR device disposed in a vehicle, a relatively narrow viewing angle may be required in the vertical direction while a relatively wide viewing angle is required in the horizontal direction. In addition, in a case of a LiDAR device disposed in a drone, the widest viewing angle may be required in the vertical and horizontal directions.

Further, the scan region of the LiDAR device may be determined on the basis of the number of reflective surfaces of the rotating polygonal mirror, and the viewing angle of the LiDAR device may be determined accordingly. Thus, the number of reflective surfaces of the rotating polygonal mirror may be determined on the basis of the required viewing angle of the LiDAR device.

Figure 23:
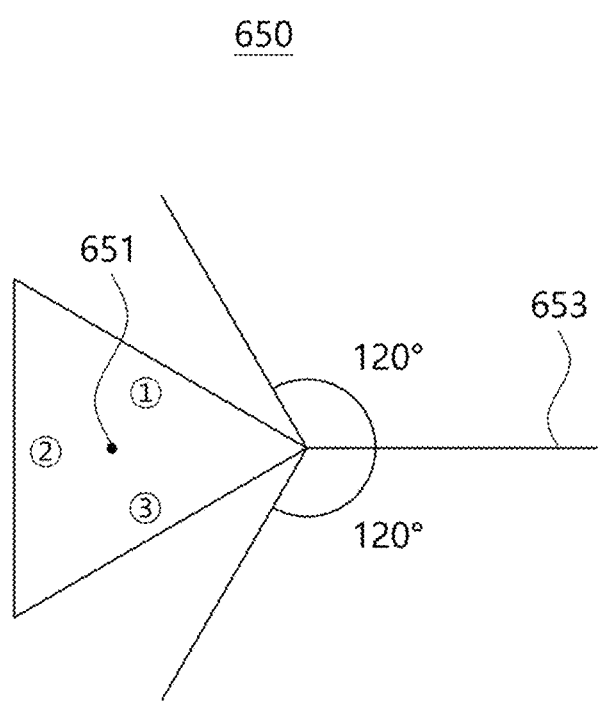
FIG. 23 is a top view for describing a viewing angle of a rotating polygonal mirror when the number of reflective surfaces is three and a shape of upper and lower portions of a body is an equilateral triangle shape.
Figure 24:
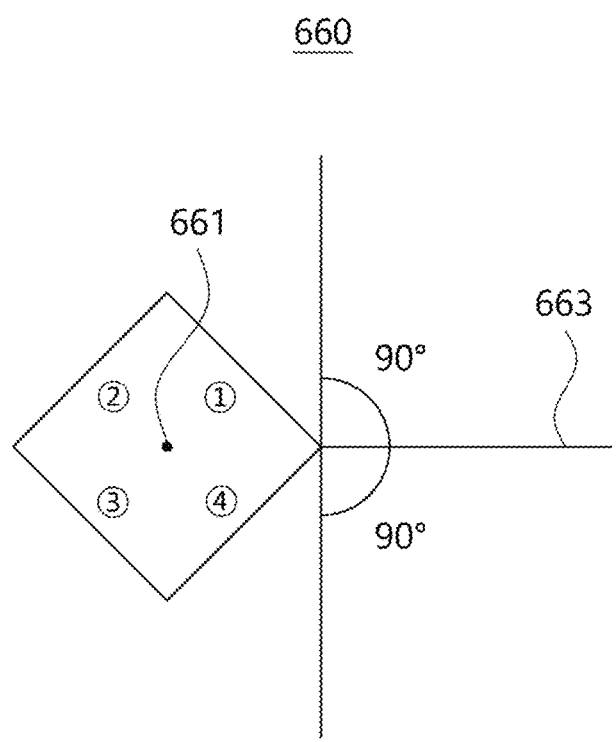
FIG. 24 is a top view for describing a viewing angle of a rotating polygonal mirror when the number of reflective surfaces is four and a shape of upper and lower portions of a body is a square shape.
Figure 25:
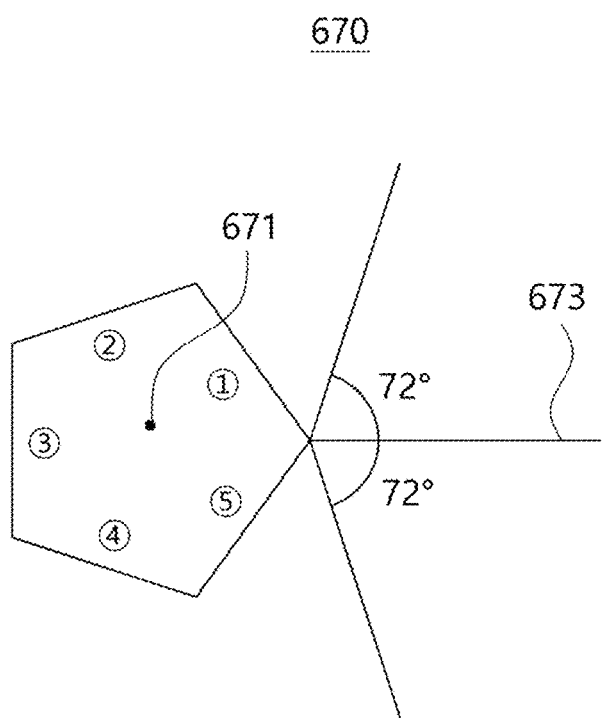
FIG. 25 is a top view for describing a viewing angle of a rotating polygonal mirror when the number of reflective surfaces is five and a shape of upper and lower portions of a body is a regular pentagonal shape.

FIGS. 23 to 25 are diagrams illustrating the relationship between the number of reflective surfaces and the viewing angle.

Cases of three, four, and five reflective surfaces are respectively illustrated in FIGS. 23 to 25, but the number of reflective surfaces is not determined, and when the number of reflective surfaces is different from the above, it may be easily calculated by analogizing the following description. Further, in FIGS. 22 to 24, a case in which the upper and lower portions of the body have a regular polygonal shape is described, but even when the upper and lower portions of the body do not have the regular polygonal shape, it may be easily calculated by analogizing the following description.

FIG. 23 is a top view for describing a viewing angle of a rotating polygonal mirror 650 in which the number of reflective surfaces is three and the shape of each of the upper and lower portions of the body is an equilateral triangle shape.

Referring to FIG. 23, a laser 653 may be incident in a direction consistent with a rotation axis 651 of the rotating polygonal mirror 650. Here, since the upper portion of the rotating polygonal mirror 650 has an equilateral triangle shape, an angle formed by the three reflective surfaces may be 60 degrees. In addition, referring to FIG. 23, when the rotating polygonal mirror 650 is positioned to slightly rotate in a clockwise direction, the laser may be reflected upward in the drawing, and when the rotating polygonal mirror 650 is positioned to slightly rotate in a counterclockwise direction, the laser is reflected downward in the drawing. Thus, when a path of the reflected laser is calculated with reference to FIG. 23, the maximum viewing angle of the rotating polygonal mirror may be obtained.

For example, when the laser is reflected through a first reflective surface of the rotating polygonal mirror 650, the reflected laser may be reflected upward at an angle of 120 degrees with respect to the incident laser 653. In addition, when the laser is reflected through a third reflective surface of the rotating polygonal mirror 650, the reflected laser may be reflected downward at an angle of 120 degrees with respect to the incident laser 653.

Thus, when the number of the reflective surfaces of the rotating polygonal mirror 650 is three, and the shape of each of the upper and lower portions of the body is an equilateral triangle shape, the maximum viewing angle of the rotating polygonal mirror may be 240 degrees.

FIG. 24 is a top view for describing a viewing angle of a rotating polygonal mirror 660 in which the number of reflective surfaces is four and the shape of each of the upper and lower portions of the body is a square shape.

Referring to FIG. 24, a laser 663 may be incident in a direction consistent with a rotation axis 661 of the rotating polygonal mirror 660. Here, since the upper portion of the rotating polygonal mirror 660 has a square shape, an angle formed by the four reflective surfaces may each be 90 degrees. In addition, referring to FIG. 24, when the rotating polygonal mirror 660 is positioned to slightly rotate in a clockwise direction, the laser may be reflected upward in the drawing, and, when the rotating polygonal mirror 660 is positioned to slightly rotate in a counterclockwise direction, the laser is reflected downward in the drawing. Thus, when a path of the reflected laser is calculated with reference to FIG. 24, the maximum viewing angle of the rotating polygonal mirror 660 may be obtained.

For example, when the laser is reflected through a first reflective surface of the rotating polygonal mirror 660, the reflected laser may be reflected upward at an angle of 90 degrees with respect to the incident laser 663. In addition, when the laser is reflected through a fourth reflective surface of the rotating polygonal mirror 660, the reflected laser may be reflected downward at an angle of 90 degrees with respect to the incident laser 663.

Thus, when the number of the reflective surfaces of the rotating polygonal mirror 660 is four, and the shape of each of the upper and lower portions of the body is a square shape, the maximum viewing angle of the rotating polygonal mirror 660 may be 180 degrees.

FIG. 25 is a top view for describing a viewing angle of a rotating polygonal mirror 670 in which the number of reflective surfaces is five and the shape of each of the upper and lower portions of the body is a regular pentagonal shape.

Referring to FIG. 25, a laser 673 may be incident in a direction consistent with a rotation axis 671 of the rotating polygonal mirror 670. Here, since the upper portion of the rotating polygonal mirror 670 has a regular pentagonal shape, an angle formed by the five reflective surfaces may each be 108 degrees. In addition, referring to FIG. 25, when the rotating polygonal mirror 670 is positioned to slightly rotate in a clockwise direction, the laser may be reflected upward in the drawing, and, when the rotating polygonal mirror 670 is positioned to slightly rotate in a counterclockwise direction, the laser is reflected downward in the drawing. Thus, when a path of the reflected laser is calculated with reference to FIG. 25, the maximum viewing angle of the rotating polygonal mirror may be obtained.

For example, when the laser is reflected through a first reflective surface of the rotating polygonal mirror 670, the reflected laser may be reflected upward at an angle of 72 degrees with respect to the incident laser 673. In addition, when the laser is reflected through a fifth reflective surface of the rotating polygonal mirror 670, the reflected laser may be reflected downward at an angle of 72 degrees with respect to the incident laser 673.

Thus, when the number of the reflective surfaces of the rotating polygonal mirror 670 is five, and the shape of each of the upper and lower portions of the body is a regular pentagonal shape, the maximum viewing angle of the rotating polygonal mirror may be 144 degrees.

As a result, referring to FIGS. 23 to 25 described above, in a case in which the number of reflective surfaces of the rotating polygonal mirror is N, and each of the upper and lower portions of the body has an N-polygon, when an inner angle of the N-polygon is referred to as a theta, the maximum viewing angle of the rotating polygonal mirror may be 360 degrees-2theta.

However, the above-described viewing angle of the rotating polygonal mirror is only the calculated maximum value, and thus, a viewing angle determined by the rotating polygonal mirror in the LiDAR device may be less than the calculated maximum value. Further, in this case, the LiDAR device may use only a portion of each of the reflective surfaces of the rotating polygonal mirror for scanning.

When a scanning unit of the LiDAR device includes a rotating polygonal mirror, the rotating polygonal mirror may be used to irradiate a laser emitted from a laser emitting unit toward a scan region of the LiDAR device, and may also be used for a detecting unit to receive the laser reflected from an object existing on the scan region.

Here, a portion of each of the reflective surfaces of the rotating polygonal mirror, which is used to irradiate the emitted laser to the scan region of the LiDAR device, will be referred to as an irradiated portion. In addition, a portion of each of the reflective surfaces of the rotating polygonal mirror, which is used for the detecting unit to receive the laser reflected from the object existing on the scan region, will be referred to as a light-receiving portion.

Figure 26:
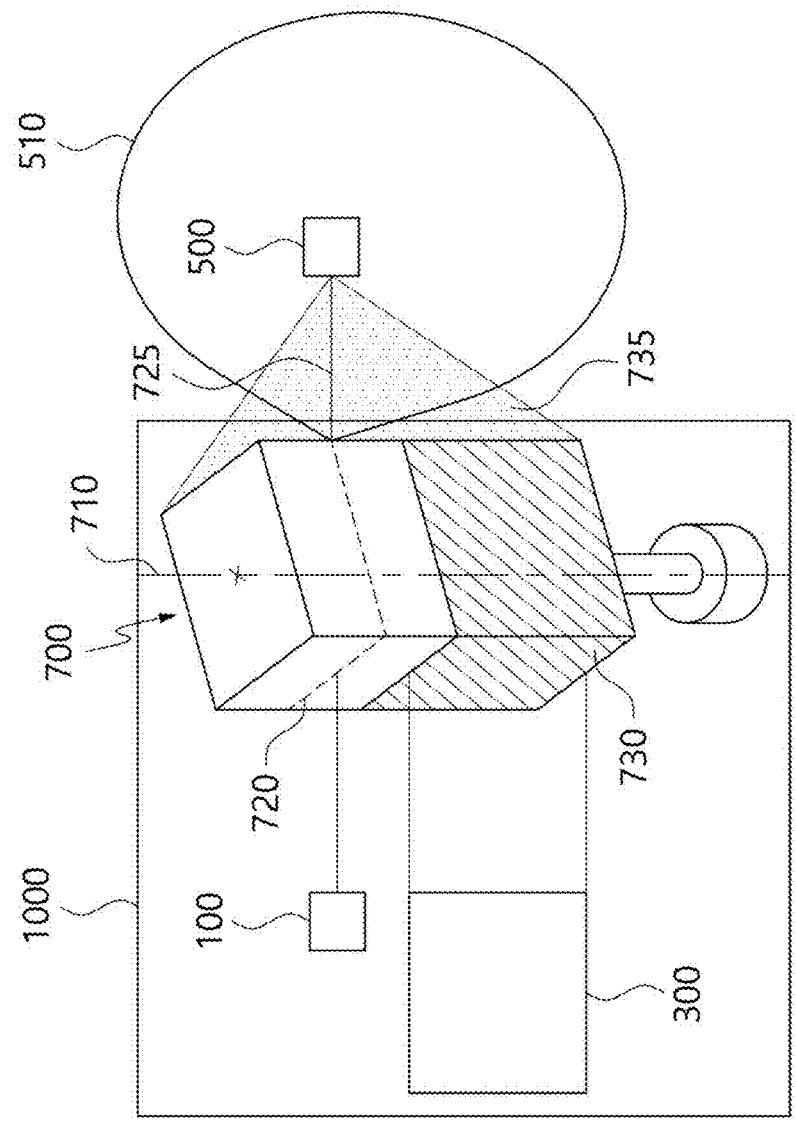
FIG. 26 is a diagram for describing an irradiated portion and a light-receiving portion of a rotating polygonal mirror according to one embodiment.

FIG. 26 is a diagram for describing an irradiated portion and a light-receiving portion of a rotating polygonal mirror according to one embodiment.

Referring to FIG. 26, a laser emitted from the laser emitting unit 100 may have a point-shaped irradiation region and may be incident on each of reflective surfaces of a rotating polygonal mirror 700. However, although not illustrated in FIG. 26, the laser emitted from the laser emitting unit 100 may have a line- or planar-shaped irradiation region.

When the laser emitted from the laser emitting unit 100 has a point-shaped irradiation region, in the rotating polygonal mirror 700, an irradiated portion 720 may have a linear shape formed by connecting a point, at which the emitted laser meets the rotating polygonal mirror, in a rotational direction of the rotating polygonal mirror. Thus, in this case, the irradiated portion 720 of the rotating polygonal mirror 700 may be positioned on each of the reflective surfaces in a linear shape in a direction perpendicular to a rotation axis 710 of the rotating polygonal mirror 700.

Further, a laser 725, which is irradiated from the irradiated portion 720 of the rotating polygonal mirror 700 and irradiated to a scan region 510 of the LiDAR device 1000, may be reflected from an object 500 existing on a scan region 510, and a laser 735 reflected from the object 500 may be reflected in a larger range than an irradiated laser 725. Thus, the laser 735 reflected from the object 500 may be parallel to the irradiated laser 725 and may be received by the LiDAR device 1000 in a wider range.

At this point, the laser 735 reflected from the object 500 may be transmitted in a larger size than the reflective surface of the rotating polygonal mirror 700. Meanwhile, a light-receiving portion 730 of the rotating polygonal mirror 700 is a portion that used for the detecting unit 300 to receive the laser 735 reflected from the object 500 and may be a portion of the reflective surface that is less in size than the reflective surface of the rotating polygonal mirror 700.

For example, as illustrated in FIG. 26, when the laser 735 reflected from the object 500 is transmitted toward the detecting unit 300 through the rotating polygonal mirror 700, a portion of the reflective surface of the rotating polygonal mirror 700, which reflects the reflected laser 735 so as to be transmitted toward the detecting unit 300, may be the light-receiving portion 730. Thus, the light-receiving portion 730 of the rotating polygonal mirror 700 may be a portion formed by extending the portion of the reflective surface, which reflects the laser 735 so as to be transmitted toward the detecting unit 300, in a rotational direction of the rotating polygonal mirror 700.

Further, when a light condensing lens is further included between the rotating polygonal mirror 700 and the detecting unit 300, the light-receiving portion 730 of the rotating polygonal mirror 700 may be a portion formed by extending the portion of the reflective surface, which reflects the laser 735 so as to be transmitted toward the light condensing lens, in the rotational direction of the rotating polygonal mirror 700.

Although it is illustrated in FIG. 26 that the irradiated portion 720 and the light-receiving portion 730 of the rotating polygonal mirror 700 are spaced apart from each other, the irradiated portion 720 and the light-receiving portion 730 of the rotating polygonal mirror 700 may partially overlap each other, and the irradiated portion 720 may be included in the light-receiving portion 730.

Further, according to one embodiment, the steering component 230 may include an optical phased array (OPA) or the like in order to change a phase of an emitted laser, and change an irradiation direction accordingly, but the present disclosure is not limited thereto.

A LiDAR device according to an embodiment may include an optic unit configured to direct a laser beam emitted from a laser emitting unit to an object.

The optic unit may include a beam collimation and steering component (BCSC) configured to collimate and steer a laser beam emitted from a laser beam output unit. The BCSC may include one component or a plurality of components.

Figure 27:
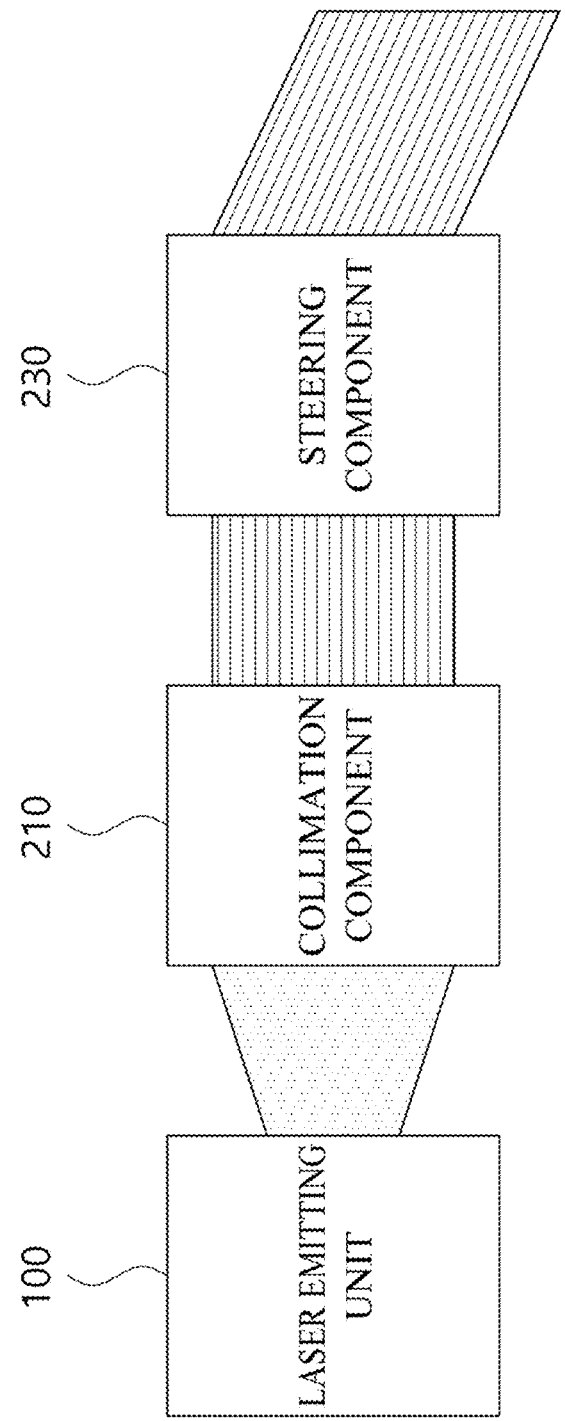
FIG. 27 is a diagram for describing an optic unit according to one embodiment.

FIG. 27 is a diagram illustrating an optic unit according to an embodiment.

Referring to FIG. 27, the optic unit according to an embodiment may include a plurality of components. For example, the optic unit may include a collimation component 210 and a steering component 230.

According to an embodiment, the collimation component 210 may serve to collimate a beam emitted from a laser emitting unit 100, and the steering component 230 may serve to steer a collimated beam emitted from the collimation component 210. As a result, the laser beam emitted from the optic unit may travel in a predetermined direction.

The collimation component 210 may be a microlens or a metasurface.

When the collimation component 210 is a microlens, a microlens array may be disposed on one side of a substrate or on both sides of a substrate.

When the collimation component 210 is a metasurface, a laser beam may be collimated by a nanopattern formed by a plurality of nanopillars included in the metasurface.

The steering component 230 may be a microlens, a microprism, or a metasurface.

When the steering component 230 is a microlens, a microlens array may be disposed on one side of a substrate or on both sides of a substrate.

When the steering component 230 is a microprism, a laser beam may be steered by the angle of the microprism.

When the steering component 230 is a metasurface, a laser beam may be steered by a nanopattern formed by a plurality of nanopillars included in the metasurface.

According to one embodiment, when the optic unit includes a plurality of components, it may be necessary to correctly arrange the plurality of components. At this point, the collimation component and the steering component may be properly disposed using an alignment mark. Further, a printed circuit board (PCB), the VCSEL array, the collimation component, and the steering component may be correctly disposed using the alignment mark.

For example, the VCSEL array and the collimation component may be correctly disposed by inserting the alignment mark into an edge portion of the VCSEL array or between the VCSEL units included in the VCSEL array.

Further, for example, the collimation component and the steering component may be correctly disposed by inserting the alignment mark into an edge portion of the collimation component or between the collimation component and the steering component.

Figure 28:
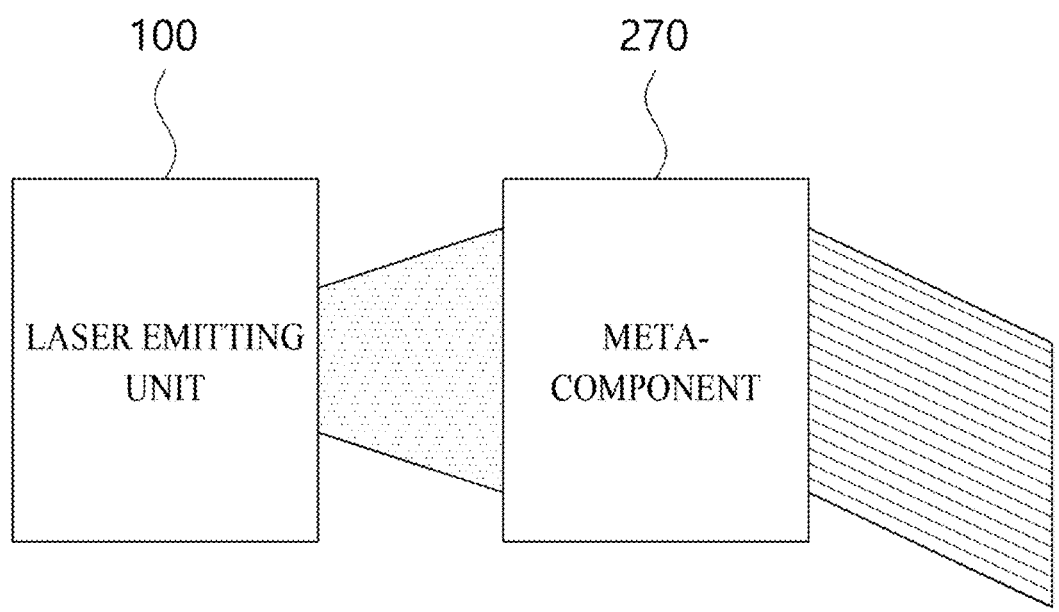
FIG. 28 is a diagram for describing an optic unit according to one embodiment.

FIG. 28 is a diagram illustrating an optic unit according to an embodiment.

Referring to FIG. 28, the optic unit according to an embodiment may include one single component. For example, the optic unit may include a meta-component 270.

According to an embodiment, the meta-component 270 may collimate or steer a laser beam emitted from a laser emitting unit 100.

For example, the meta-component 270 may include a plurality of metasurfaces. One metasurface may collimate a laser beam emitted from the laser emitting unit 100, and another metasurface may steer a collimated laser beam. This will be described in detail below with reference to FIG. 23.

Alternatively, for example, the meta-component 270 may include one metasurface, which may collimate and steer a laser beam emitted from the laser emitting unit 100. This will be described in detail below with reference to FIG. 24.

Figure 29:
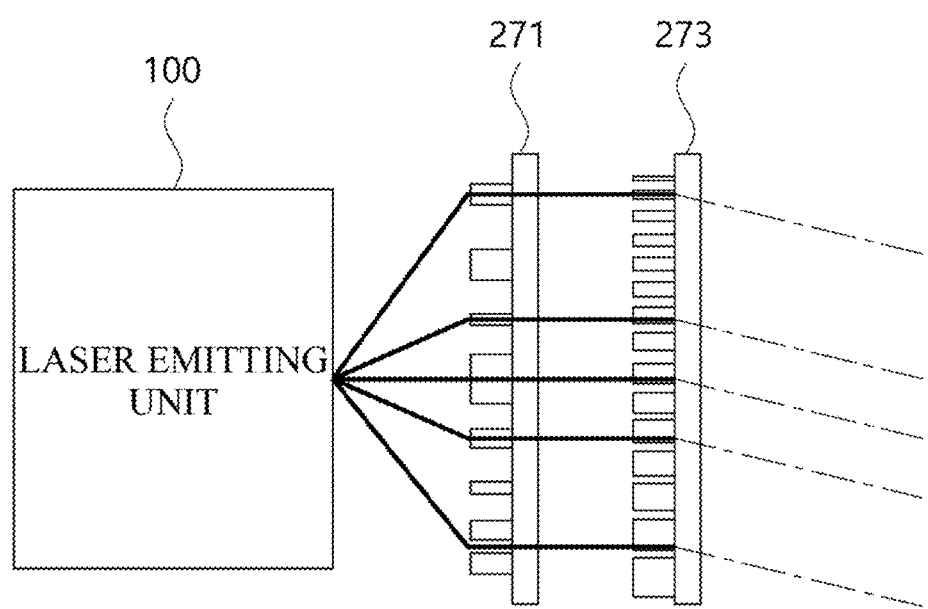
FIG. 29 is a diagram for describing a meta component according to one embodiment.

FIG. 29 is a diagram illustrating a meta-component according to an embodiment.

Referring to FIG. 29, a meta-component 270 according to an embodiment may include a plurality of metasurfaces 271 and 273. For example, the meta-component 270 may include a first metasurface 271 and a second metasurface 273.

The first metasurface 271 may be disposed in a direction in which a laser beam is emitted from a laser emitting unit 100. The first metasurface 271 may include a plurality of nanopillars. The first metasurface 271 may form a nanopattern using the plurality of nanopillars. The first metasurface 271 may utilize the formed nanopattern to collimate a laser beam emitted from the laser emitting unit 100.

The second metasurface 273 may be disposed in a direction in which a laser beam is emitted from the first metasurface 271. The second metasurface 273 may include a plurality of nanopillars. The second metasurface 273 may form a nanopattern using the plurality of nanopillars. The second metasurface 273 may steer a laser beam emitted from the laser emitting unit 100 according to the formed nanopattern. For example, as shown in FIG. 23, the second metasurface 273 may steer the laser beam in a specific direction according to a change rate of the widths W of the plurality of nanopillars. Also, the second metasurface 273 may steer the laser beam in a specific direction according to the pitches P, the heights H, and the number per unit length of nanopillars.

Figure 30:
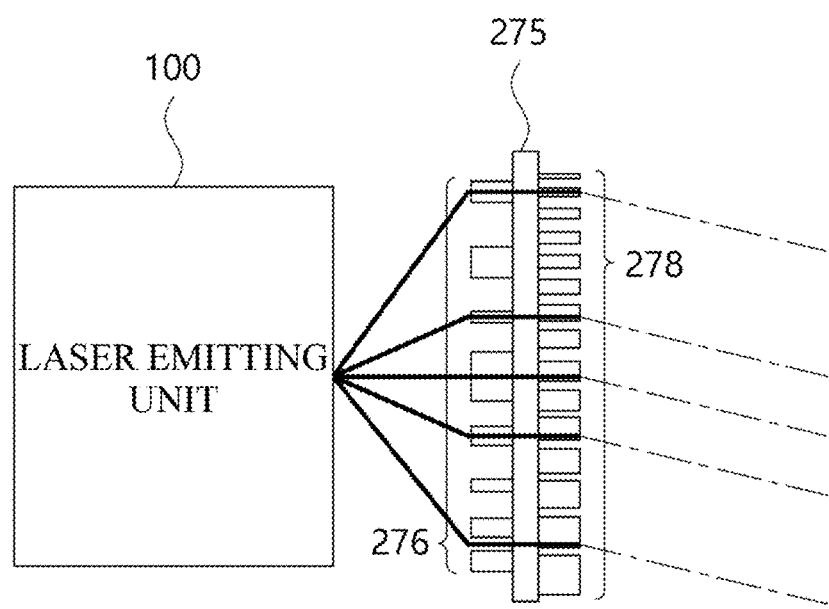
FIG. 30 is a diagram for describing a meta component according to another embodiment.

FIG. 30 is a diagram illustrating a meta-component according to another embodiment.

Referring to FIG. 30, a meta-component 270 according to an embodiment may include one metasurface 274.

The metasurface 275 may include a plurality of nanopillars on both sides. For example, the metasurface 275 may include a first nanopillar set 276 on a first side and a second nanopillar set 278 on a second side.

The metasurface 275 may collimate a laser beam emitted from a laser emitting unit 100 and then steer the collimated laser beam using a plurality of nanopillars forming a nanopattern on each of the sides.

For example, the first nanopillar set 276 disposed on one side of the metasurface 275 may form a nanopattern. A laser beam emitted from the laser emitting unit 100 may be collimated by the nanopattern formed by the first nanopillar set 276. The second nanopillar set 278 disposed on the other side of the metasurface 275 may form a nanopattern. A laser beam having passed through the first nanopillar set 276 may be steered in a specific direction by the nanopattern formed by the second nanopillar set 278.

Figure 31:
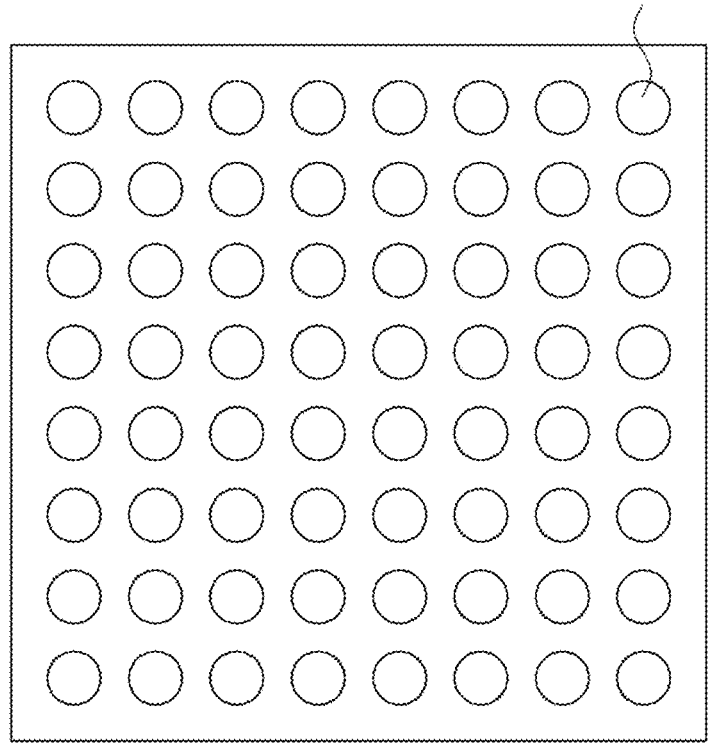
FIG. 31 is a diagram for describing a single-photon avalanche diode (SPAD) array according to one embodiment.

FIG. 31 is a diagram for describing a SPAD array according to one embodiment.

Referring to FIG. 31, the detecting unit 300 according to one embodiment may include a SPAD array 750. FIG. 31 illustrates a SPAD array in an 8×8 matrix, but the present disclosure is not limited thereto, and the SPAD array in a 10×10 matrix, a 12×12 matrix, a 24×24 matrix, a 64×64 matrix, and the like may be used.

The SPAD array 750 according to one embodiment may include a plurality of SPADs 751. For example, the plurality of SPADs 751 may be disposed in a matrix structure, but is not limited thereto, and may be disposed in a circular structure, an elliptical structure, a honeycomb structure, or the like.

When a laser beam is incident on the SPAD array 750, photons may be detected due to an avalanche phenomenon. According to one embodiment, results from the SPAD array 750 may be accumulated in the form of a histogram.

Figure 32:
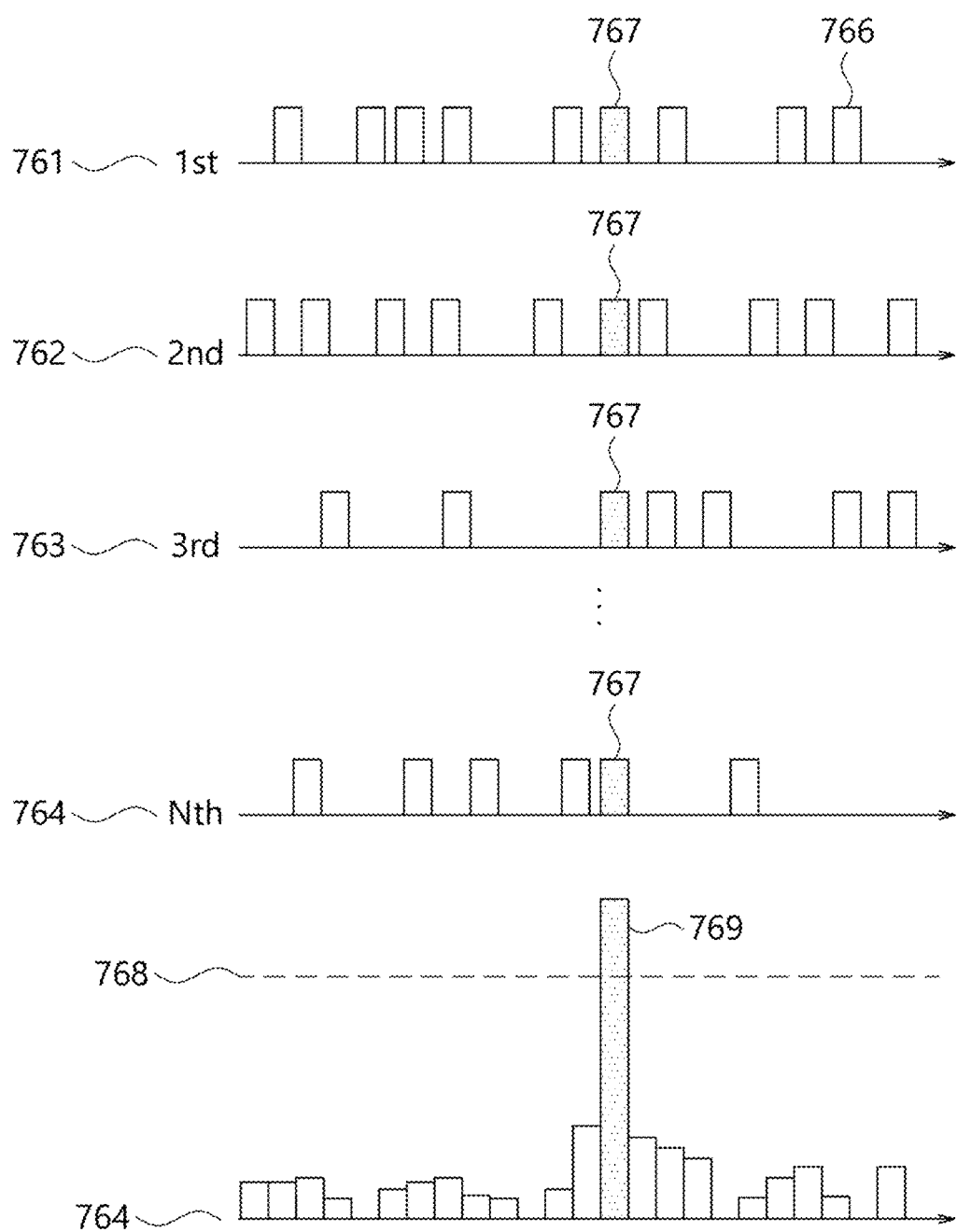
FIG. 32 is a diagram for describing a histogram for a SPAD according to one embodiment.

FIG. 32 is a diagram for describing a histogram for a SPAD according to one embodiment.

Referring to FIG. 32, the SPAD 751 according to one embodiment may detect photons. When the SPAD 751 detects photons, signals 766 and 767 may be generated.

A recovery time may be required for the SPAD 751 to return to a state capable of detecting photons again after detecting photons. When the SPAD 751 detects photons and the recovery time has not elapsed, even when photons are incident on the SPAD 751 at this time, the SPAD 751 is unable to detect the photons. Accordingly, a resolution of the SPAD 751 may be determined by the recovery time.

According to one embodiment, the SPAD 751 may detect photons for a predetermined period of time after a laser beam is emitted from a laser emitting unit. At this point, the SPAD 751 may detect photons for a cycle of predetermined time. For example, the SPAD 751 may detect photons several times according to a time resolution of the SPAD 751 during the cycle. At this point, the time resolution of the SPAD 751 may be determined by the recovery time of the SPAD 751.

According to one embodiment, the SPAD 751 may detect photons reflected from an object and other photons. For example, the SPAD 751 may generate the signal 767 when detecting the photons reflected from the object.

Further, for example, the SPAD 751 may generate the signal 766 when detecting photons other than the photons reflected from the object. In this case, the photons other than the photons reflected from the object may be sunlight, a laser beam reflected from a window, and the like.

According to one embodiment, the SPAD 751 may detect photons for a cycle of predetermined time after the laser beam is emitted from the laser emitting unit.

For example, the SPAD 751 may detect photons for a first cycle after a first laser beam is emitted from the laser emitting unit. At this point, the SPAD 751 may generate a first detection signal 761 after detecting the photons.

Further, for example, the SPAD 751 may detect photons for a second cycle after a second laser beam is emitted from the laser emitting unit. At this point, the SPAD 751 may generate a second detection signal 762 after detecting the photons.

Further, for example, the SPAD 751 may detect photons for a third cycle after a third laser beam is emitted from the laser emitting unit. At this point, the SPAD 751 may generate a third detection signal 763 after detecting the photons.

Further, for example, the SPAD 751 may detect photons for an Nth cycle after an Nth laser beam is emitted from the laser emitting unit. At this point, the SPAD 751 may generate an Nth detection signal 764 after detecting the photons.

Here, each of the first detection signal 761, the second detection signal 762, the third detection signal 763, . . . , and the Nth detection signal 764 may include the signal 767 generated by detecting photons reflected from the object or the signal 766 generated by detecting photons other than the photon reflected by the object.

In this case, the Nth detection signal 764 may be a photon detection signal generated for the Nth cycle after the Nth laser beam is emitted. For example, N may be 5, 10, 20, 30, 40, 50, 60, 70, 80, 90, 100, 200, 300, or the like.

The signals generated by the SPAD 751 may be accumulated in the form of a histogram. The histogram may have a plurality of histogram bins. The signals generated by the SPAD 751 may be accumulated in the form of a histogram to respectively correspond to the histogram bins.

For example, the histogram may be formed by accumulating signals generated by one SPAD 751, or may be formed by accumulating signals generated by the plurality of SPADs 751.

For example, a histogram 765 may be formed by accumulating the first detection signal 761, the second detection signal 762, the third detection signal 763, . . . , and the Nth detection signal 764. In this case, the histogram 765 may include a signal generated due to photons reflected from the object or a signal generated due to the other photons.

In order to obtain distance information of the object, it is necessary to extract a signal generated due to photons reflected from the object from the histogram 765. The signal generated due to the photons reflected from the object may be greater in amount and more regular than the signal generated due to the other photons.

At this point, the signal generated due to the photons reflected from the object may be regularly present at a specific time within the cycle. On the other hand, the signal generated due to sunlight may be small in amount and irregularly present.

There is a high possibility that a signal having a large accumulation amount of the histogram at a specific time is a signal generated due to photons reflected from the object. Accordingly, of the accumulated histogram 765, a signal having a large accumulation amount may be extracted as a signal generated due to photons reflected from the object.

For example, of the histogram 765, a signal having the highest value may be simply extracted as a signal generated due to photons reflected from the object. Further, for example, of the histogram 765, a signal having a value greater than or equal to a predetermined amount 768 may be extracted as a signal generated due to photons reflected from the object.

In addition to the method described above, there may be various algorithms that may extract as a signal, which is generated due to photons reflected from the object, from the histogram 765.

The signal generated due to photons reflected from the object is extracted from the histogram 765, and then, based on a generation time of the corresponding signal, a reception time of the photons, or the like, the distance information of the object may be calculated.

For example, the signal extracted from the histogram 765 may be a signal at one scan point. At this point, one scan point may correspond to one SPAD.

For another example, the signals extracted from the plurality of histograms may be signals at one scan point. At this point, one scan point may correspond to the plurality of SPADs.

According to another embodiment, the signals extracted from the plurality of histograms may be calculated as a signal at one scan point by applying weights thereto. At this point, the weights may be determined by a distance between the SPADs.

For example, a signal at a first scan point may be calculated by applying a weight of 0.8 to a signal by a first SPAD, applying a weight of 0.6 to a signal by a second SPAD, applying a weight of 0.4 to a signal by a third SPAD, and applying a weight of 0.2 to a signal by a fourth SPAD.

When the signals extracted from the plurality of histograms are calculated as a signal at one scan point by applying weights thereto, it is possible to obtain an effect of accumulating the histogram multiple times with one accumulation of the histogram. Thus, a scan time may be reduced, and an effect of reducing the time to obtain the entire image may be derived.

According to still another embodiment, the laser emitting unit may emit a laser beam to be addressable. Alternatively, the laser emitting unit may emit a laser beam to be addressable for each VCSEL unit.

For example, the laser emitting unit may emit a laser beam from a VCSEL unit in a first row and first column one time, and then emit a laser beam from a VCSEL unit in a first row and third column one time, and then emit a laser beam from a VCSEL unit in a second row and fourth column one time. As described above, the laser emitting unit may emit a laser beam from a VCSEL unit in an Ath row and Bth column N times, and then emit a laser beam from a VCSEL unit of a Cth row and Dth column M times.

At this point, the SPAD array may receive, among the laser beam emitted from the corresponding VCSEL unit, the laser beam reflected from the object.

For example, when the VCSEL unit in the first row and first column emits the laser beam N times in a sequence of emitting the laser beam by the laser emitting unit, a SPAD unit in a first row and first column corresponding to the first row and first column may receive the laser beam reflected from the object up to N times.

Further, for example, when the reflected laser beam should be accumulated N times in the histogram of the SPAD, and there are M VCSEL units in the laser emitting unit, it is possible to operate the M VCSEL units N times at once. Alternatively, it is possible to operate M VCSEL units one by one M*N times, and it is also possible to operate M VCSEL units for every five VCSEL units M*N/5 times.

Figure 33:
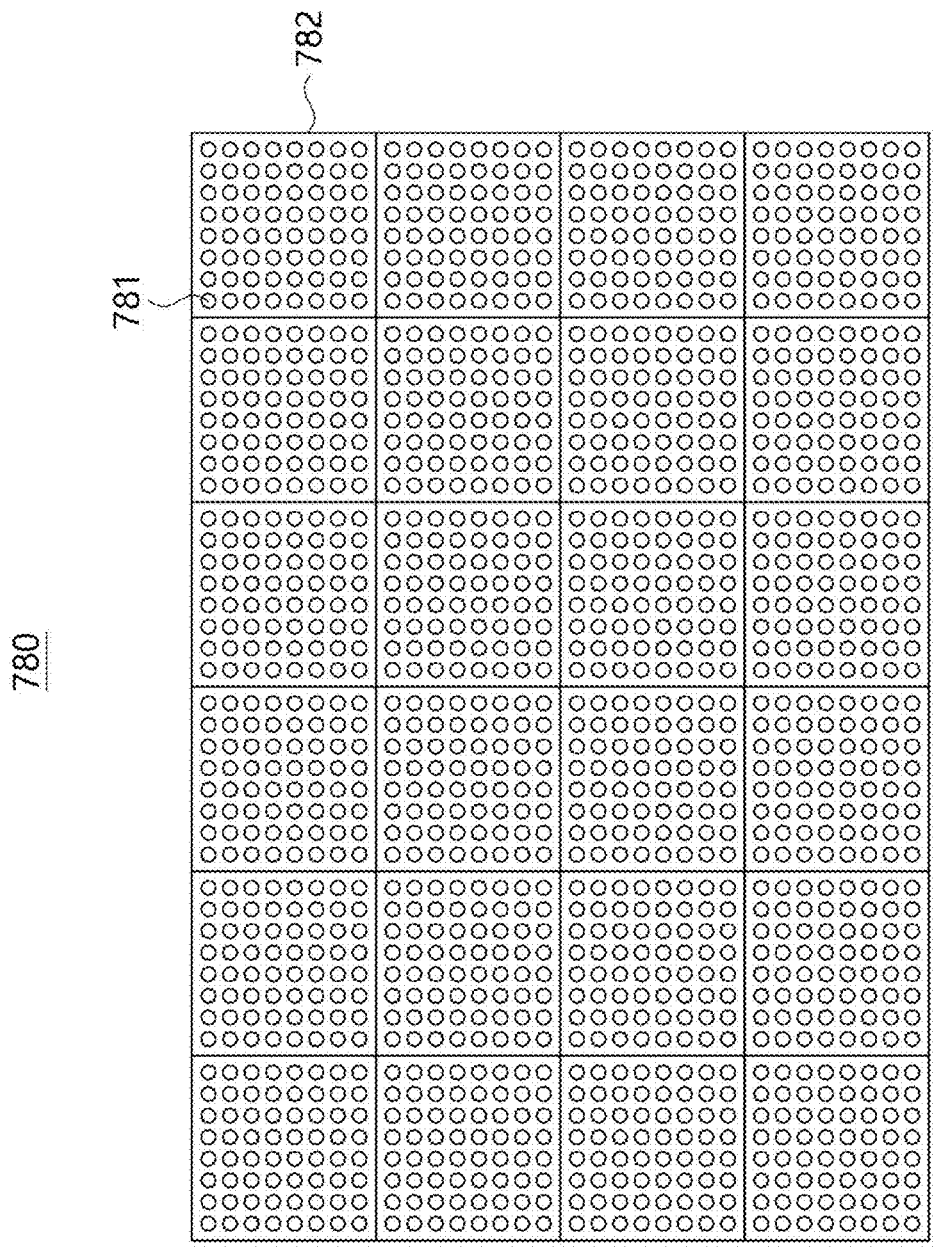
FIG. 33 is a diagram for describing silicon photomultipliers (SiPM) according to one embodiment.

FIG. 33 is a diagram for describing a SiPM according to one embodiment.

Referring to FIG. 33, the detecting unit 300 according to one embodiment may include a SiPM 780. The SiPM 780 according to one embodiment may include a plurality of microcells 781 and a plurality of microcell units 782. For example, each of the microcells may be a SPAD. For example, each of the microcell units 782 may be a SPAD array, which is a set of a plurality of SPADs.

The SiPM 780 according to one embodiment may include the plurality of microcell units 782. In FIG. 33, the SiPM 780 is illustrated as being formed by the microcell units 782 disposed in a 4×6 matrix, but is not limited thereto, and may be formed by the microcell units 782 disposed in a 10×10, 12×12, 24×24, or 64×64 matrix. Further, although the microcell units 782 may be disposed in a matrix structure, the present disclosure is not limited thereto, and the microcell units 782 may be disposed in a circular structure, an elliptical structure, a honeycomb structure, or the like.

When a laser beam is incident on the SiPM 780, photons may be detected due to an avalanche phenomenon. According to one embodiment, results from the SiPM 780 may be accumulated in the form of a histogram.

There are several differences between the histogram by the SiPM 780 and the histogram by the SPAD 751.

As described above, the histogram by the SPAD 751 may be formed by accumulating N detection signals formed by receiving the laser beam N times by one SPAD 751. In addition, the histogram by the SPAD 751 may be formed by accumulating X*Y detection signals formed by receiving the laser beam Y times by X SPADs 751.

On the other hand, the histogram by the SiPM 780 may be formed by accumulating signals generated by one microcell units 782, or may be formed by accumulating signals generated by the plurality of microcell units 782.

According to one embodiment, one microcell unit 782 may form a histogram by detecting photons reflected from the object after a first laser beam is emitted from the laser emitting unit.

For example, the histogram by the SiPM 780 may be formed by accumulating signals generated by detecting photons, which are reflected from the object, by the plurality of microcells included in one microcell unit 782.

According to another embodiment, the plurality of microcell units 782 may form a histogram by detecting photons reflected from the object after a first laser beam is emitted from the laser emitting unit.

For example, the histogram by the SiPM 780 may be formed by accumulating signals generated by detecting photons, which are reflected from the object, by the plurality of microcells included in the plurality of microcell units 782.

In the histogram by the SPAD 751, one SPAD 751 or a plurality of SPADs 751 requires that the laser emitting unit emits the laser beam N times. However, in the histogram formed by the SiPM 780, one microcell unit 782 or the plurality of microcell units 782 require that the laser emitting unit emits the laser beam only one time.

Accordingly, the time to accumulate the histogram may take longer in the histogram by the SPAD 751 than in the histogram by the SiPM 780. The histogram by the SiPM 780 is advantageous in that the histogram may be quickly formed with only one laser beam emission.

Figure 34:
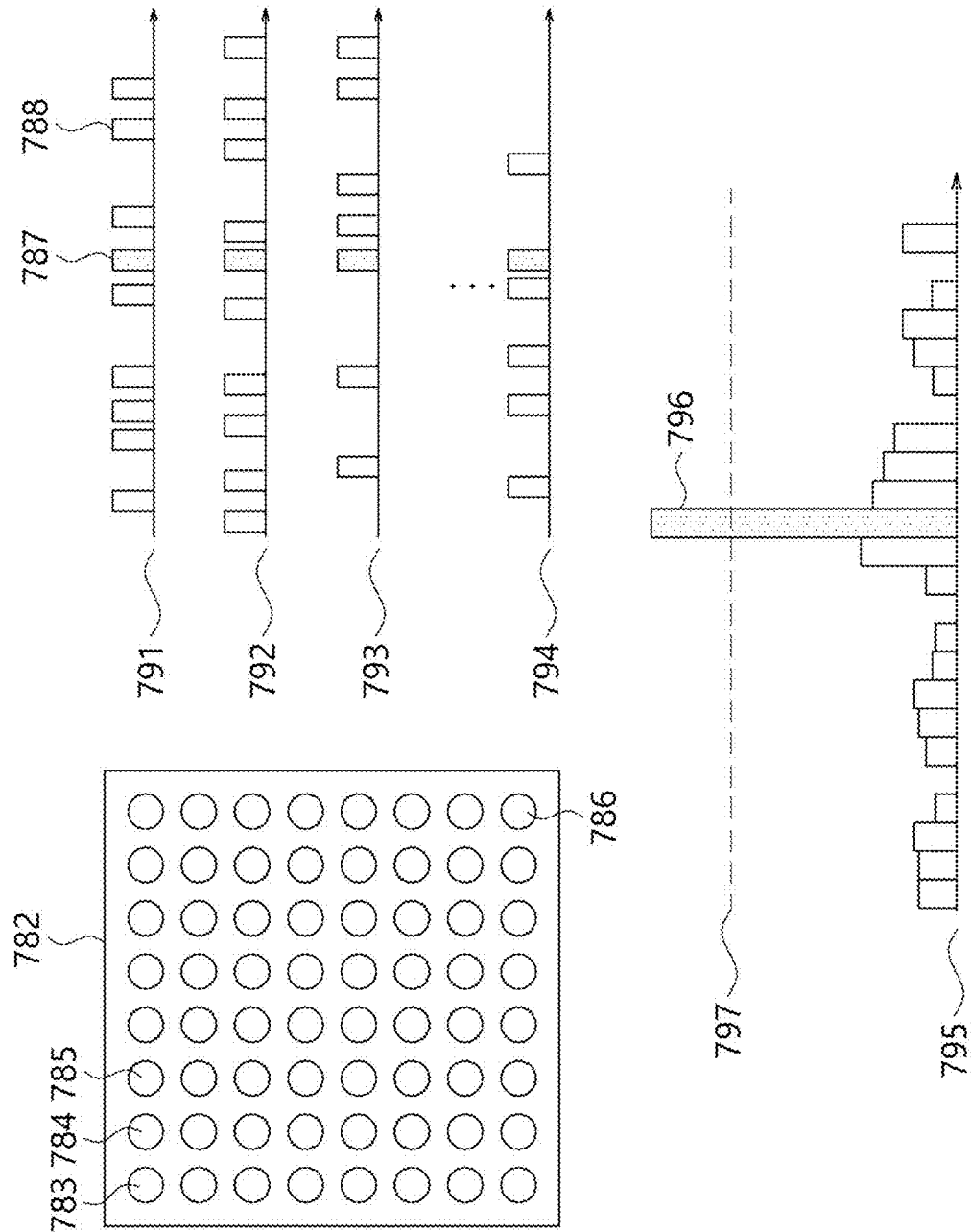
FIG. 34 is a diagram for describing a histogram of a SiPM according to one embodiment.

FIG. 34 is a diagram for describing a histogram of a SiPM according to one embodiment.

Referring to FIG. 34, the SiPM 780 according to one embodiment may detect photons. For example, the microcell unit 782 may detect photons. When the microcell unit 782 detects photons, signals 787 and 788 may be generated.

A recovery time may be required for the microcell unit 782 to return to a state capable of detecting photons again after detecting photons. When the microcell unit 782 detects photons and the recovery time has not elapsed, even when photons are incident on the microcell unit 782 at this time, the microcell unit 782 is unable to detect photons. Accordingly, a resolution of the microcell unit 782 may be determined by the recovery time.

According to one embodiment, the microcell unit 782 may detect photons for a predetermined period of time after the laser beam is emitted from the laser emitting unit. At this point, the microcell unit 782 may detect photons for a cycle of predetermined time. For example, the microcell unit 782 may detect photons several times according to a time resolution of the microcell unit 782 during the cycle. At this point, the time resolution of the microcell unit 782 may be determined by the recovery time of the microcell unit 782.

According to one embodiment, the microcell unit 782 may detect photons reflected from an object and other photons. For example, the microcell unit 782 may generate the signal 787 when detecting the photons reflected from the object.

Further, for example, the microcell unit 782 may generate the signal 788 when detecting photons other than the photons reflected from the object. In this case, the photons other than the photons reflected from the object may be sunlight, a laser beam reflected from a window, and the like.

According to one embodiment, the microcell unit 782 may detect photons for a cycle of predetermined time after the laser beam is emitted from the laser emitting unit.

For example, a first microcell 783 included in the microcell unit 782 may detect photons for a first cycle after a laser beam is emitted from the laser emitting unit. At this point, the first microcell 783 may generate a first detection signal 791 after detecting the photons.

Further, for example, a second microcell 784 included in the microcell unit 782 may detect photons for a first cycle after a laser beam is emitted from the laser emitting unit. At this point, the second microcell 784 may generate a second detection signal 792 after detecting the photons.

Further, for example, a third microcell 785 included in the microcell unit 782 may detect photons for a first cycle after a laser beam is emitted from the laser emitting unit. At this point, the third microcell 785 may generate a third detection signal 793 after detecting the photons.

Further, for example, an Nth microcell 786 included in the microcell unit 782 may detect photons for a first cycle after a laser beam is emitted from the laser emitting unit. At this point, the Nth microcell 786 may generate an Nth detection signal 794 after detecting the photons.

Here, each of the first detection signal 791, the second detection signal 792, the third detection signal 793, . . . , and the Nth detection signal 794 may include the signal 787 generated by detecting photons reflected from the object or the signal 788 generated by detecting photons other than the photon reflected by the object.

Here, the Nth detection signal 764 may be a photon detection signal of the Nth microcell included in the microcell unit 782. For example, N may be 5, 10, 20, 30, 40, 50, 60, 70, 80, 90, 100, 200, 300, or the like.

The signals generated by the microcells may be accumulated in the form of a histogram. The histogram may have a plurality of histogram bins. The signals generated by the microcells may be accumulated in the form of a histogram to respectively correspond to the histogram bins.

For example, the histogram may be formed by accumulating signals generated by one microcell units 782, or may be formed by accumulating signals generated by the plurality of microcell units 782.

For example, a histogram 795 may be formed by accumulating the first detection signal 791, the second detection signal 792, the third detection signal 793, . . . , and the Nth detection signal 794. In this case, the histogram 795 may include a signal generated due to photons reflected from the object or a signal generated due to the other photons.

In order to obtain distance information of the object, it is necessary to extract a signal generated due to photons reflected from the object from the histogram 795. The signal generated due to the photons reflected from the object may be greater in amount and more regular than the signal generated due to the other photons.

At this point, the signal generated due to the photons reflected from the object may be regularly present at a specific time within the cycle. On the other hand, the signal generated due to sunlight may be small in amount and irregularly present.

There is a high possibility that a signal having a large accumulation amount of the histogram at a specific time is a signal generated due to photons reflected from the object. Accordingly, of the accumulated histogram 795, a signal having a large accumulation amount may be extracted as a signal generated due to photons reflected from the object.

For example, of the histogram 795, a signal having the highest value may be simply extracted as a signal generated due to photons reflected from the object. Further, for example, of the histogram 795, a signal having a value greater than or equal to a predetermined amount 797 may be extracted as a signal generated due to photons reflected from the object.

In addition to the method described above, there may be various algorithms that may extract signals generated due to photons reflected from the object from the histogram 795.

The signal generated due to photons reflected from the object is extracted from the histogram 795, and then, based on a generation time of the corresponding signal, a reception time of the photons, or the like, the distance information of the object may be calculated.

According to still another embodiment, the laser emitting unit may emit a laser beam to be addressable. Alternatively, the laser emitting unit may emit a laser beam to be addressable for each VCSEL unit.

For example, the laser emitting unit may emit a laser beam from a VCSEL unit in a first row and first column one time, and then emit a laser beam from a VCSEL unit in a first row and third column one time, and then emit a laser beam from a VCSEL unit in a second row and fourth column one time. As described above, the laser emitting unit may emit a laser beam from a VCSEL unit in an Ath row and Bth column N times, and then emit a laser beam from a VCSEL unit of a Cth row and Dth column M times.

At this point, the SiPM may receive, among the laser beam emitted from the corresponding VCSEL unit, the laser beam reflected from the object.

For example, when the VCSEL unit in the first row and first column emits the laser beam N times in a sequence of emitting the laser beam by the laser emitting unit, a microcell unit in a first row and first column corresponding to the first row and first column of the VCSEL unit may receive the laser beam reflected from the object up to N times.

Further, for example, when the reflected laser beam should be accumulated N times in the histogram for the SiPM, and there are M VCSEL units in the laser emitting unit, it is possible to operate the M VCSEL units N times at once. Alternatively, it is possible to operate M VCSEL units one by one M*N times, and it is also possible to operate M VCSEL units for every five VCSEL units M*N/5 times.

The LiDAR may be implemented in various methods. For example, the LiDAR may be implemented using a flash method and a scanning method.

As described above, the flash method is a method using a laser beam that spreads toward an object through the divergence of the laser beam. In the flash method, since distance information of the object may be collected by illuminating a single laser pulse on an FOV, a resolution of a flash LiDAR may be determined by a detecting unit or a reception unit.

Further, as described above, the scanning method is a method of directing a laser beam emitted from a laser emitting unit in a specific direction. In the scanning method, since a laser beam is illuminated on a FOV using a scanner or a steering unit, a resolution of a scanning LiDAR may be determined by the scanner or the steering unit.

According to one embodiment, the LiDAR may be implemented in a mixed method of the flash method and the scanning method. In this case, the mixed method of the flash method and the scanning method may be a semi-flash method or a semi-scanning method. Alternatively, the mixed method of the flash method and the scanning method may be a quasi-flash method or a quasi-scanning method.

The semi-flash LiDAR or the quasi-flash LiDAR may refer to a similar-flash LiDAR rather than a full-flash LiDAR. For example, one unit of the laser emitting unit and one unit of the reception unit may operate in a flash LiDAR, but a plurality of units of the laser emitting unit and a plurality of units of the reception unit may be combined to operate as a similar-flash LiDAR rather than a full-flash LiDAR.

Further, for example, since a laser beam emitted from the laser emitting unit of either the semi-flash LiDAR or the quasi-flash LiDAR may pass through the steering unit, the semi-flash LiDAR or the quasi-flash LiDAR may be a similar-flash LiDAR rather than a full-flash LiDAR.

The semi-flash LiDAR or the quasi-flash LiDAR may overcome the disadvantage of the flash LiDAR. For example, there are problems in the flash LiDAR, such as, it is susceptible to an interference phenomenon between laser beams, a strong flash may be required to detect an object, and a detection range may not be limited.

However, since the laser beams pass through the steering unit, the semi-flash LiDAR or the quasi-flash LiDAR may overcome the interference phenomenon between the laser beams and control each laser emitting unit, so that the detection range may be controlled and the strong flash may not be required.

Figure 35:
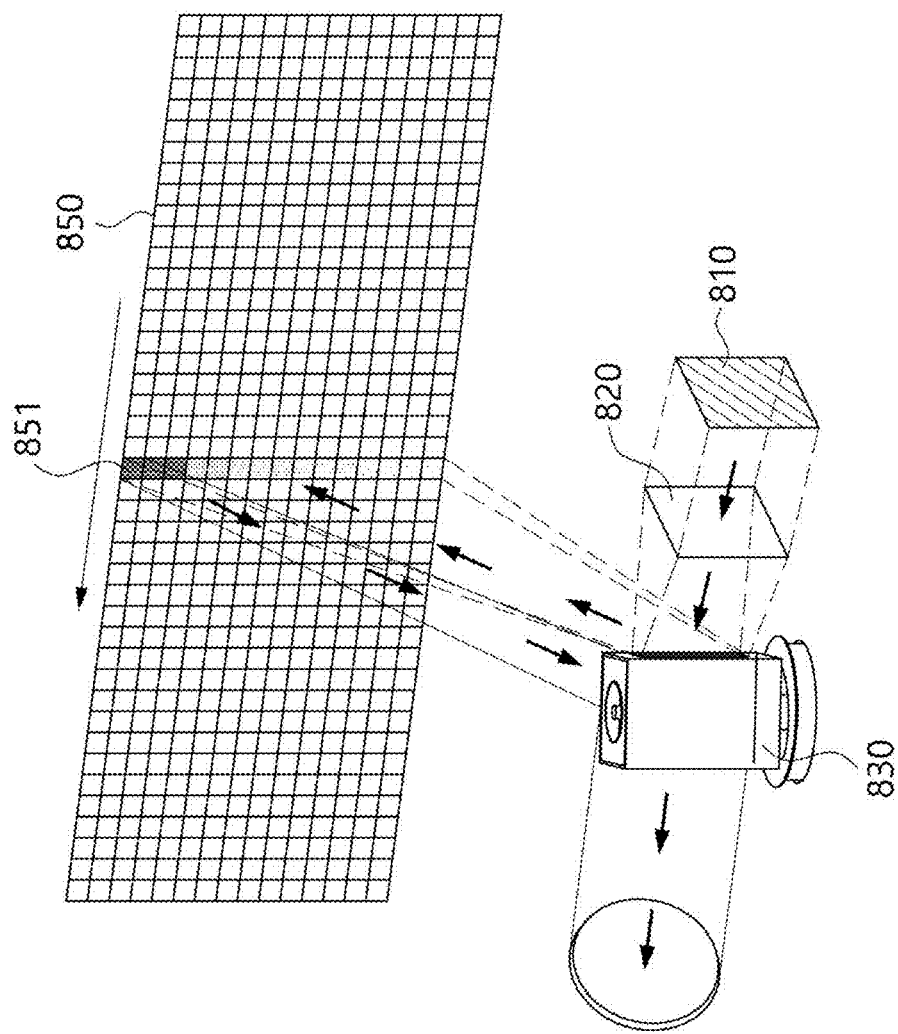
FIG. 35 is a diagram for describing a semi-flash LiDAR according to one embodiment.

FIG. 35 is a diagram for describing a semi-flash LiDAR according to one embodiment.

Referring to FIG. 35, a semi-flash LiDAR 800 according to one embodiment may include a laser emitting unit 810, a BCSC 820, a scanning unit 830, and a reception unit 840.

The semi-flash LiDAR 800 according to one embodiment may include the laser emitting unit 810. For example, the laser emitting unit 810 may include a VCSEL array. At this point, the laser emitting unit 810 may include a VCSEL array composed of units each including a plurality of VCSEL emitters.

The semi-flash LiDAR 800 according to one embodiment may include the BCSC 820. For example, the BCSC 820 may include a collimation component 210 and a steering component 230.

According to one embodiment, a laser beam emitted from the laser emitting unit 810 is collimated by the collimation component 210 of the BCSC 820, and the collimated laser beam may be steered through the steering component 230 of the BCSC 820.

For example, a laser beam emitted from a first VCSEL unit included in the laser emitting unit 810 may be collimated by a first collimation component and may be steered in a first direction by a first steering component.

For example, a laser beam emitted from a second VCSEL unit included in the laser emitting unit 810 may be collimated by a second collimation component, and may be steered in a second direction by a second steering component.

At this point, the VCSEL units included in the laser emitting unit 810 may be steered in different directions. Accordingly, unlike the flash method using the divergence of a single pulse, the laser beam of the laser emitting unit of the semi-flash LiDAR may be steered in a specific direction by the BCSC. Thus, the laser beam emitted from the laser emitting unit of the semi-flash LiDAR may have directionality due to the BCSC.

The semi-flash LiDAR 800 according to one embodiment may include the scanning unit 830. For example, the scanning unit 830 may include an optic unit 200. For example, the scanning unit 830 may include a mirror that reflects a laser beam.

For example, the scanning unit 830 may include a planar mirror, a polygonal mirror, a resonant mirror, a MEMS mirror, and a galvano mirror. Further, for example, the scanning unit 830 may include a polygonal mirror that rotates 360 degrees about one axis, and a nodding mirror that is repeatedly driven in a predetermined range about one axis.

The semi-flash LiDAR may include a scanning unit. Thus, unlike the flash method in which the entire image is obtained at once due to the divergence of a single pulse, the semi-flash LiDAR may scan an image of an object using the scanning unit.

In addition, the object may be randomly scanned by the laser emitted from the laser emitting unit of the semi-flash LiDAR. Thus, of the entire FOV, the semi-flash LiDAR may intensively scan only a desired region of interest.

The semi-flash LiDAR 800 according to one embodiment may include the reception unit 840. For example, the reception unit 840 may include a detecting unit 300. Further, for example, the reception unit 840 may be the SPAD array 750. Also, for example, the reception unit 840 may be the SiPM 780.

The reception unit 840 may include various sensor elements. For example, the reception unit 840 may include a PN photodiode, a phototransistor, a PIN photodiode, an avalanche photodiode (APD), a single-photon avalanche diode (SPAD), silicon photomultipliers (SiPM), a time-to-digital converter (TDC), a complementary metal-oxide-semiconductor (CMOS), a charge-coupled device (CCD), or the like, but the present disclosure is not limited thereto. At this point, the reception unit 840 may cause a histogram to be accumulated. For example, the reception unit 840 may detect a time point, at which a laser beam reflected from an object 850 is received, using the histogram.

The reception unit 840 according to one embodiment may include one or more optical elements. For example, the reception unit 840 may include an aperture, a microlens, a converging lens, a diffuser, or the like, but the present disclosure is not limited thereto.

Further, the reception unit 840 according to one embodiment may include one or more optical filters. The reception unit 840 may receive a laser reflected from an object through the optical filter. For example, the reception unit 840 may include a band-pass filter, a dichroic filter, a guided-mode resonance filter, a polarizer, a wedge filter, or the like, but the present disclosure is not limited thereto.

According to one embodiment, the semi-flash LiDAR 800 may have a predetermined light path between the components.

For example, light emitted from the laser emitting unit 810 may be incident on the scanning unit 830 through the BCSC 820. Further, the light incident on the scanning unit 830 may be reflected from the scanning unit 830 and incident on the object 850. Further, the light incident on the object 850 may be reflected from the object 850 and incident on the scanning unit 830 again. Further, the light incident on the scanning unit 830 may be reflected from scanning unit 830 and received by the reception unit 840. A lens for increasing light-transmitting/receiving efficiency may be additionally inserted into the above-described light path.

Figure 36:
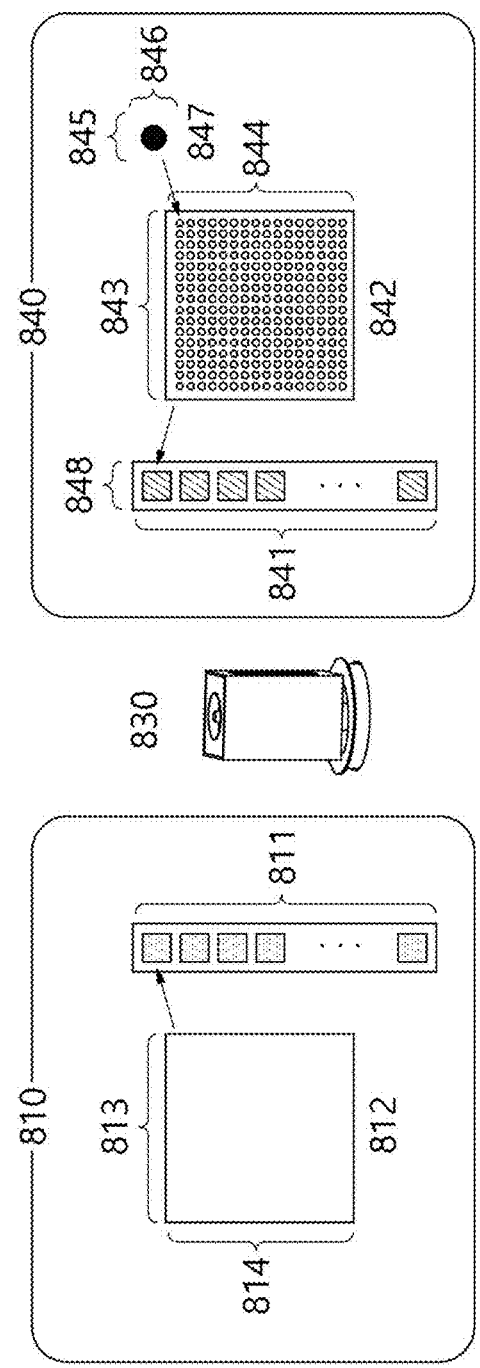
FIG. 36 is a diagram for describing a configuration of the semi-flash LiDAR according to one embodiment.

FIG. 36 is a diagram for describing a configuration of the semi-flash LiDAR according to one embodiment.

Referring to FIG. 36, the semi-flash LiDAR 800 according to one embodiment may include the laser emitting unit 810, the scanning unit 830, and the reception unit 840.

According to one embodiment, the laser emitting unit 810 may include a VCSEL array 811. Only one column of the VCSEL array 811 is shown in FIG. 36, but the present disclosure is not limited thereto, and the VCSEL array 811 may be formed in an N*M matrix structure.

According to one embodiment, the VCSEL array 811 may include a plurality of VCSEL units 812. Here, each of the VCSEL units 812 may include a plurality of VCSEL emitters. For example, the VCSEL array 811 may include 25 VCSEL units 812. In this case, the 25 VCSEL units 812 may be arranged in one column, but the present disclosure is not limited thereto.

According to one embodiment, each of the VCSEL units 812 may have a divergence angle. For example, the VCSEL unit 812 may have a horizontal divergence angle 813 and a vertical divergence angle 814. For example, the VCSEL unit 812 may have the horizontal divergence angle 813 of 1.2 degrees and the vertical divergence angle 814 of 1.2 degrees, but the present disclosure is not limited thereto.

According to one embodiment, the scanning unit 830 may receive a laser beam emitted from the laser emitting unit 810. At this point, the scanning unit 830 may reflect the laser beam toward an object. In addition, the scanning unit 830 may receive a laser beam reflected from the object. At this point, the scanning unit 830 may transmit the laser beam reflected from the object to the reception unit 840.

In this case, a region from which the laser beam is reflected toward the object and a region to which the laser beam reflected from the object is received may be the same or different. For example, the region from which the laser beam is reflected toward the object and the region to which the laser beam reflected from the object is received may be in the same reflective surface. In this case, the regions may be divided into upper and lower portions or left and right portions within the same reflective surface.

Further, for example, the region from which the laser beam is reflected toward the object and the region to which the laser beam reflected from the object is received may be different reflective surfaces. For example, the region from which the laser beam is reflected toward the object may be a first reflective surface of the scanning unit 830, and the region to which the laser beam reflected from the object is received may be a second reflective surface of the scanning unit 830.

According to one embodiment, the scanning unit 830 may reflect a 2D laser beam emitted from the laser emitting unit 810 toward the object. At this point, as the scanning unit 830 rotates or scans, the LiDAR device may three-dimensionally scan the object.

According to one embodiment, the reception unit 840 may include a SPAD array 841. Only one column of the SPAD array 841 is shown in FIG. 36, but the present disclosure is not limited thereto, and the SPAD array 841 may be formed in an N*M matrix structure.

According to one embodiment, the SPAD array 841 may include a plurality of SPAD units 842. At this point, each of the SPAD units 842 may include a plurality of SPAD pixels 847. For example, each of the SPAD units 842 may include 12×12 SPAD pixels 847. In this case, each of the SPAD pixels 847 may refer to one SPAD element, but the present disclosure is not limited thereto.

Further, for example, the SPAD array 841 may include 25 SPAD units 842. In this case, the 25 SPAD units 842 may be arranged in one column, but the present disclosure is not limited thereto. Further, in this case, the arrangement of the SPAD units 842 may correspond to the arrangement of the VCSEL units 812.

According to one embodiment, each of the SPAD units 842 may have an FOV at which light may be received. For example, the SPAD unit 842 may have a horizontal FOV 843 and a vertical FOV 844. For example, the SPAD unit 842 may have the horizontal FOV 843 of 1.2 degrees and the vertical FOV 844 of 1.2 degrees.

At this point, the FOV of the SPAD unit 842 may be proportional to the number of SPAD pixels 847 included in the SPAD unit 842. Alternatively, an FOV of the individual SPAD pixel 847 included in the SPAD unit 842 may be determined by the FOV of the SPAD unit 842.

For example, in a case in which each of a horizontal FOV 845 and a vertical FOV 846 of the individual SPAD pixel 847 is 0.1 degrees, when the SPAD unit 842 includes N*M SPAD pixels 847, the horizontal FOV 843 and the vertical FOV 844 of the SPAD unit 842 may be 0.1*N and 0.1*M, respectively.

Further, for example, in a case in which each of the horizontal FOV 843 and the vertical FOV 844 of the SPAD unit 842 is 1.2 degrees, when the SPAD unit 842 includes 12×12 SPAD pixels 847, the horizontal FOV 845 and the vertical FOV 846 of the individual SPAD pixel 847 may each be 0.1 degrees (=1.2/12).

According to another embodiment, the reception unit 840 may include a SiPM array 841. Only one column of the SiPM array 841 is shown in FIG. 36, but the present disclosure is not limited thereto, and the SiPM array 841 may be formed in an N*M matrix structure.

According to one embodiment, the SiPM array 841 may include a plurality of microcell units 842. Here, each of the microcell units 842 may include a plurality of microcells 847. For example, each of the microcell units 842 may include 12×12 microcells 847.

Further, for example, the SiPM array 841 may include 25 microcell units 842. In this case, the 25 microcell units 842 may be arranged in one column, but the present disclosure is not limited thereto. Further, in this case, the arrangement of the microcell units 842 may correspond to the arrangement of the VCSEL units 812.

According to one embodiment, each of the microcell units 842 may have an FOV at which light may be received. For example, the microcell unit 842 may have the horizontal FOV 843 and the vertical FOV 844. For example, the microcell unit 842 may have the horizontal FOV 843 of 1.2 degrees and the vertical FOV 844 of 1.2 degrees.

Here, the FOV of the microcell unit 842 may be proportional to the number of microcells included in the microcell unit 842. Alternatively, an FOV of the individual microcell 847 included in the microcell unit 842 may be determined by the FOV of the microcell unit 842.

For example, in a case in which each of the horizontal FOV 845 and the vertical FOV 846 of the individual microcell 847 is 0.1 degrees, when the microcell unit 842 includes N*M microcells 847, the horizontal FOV 843 and the vertical FOV 844 of the microcell unit 842 may be 0.1*N and 0.1*M, respectively.

Further, for example, in a case in which each of the horizontal FOV 843 and the vertical FOV 844 of the microcell unit 842 is 1.2 degrees, when the microcell unit 842 includes 12×12 microcells 847, the horizontal FOV 845 and the vertical FOV 846 of the individual microcell 847 may each be 0.1 degrees (=1.2/12).

According to another embodiment, one VCSEL unit 812 may correspond to the plurality of SPAD units or microcell units 842. For example, a laser beam emitted from the VCSEL unit 812 in a first row and first column may be reflected from the scanning unit 830 and the object 850 and received by the SPAD units or microcell units 842 in the first row and first column and a first row and second column.

According to still another embodiment, the plurality of VCSEL units 812 may correspond to one SPAD unit or microcell unit 842. For example, a laser beam emitted from the VCSEL unit 812 in the first row and first column may be reflected from the scanning unit 830 and the object 850 and received by the SPAD unit or microcell unit 842 in the first row and first column.

According to one embodiment, the VCSEL unit 812 of the laser emitting unit 810 may correspond to the SPAD unit or microcell unit 842 of the reception unit 840.

For example, the horizontal divergence angle and the vertical divergence angle of the VCSEL units 812 may be respectively identical to the horizontal FOV 845 and the vertical FOV 846 of the SPAD unit or microcell unit 842.

For example, the laser beam emitted from the VCSEL unit 812 in the first row and first column may be reflected from the scanning unit 830 and the object 850 and received by the SPAD unit or microcell unit 842 in the first row and first column.

Further, for example, a laser beam emitted from the VCSEL unit 812 in an Nth row and Mth column may be reflected from the scanning unit 830 and the object 850 and received by the SPAD unit or microcell unit 842 in the Nth row and Mth column.

At this point, the laser, which is emitted from the VCSEL unit 812 in the Nth row and Mth column and reflected from the scanning unit 830 and the object 850, may be received by the SPAD unit or microcell unit 842 in the Nth row and Mth column, and the LiDAR device 800 may have a resolution by the SPAD unit or microcell unit 842.

For example, when the SPAD unit or microcell unit 842 includes SPAD pixels or microcells 847 of N rows*M columns, the VCSEL unit 812 may recognize distance information of the object by dividing the FOV, at which light is irradiated, into N*M regions.

According to another embodiment, one VCSEL unit 812 may correspond to the plurality of SPAD units or microcell units 842. For example, a laser beam emitted from the VCSEL unit 812 in a first row and first column may be reflected from the scanning unit 830 and the object 850 and received by the SPAD units or microcell units 842 in the first row and first column and a first row and second column.

According to still another embodiment, the plurality of VCSEL units 812 may correspond to one SPAD unit or microcell unit 842. For example, the laser beam emitted from the VCSEL unit 812 in the first row and first column may be reflected from the scanning unit 830 and the object 850 and received by the SPAD unit or microcell unit 842 in the first row and first column.

According to one embodiment, the plurality of VCSEL units 812 included in the laser emitting unit 810 may operate according to a predetermined sequence or may operate randomly. At this point, the SPAD unit or microcell unit 842 of the reception unit 840 may also operate corresponding to the operation of the VCSEL unit 812.

For example, in the VCSEL array 811, the VCSEL unit in a third row may operate after the VCSEL unit in a first row operates. Thereafter, the VCSEL unit in a fifth row may operate, and then the VCSEL unit in a seventh row may operate.

In this case, in the reception unit 840, the SPAD unit or microcell unit 842 in a third row may operate after the SPAD unit or microcell unit 842 in a first row operates. Thereafter, the SPAD unit or microcell unit 842 in a fifth row may operate, and then the SPAD unit or microcell unit 842 in a seventh row may operate.

Further, for example, the VCSEL units of the VCSEL array 811 may operate randomly. At this point, the SPAD unit or microcell unit 842 of the reception unit, which is present at a position corresponding to the position of the randomly operating VCSEL unit 812, may operate.

Figure 37:
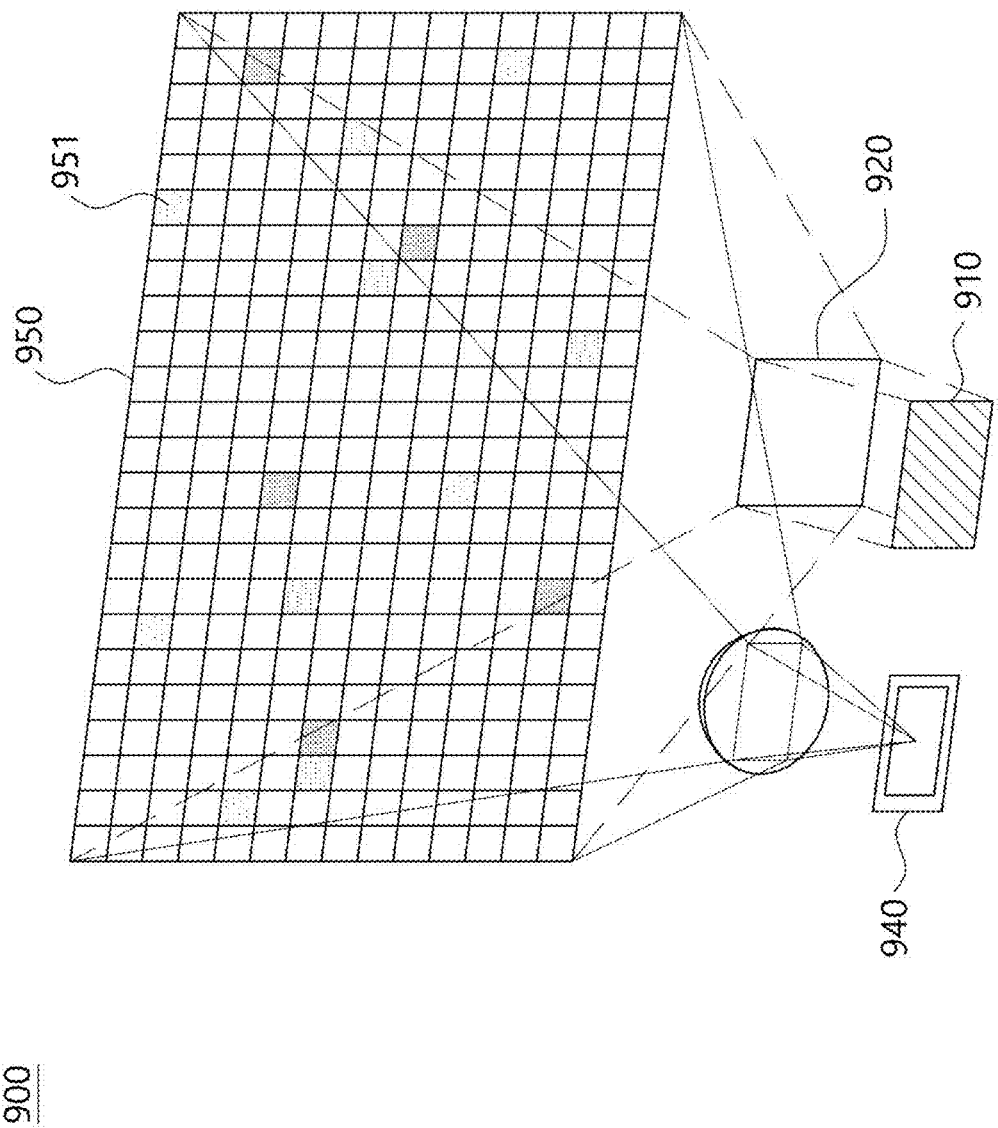
FIG. 37 is a diagram for describing a semi-flash LiDAR according to another embodiment.

FIG. 37 is a diagram for describing a semi-flash LiDAR according to another embodiment.

Referring to FIG. 37, a semi-flash LiDAR 900 according to another embodiment may include a laser emitting unit 910, a BCSC 920, and a reception unit 940.

The semi-flash LiDAR 900 according to one embodiment may include the laser emitting unit 910. A description of the laser emitting unit 910 may be duplicated with that of the laser emitting unit 810 of FIG. 35, and thus a detailed description thereof will be omitted.

The semi-flash LiDAR 900 according to one embodiment may include the BCSC 920. A description of the BCSC 920 may be duplicated with that of the BCSC 820 of FIG. 35, and thus a detailed description thereof will be omitted.

The semi-flash LiDAR 900 according to one embodiment may include the reception unit 940. A description of the reception unit 940 may be duplicated with that of the reception unit 840 of FIG. 35, and thus a detailed description thereof will be omitted.

According to one embodiment, the semi-flash LiDAR 900 may have a predetermined light path between the components.

For example, light emitted from the laser emitting unit 910 may be incident on an object 950 through the BCSC 920. Further, the light incident on the object 950 may be reflected from the object 950 and received by the reception unit 940. A lens for increasing light-transmitting/receiving efficiency may be additionally inserted into the above-described light path.

When the semi-flash LiDAR 900 of FIG. 37 is compared with the semi-flash LiDAR 800 of FIG. 35, the semi-flash LiDAR 900 of FIG. 37 may not include a scanning unit. A scanning function of the scanning unit may be realized with the laser emitting unit 910 and the BCSC 920.

For example, the laser emitting unit 910 may include an addressable VCSEL array and partially emit a laser beam to a region of interest by an addressable operation.

Further, for example, the BCSC 920 may include a collimation component and a steering component to provide a particular orientation to a laser beam so that the laser beam is irradiated to a desired region of interest.

Further, the semi-flash LiDAR 900 of FIG. 37 may have a simplified light path as compared with the semi-flash LiDAR 800 of FIG. 35. By simplifying the light path, a light loss may be minimized and the possibility of occurring crosstalk may be reduced.

Figure 38:
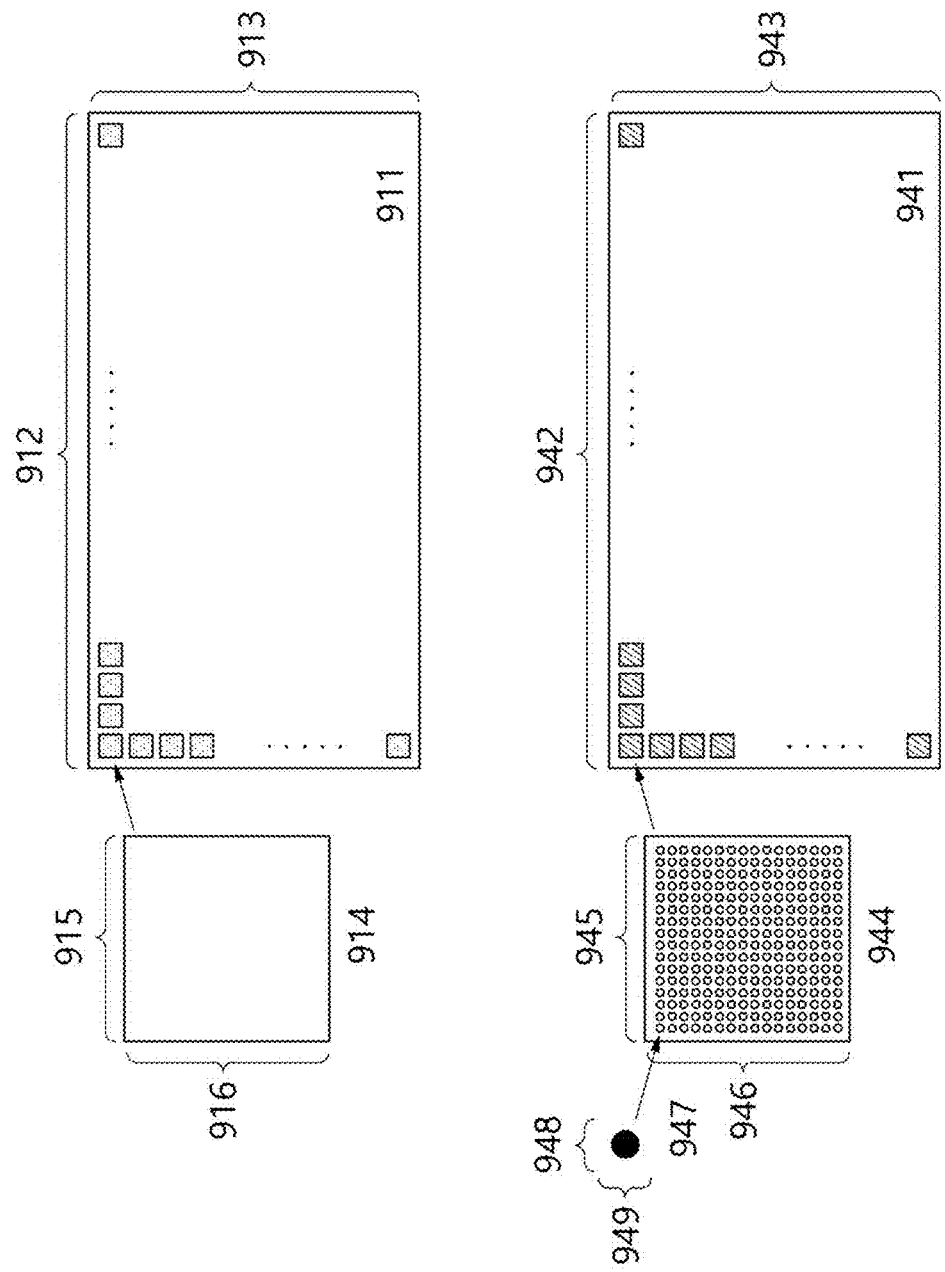
FIG. 38 is a diagram for describing a configuration of the semi-flash LiDAR according to another embodiment.

FIG. 38 is a diagram for describing a configuration of a semi-flash LiDAR according to another embodiment.

Referring to FIG. 38, a semi-flash LiDAR 900 according to one embodiment may include a laser emitting unit 910 and a reception unit 940.

According to one embodiment, the laser emitting unit 910 may include a VCSEL array 911. For example, the VCSEL array 911 may have an N*M matrix structure.

According to one embodiment, the VCSEL array 911 may include a plurality of VCSEL units 914. Here, each of the VCSEL units 914 may include a plurality of VCSEL emitters. For example, the VCSEL array 911 may include 1250 VCSEL units 914 having a 50×25 matrix structure, but the present disclosure is not limited thereto.

According to one embodiment, each of the VCSEL units 914 may have a divergence angle. For example, the VCSEL unit 914 may have a horizontal divergence angle 915 and a vertical divergence angle 916. For example, the VCSEL unit 914 may have the horizontal divergence angle 915 of 1.2 degrees and the vertical divergence angle 916 of 1.2 degrees, but the present disclosure is not limited thereto.

According to one embodiment, the reception unit 940 may include a SPAD array 941. For example, the SPAD array 941 may have an N*M matrix structure.

According to one embodiment, the SPAD array 941 may include a plurality of SPAD units 944. At this point, each of the SPAD units 944 may include a plurality of SPAD pixels 947. For example, the SPAD unit 944 may include 12×12 SPAD pixels 947.

Further, for example, the SPAD array 941 may include 1250 SPAD units 944 of a 50×25 matrix structure. In this case, the arrangement of the SPAD units 944 may correspond to the arrangement of the VCSEL units 914.

According to one embodiment, each the SPAD units 944 may have an FOV at which light may be received. For example, the SPAD unit 944 may have a horizontal FOV 945 and a vertical FOV 946. For example, the SPAD unit 944 may have the horizontal FOV 945 of 1.2 degrees and the vertical FOV 946 of 1.2 degrees.

At this point, the FOV of the SPAD unit 944 may be proportional to the number of SPAD pixels 947 included in the SPAD unit 944. Alternatively, an FOV of the individual SPAD pixel 947 included in the SPAD unit 944 may be determined by the FOV of the SPAD unit 944.

For example, in a case in which each of a horizontal FOV 948 and a vertical FOV 949 of the individual SPAD pixel 947 is 0.1 degrees, when the SPAD unit 944 includes N*M SPAD pixels 947, the horizontal FOV 945 and the vertical FOV 946 of the SPAD unit 944 may be 0.1*N and 0.1*M, respectively.

Further, for example, in a case in which each of the horizontal FOV 945 and the vertical FOV 946 of the SPAD unit 944 is 1.2 degrees, when the SPAD unit 944 includes 12×12 SPAD pixels 947, the horizontal FOV 948 and the vertical FOV 949 of the individual SPAD pixel 947 may each be 0.1 degrees (=1.2/12).

According to another embodiment, the reception unit 940 may include a SiPM array 941. For example, the SiPM array 941 may have an N*M matrix structure.

According to one embodiment, the SiPM array 941 may include a plurality of microcell units 944. Here, each of the microcell units 944 may include a plurality of microcells 947. For example, each of the microcell units 944 may include 12×12 microcells 947.

Further, for example, the SiPM array 941 may include 1250 microcell units 944 of a 50×25 matrix structure. In this case, the arrangement of the microcell units 944 may correspond to the arrangement of the VCSEL units 914.

According to one embodiment, each of the microcell units 944 may have an FOV at which light may be received. For example, the microcell unit 944 may have a horizontal FOV 945 and a vertical FOV 946. For example, the microcell unit 944 may have the horizontal FOV 945 of 1.2 degrees and the vertical FOV 946 of 1.2 degrees.

Here, the FOV of the microcell unit 944 may be proportional to the number of microcells 947 included in the microcell unit 944. Alternatively, an FOV of the individual microcell 947 included in the microcell unit 944 may be determined by the FOV of the microcell unit 944.

For example, in a case in which each of a horizontal FOV 948 and a vertical FOV 949 of the individual microcell 947 is 0.1 degrees, when the microcell unit 944 includes N*M microcells 947, the horizontal FOV 945 and the vertical FOV 946 of the microcell unit 944 may be 0.1*N and 0.1*M, respectively.

Further, for example, in a case in which each of the horizontal FOV 945 and the vertical FOV 946 of the microcell unit 944 is 1.2 degrees, when the microcell unit 944 includes 12×12 microcells 947, the horizontal FOV 948 and the vertical FOV 949 of the individual microcell 947 may each be 0.1 degrees (=1.2/12).

According to one embodiment, the VCSEL unit 914 of the laser emitting unit 910 may correspond to the SPAD unit or microcell unit 944 of the reception unit 940.

For example, the horizontal divergence angle and the vertical divergence angle of the VCSEL units 914 may be respectively identical to the horizontal FOV 945 and the vertical FOV 946 of the SPAD unit or microcell unit 944.

For example, a laser beam emitted from the VCSEL unit 914 in a first row and first column may be reflected from the object 850 and received by the SPAD unit or microcell unit 944 in the first row and first column.

Further, for example, a laser beam emitted from the VCSEL unit 914 in an Nth row and Mth column may be reflected from the object 850 and received by the SPAD unit or microcell unit 944 in the Nth row and Mth column.

At this point, the laser beam, which is emitted from the VCSEL unit 914 in the Nth row and Mth column and reflected from the object 850, may be received by the SPAD unit or microcell unit 944 in the Nth row and Mth column, and the LiDAR device 900 may have a resolution by the SPAD unit or microcell unit 944.

For example, when the SPAD unit or microcell unit 944 includes SPAD pixels or microcells 947 of N rows*M columns, the VCSEL unit 914 may recognize distance information of the object by dividing the FOV, at which light is irradiated, into N*M regions.

According to another embodiment, one VCSEL unit 914 may correspond to the plurality of SPAD units or microcell units 944. For example, the laser beam emitted from the VCSEL unit 914 in the first row and first column may be reflected from the object 850 and received by the SPAD units or microcell units 944 in the first row and first column and a first row and second column.

According to still another embodiment, the plurality of VCSEL units 914 may correspond to one SPAD unit or microcell unit 944. For example, a laser beam emitted from the VCSEL unit 914 in the first row and first column may be reflected from the object 850 and received by the SPAD unit or microcell unit 944 in the first row and first column.

According to one embodiment, the plurality of VCSEL units 914 included in the laser emitting unit 910 may operate according to a predetermined sequence or may operate randomly. At this point, the SPAD unit or microcell unit 944 of the reception unit 940 may also operate corresponding to the operation of the VCSEL unit 914.

For example, in the VCSEL array 911, the VCSEL unit in a first row and third column may operate after the VCSEL unit in a first row and first column operates. Thereafter, the VCSEL unit in a first row and fifth column may operate, and then the VCSEL unit in a first row and seventh column may operate.

In this case, in the reception unit 940, the SPAD unit or microcell unit 944 in a first row and third column may operate after the SPAD unit or microcell unit 944 in a first row and first column operates. Thereafter, the SPAD unit or microcell unit 944 in a first row and fifth column may operate, and then the SPAD unit or microcell unit 944 in a first row and seventh column may operate.

Further, for example, the VCSEL units of the VCSEL array 911 may operate randomly. At this point, the SPAD unit or microcell unit 944 of the reception unit, which is present at a position corresponding to the position of the randomly operating VCSEL unit 914, may operate.

Figure 39:
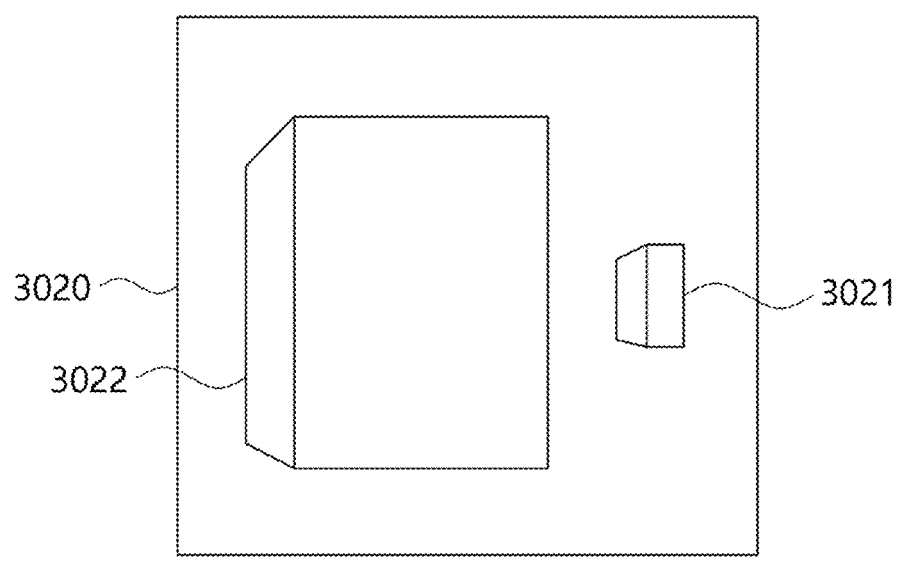
FIG. 39 is a diagram for describing a LiDAR device according to one embodiment.
Figure 39:
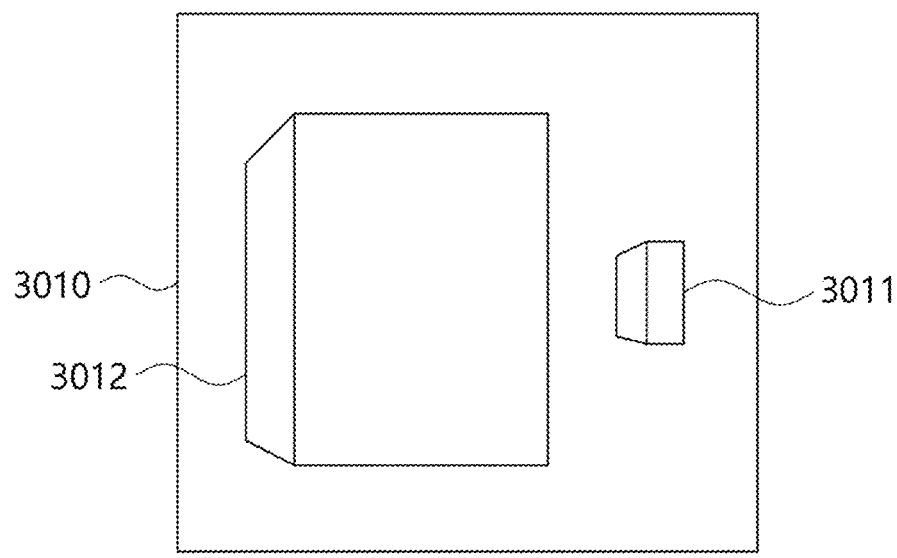

FIG. 39 is a diagram for describing a LiDAR device according to one embodiment.

Referring to FIG. 39, a LiDAR device 3000 according to one embodiment may include a transmission module 3010 and a reception module 3020.

Further, the transmission module 3010 may include a laser emitting array 3011 and a first lens assembly 3012, but the present disclosure is not limited thereto.

Here, the contents of the laser emitting unit or the like described above may be applied to the laser emitting array 3011, and thus redundant descriptions thereof will be omitted.

Further, the laser emitting array 3011 may emit at least one laser. For example, the laser emitting array 3011 may emit a plurality of lasers, but the present disclosure is not limited thereto.

Further, the laser emitting array 3011 may emit at least one laser at a first wavelength. For example, the laser emitting array 3011 may emit at least one laser at a wavelength of 940 nm, and may emit a plurality of lasers at a wavelength of 940 nm, but the present disclosure is not limited thereto.

In this case, the first wavelength may be a wavelength range including an error range. For example, the first wavelength may refer to a wavelength range of 935 nm to 945 nm as a wavelength of 940 nm in a 5 nm error range, but the present disclosure is not limited thereto.

Further, the laser emitting array 3011 may emit at least one laser at the same time point. For example, the laser emitting array 3011 may emit a first laser at a first time point, or may emit at least one laser at the same time point, such as, emitting first and second lasers at a second time point.

Further, the first lens assembly 3012 may include at least two lens layers. For example, the first lens assembly 3012 may include at least four lens layers, but the present disclosure is not limited thereto.

Further, the first lens assembly 3012 may steer the laser emitted from the laser emitting array 3011. For example, the first lens assembly 3012 may steer the first laser emitted from the laser emitting array 3011 in a first direction and steer the second laser emitted from the laser emitting array 3011 in a second direction, but the present disclosure is not limited thereto.

Further, the first lens assembly 3012 may steer a plurality of lasers, which are emitted from the laser emitting array 3011, in order to irradiate the plurality of lasers at different angles within a range of x degrees to y degrees. For example, the first lens assembly 3012 may steer the first laser emitted from the laser emitting array 3011 in the first direction in order to irradiate the first laser at the angle of x degrees, and steer the second laser emitted from the laser emitting array 3011 in the second direction in order to irradiate the second laser at the angle of y degrees, but the present disclosure is not limited thereto.

Further, the reception module 3020 may include a laser detecting array 3021 and a second lens assembly 3022, but the present disclosure is not limited thereto.

Here, the contents of the detecting unit or the like described above may be applied to the laser detecting array 3021, and thus redundant descriptions thereof will be omitted.

Further, the laser detecting array 3021 may detect at least one laser. For example, the laser detecting array 3021 may detect a plurality of lasers.

Further, the laser detecting array 3021 may include a plurality of detectors. For example, the laser detecting array 3021 may include a first detector and a second detector, but the present disclosure is not limited thereto.

Further, each of the plurality of detectors included in the laser detecting array 3021 may receive different lasers. For example, the first detector included in the laser detecting array 3021 may receive a first laser that is received in the first direction, and the second detector may receive a second laser that is received in the second direction, but the present disclosure is not limited thereto.

Further, the laser detecting array 3021 may detect at least a portion of the laser irradiated from the transmission module 3010. For example, the laser detecting array 3021 may detect at least a portion of the first laser irradiated from the transmission module 3010 and may detect at least a portion of the second laser, but the present disclosure is not limited thereto.

Further, the second lens assembly 3022 may transmit the laser, which irradiated from the transmission module 3010, to the laser detecting array 3021. For example, when the first laser, which is irradiated from the transmission module 3010 in the first direction, is reflected from the object positioned in the first direction, the second lens assembly 3022 may transmit the first laser to the laser detecting array 3021, and when the second laser, which is irradiated in the second direction, is reflected from the object positioned in the second direction, the second lens assembly 3022 may transmit the second laser to the laser detecting array 3021, but the present disclosure is not limited thereto.

Further, the second lens assembly 3022 may distribute the lasers irradiated from the transmission module 3010 to at least two different detectors. For example, when the first laser, which is irradiated from the transmission module 3010 in the first direction, is reflected from the object positioned in the first direction, the second lens assembly 3022 may distribute the first laser to the first detector included in the laser detecting array 3021, and when the second laser, which is irradiated in the second direction, is reflected from the object positioned in the second direction, the second lens assembly 3022 may distribute the second laser to the second detector included in the laser detecting array 3021, but the present disclosure is not limited thereto.

Further, at least a portion of each of the laser emitting array 3011 and the laser detecting array 3021 may match each other. For example, a first laser emitted from a first laser emitting element included in the laser emitting array 3011 may be detected by the first detector included in the laser detecting array 3021, and a second laser emitted from a second laser emitting element included in the laser emitting array 3011 may be detected by the second detector included in the laser detecting array 3021, but the present disclosure is not limited thereto.

Figure 40:
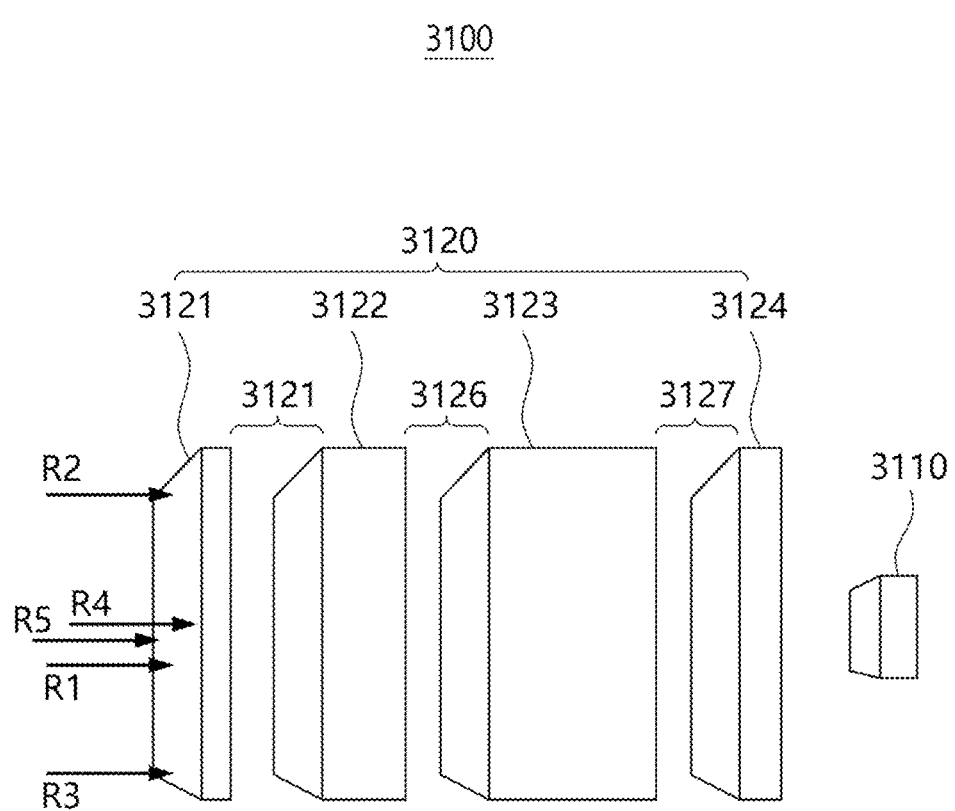
FIG. 40 is a diagram for describing a reception module according to one embodiment.

FIG. 40 is a diagram for describing a reception module according to one embodiment.

Referring to FIG. 40, a reception module 3100 according to one embodiment may include a laser detecting array 3110 and a lens assembly 3120.

Here, the contents of the laser detecting array described above may be equally applied to the laser detecting array 3110, and thus redundant descriptions thereof will be omitted.

Also, the contents of the lens assembly described above may be equally applied to the lens assembly 3120, and thus redundant descriptions thereof will be omitted.

Further, the lens assembly 3120 may include at least two lens layers. For example, as shown in FIG. 40, the lens assembly 3120 may include a first lens layer 3121, a second lens layer 3122, a third lens layer 3123, and a fourth lens layer 3124, but the present disclosure is not limited thereto.

In this case, each of the lens layers may be formed of the same material, but is not limited thereto, and may be formed of different materials.

Further, thicknesses of the lens layers may be different from each other, but are not limited thereto, and at least some thereof may be the same.

Further, the lens assembly 3120 may include at least two gap layers. For example, as shown in FIG. 40, the lens assembly 3120 may include a first gap layer 3125, a second gap layer 3126, and a third gap layer 3127, but the present disclosure is not limited thereto.

In this case, each of the gap layers may include a material different from that of each of the lens layers. For example, each of the gap layers may include air, but the present disclosure is not limited thereto.

In this case, each of the gap layers may include the same material, but it is not limited thereto, and may include different materials.

Further, each of the gap layers may refer to a space or material between the respective lens layers. For example, the first gap layer 3125 may refer to a space or material between the first lens layer 3121 and the second lens layer 3122, the second gap layer 3126 may refer to a space or material between the second lens layer 3122 and the third lens layer 3123, and the third gap layer 3127 may refer to a space or material between the third lens layer 3123 and the fourth lens layer 3124, but the present disclosure is not limited thereto.

Further, each of the gap layers may be positioned between the respective lens layers. For example, the first gap layer 3125 may be positioned between the first lens layer 3121 and the second lens layer 3122, the second gap layer 3126 may be positioned between the second lens layer 3122 and the third lens layer 3123, and the third gap layer 3127 may be positioned between the third lens layer 3123 and the fourth lens layer 3124, but the present disclosure is not limited thereto.

Further, light rays of parallel light incident on the lens assembly 3120 may be received by the laser detecting array 3110 along respective paths. For example, of parallel light incident on an entrance pupil of the lens assembly 3120 at 0 degrees, a first light ray R1 incident on a first portion of the entrance pupil may be received by a first detector included in the laser detecting array 3110 along a first light path, a second light ray R2 incident on a second portion of the entrance pupil may be received by the first detector along a second light path, a third light ray R3 incident on a third portion of the entrance pupil may be received by the first detector along a third light path, a fourth light ray R4 incident on a fourth portion of the entrance pupil may be received by the first detector along a fourth light path, and a fifth light ray R5 incident on a fifth portion of the entrance pupil may be received by the first detector along a fifth light path, but the present disclosure is not limited thereto.

In this case, the first portion may be a center portion of the entrance pupil, the second portion may be an end portion of the entrance pupil in a +Y-axis direction, the third portion may be an end portion of the entrance pupil in a −Y-axis direction, the fourth portion may be an end portion of the entrance pupil in a +X-axis direction, and the fifth portion may be an end portion of the entrance pupil in a −X-axis direction, but the present disclosure is not limited thereto.

Further, angles at which the light rays of the parallel light incident on the lens assembly 3120 are incident on a cross section of the first gap layer 3125 may be at least partially different. For example, of the parallel light incident on the entrance pupil of the lens assembly 3120 at 0 degrees, the first light ray R1 incident on the first portion of the entrance pupil may be incident on the cross section of the first gap layer 3125 at a first angle, the second light ray R2 incident on the second portion of the entrance pupil may be incident on the cross section of the first gap layer 3125 at a second angle, the third light ray R3 incident on the third portion of the entrance pupil may be incident on the cross section of the first gap layer 3125 at a third angle, the fourth light ray R4 incident on the fourth portion of the entrance pupil may be incident on the cross section of the first gap layer 3125 at a fourth angle, and the fifth light ray R5 incident on the fifth portion of the entrance pupil may be incident on the cross section of the first gap layer 3125 at a fifth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the first to fifth angles may be different from each other, but are not limited thereto, and may be at least partially the same.

Further, a difference between a minimum angle and a maximum angle of the first to fifth angles may have a first difference value.

Further, angles at which the light rays of the parallel light incident on the lens assembly 3120 are incident on a cross section of the second gap layer 3126 may be at least partially different. For example, of the parallel light incident on the entrance pupil of the lens assembly 3120 at 0 degrees, the first light ray R1 incident on the first portion of the entrance pupil may be incident on the cross section of the second gap layer 3126 at a sixth angle, the second light ray R2 incident on the second portion of the entrance pupil may be incident on the cross section of the second gap layer 3126 at a seventh angle, the third light ray R3 incident on the third portion of the entrance pupil may be incident on the cross section of the second gap layer 3126 at an eighth angle, the fourth light ray R4 incident on the fourth portion of the entrance pupil may be incident on the cross section of the second gap layer 3126 at a ninth angle, and the fifth light ray R5 incident on the fifth portion of the entrance pupil may be incident on the cross section of the second gap layer 3126 at a tenth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the sixth to tenth angles may be different from each other, but are not limited thereto, and may be at least partially the same.

Further, a difference between a minimum angle and a maximum angle of the sixth to tenth angles may have a second difference value.

Further, angles at which the light rays of the parallel light incident on the lens assembly 3120 are incident on a cross section of the third gap layer may be at least partially different. For example, of the parallel light incident on the entrance pupil of the lens assembly 3120 at 0 degrees, the first light ray R1 incident on the first portion of the entrance pupil may be incident on the cross section of the third gap layer at an eleventh angle, the second light ray R2 incident on the second portion of the entrance pupil may be incident on the cross section of the third gap layer at a twelfth angle, the third light ray R3 incident on the third portion of the entrance pupil may be incident on the cross section of the third gap layer at a thirteenth angle, the fourth light ray R4 incident on the fourth portion of the entrance pupil may be incident on the cross section of the third gap layer at a fourteenth angle, and the fifth light ray R5 incident on the fifth portion of the entrance pupil may be incident on the cross section of the third gap layer at a fifteenth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the eleventh to fifteenth angles may be different from each other, but are not limited thereto, and may be at least partially the same.

Further, a difference between a minimum angle and a maximum angle of the eleventh to fifteenth angles may have a third difference value.

Further, angles at which the light rays of the parallel light incident on the lens assembly 3120 are incident on a cross section between the laser detecting array 3110 and the lens assembly 3120 may be at least partially different. For example, of the parallel light incident on the entrance pupil of the lens assembly 3120 at 0 degrees, the first light ray R1 incident on the first portion of the entrance pupil may be incident on the cross section between the laser detecting array 3110 and the lens assembly 3120 at a sixteenth angle, the second light ray R2 incident on the second portion of the entrance pupil may be incident on the cross section between the laser detecting array 3110 and the lens assembly 3120 at a seventeenth angle, the third light ray R3 incident on the third portion of the entrance pupil may be incident on the cross section between the laser detecting array 3110 and the lens assembly 3120 at an eighteenth angle, the fourth light ray R4 incident on the fourth portion of the entrance pupil may be incident on the cross section between the laser detecting array 3110 and the lens assembly 3120 at a nineteenth angle, and the fifth light ray R5 incident on the fifth portion of the entrance pupil may be incident on the cross section between the laser detecting array 3110 and the lens assembly 3120 at a twentieth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the sixteenth to twentieth angles may be different from each other, but are not limited thereto, and may be at least partially the same.

Further, a difference between a minimum angle and a maximum angle of the sixteenth to twentieth angles may have a fourth difference value.

Further, the first to fourth difference values may be different from each other. For example, the second difference value may be the smallest among the first to fourth difference values, and the fourth difference value may be the largest among the first to fourth difference values, but the present disclosure is not limited thereto.

Figure 41:
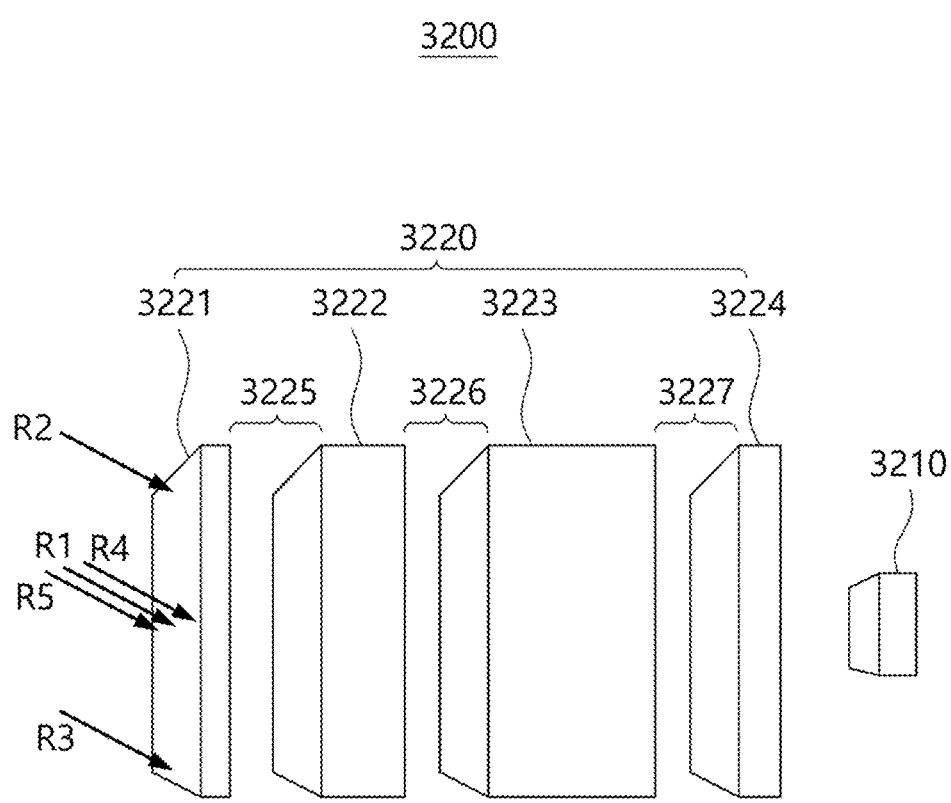
FIG. 41 is a diagram for describing a reception module according to one embodiment.

FIG. 41 is a diagram for describing a reception module according to one embodiment.

Referring to FIG. 41, a reception module 3200 according to one embodiment may include a laser detecting array 3210 and a lens assembly 3220.

Here, the contents of the laser detecting array described above may be equally applied to the laser detecting array 3210, and thus redundant descriptions thereof will be omitted.

Further, the contents of the lens assembly described above may be equally applied to the lens assembly 3220, and thus redundant descriptions thereof will be omitted.

Further, the lens assembly 3220 may include at least two lens layers. For example, as shown in FIG. 41, the lens assembly 3220 may include a first lens layer 3221, a second lens layer 3222, a third lens layer 3223, and a fourth lens layer 3224, but the present disclosure is not limited thereto.

In this case, each of the lens layers may be formed of the same material, but is not limited thereto, and may be formed of different materials.

Further, thicknesses of the lens layers may be different from each other, but are not limited thereto, and at least some thereof may be the same.

Further, the lens assembly 3220 may include at least two gap layers. For example, as shown in FIG. 41, the lens assembly 3220 may include a first gap layer 3225, a second gap layer 3226, and a third gap layer 3227, but the present disclosure is not limited thereto.

In this case, each of the gap layers may include the same material, but it is not limited thereto, and may include different materials.

Further, each of the gap layers may refer to a space or material between the respective lens layers. For example, the first gap layer 3225 may refer to a space or material between the first lens layer 3221 and the second lens layer 3222, the second gap layer 3226 may refer to a space or material between the second lens layer 3222 and the third lens layer 3223, and the third gap layer 3227 may refer to a space or material between the third lens layer 3223 and the fourth lens layer 3224, but the present disclosure is not limited thereto.

Further, each of the gap layers may be positioned between the respective lens layers. For example, the first gap layer 3225 may be positioned between the first lens layer 3221 and the second lens layer 3222, the second gap layer 3226 may be positioned between the second lens layer 3222 and the third lens layer 3223, and the third gap layer 3227 may be positioned between the third lens layer 3223 and the fourth lens layer 3224, but the present disclosure is not limited thereto.

Further, light rays of parallel light incident on the lens assembly 3220 may be received by the laser detecting array 3210 along respective paths. For example, of parallel light incident on an entrance pupil of the lens assembly 3220 at 30 degrees, a first light ray R1 incident on a first portion of the entrance pupil may be received by a second detector included in the laser detecting array 3210 along a first light path, a second light ray R2 incident on a second portion of the entrance pupil may be received by the second detector along a second light path, a third light ray R3 incident on a third portion of the entrance pupil may be received by the second detector along a third light path, a fourth light ray R4 incident on a fourth portion of the entrance pupil may be received by the second detector along a fourth light path, and a fifth light ray R5 incident on a fifth portion of the entrance pupil may be received by the second detector along a fifth light path, but the present disclosure is not limited thereto.

In this case, the first portion may be a center portion of the entrance pupil, the second portion may be an end portion of the entrance pupil in a +Y-axis direction, a third portion may be an end portion of the entrance pupil in a −Y-axis direction, the fourth portion may be an end portion of the entrance pupil in a +X-axis direction, and the fifth portion may be an end portion of the entrance pupil in a −X-axis direction, but the present disclosure is not limited thereto.

Further, angles at which the light rays of the parallel light incident on the lens assembly 3220 are incident on a cross section of the first gap layer 3225 may be at least partially different. For example, of the parallel light incident on the entrance pupil of the lens assembly 3220 at 30 degrees, the first light ray R1 incident on the first portion of the entrance pupil may be incident on the cross section of the first gap layer 3225 at a first angle, the second light ray R2 incident on the second portion of the entrance pupil may be incident on the cross section of the first gap layer 3225 at a second angle, the third light ray R3 incident on the third portion of the entrance pupil may be incident on the cross section of the first gap layer 3225 at a third angle, the fourth light ray R4 incident on the fourth portion of the entrance pupil may be incident on the cross section of the first gap layer 3225 at a fourth angle, and the fifth light ray R5 incident on the fifth portion of the entrance pupil may be incident on the cross section of the first gap layer 3225 at a fifth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the first to fifth angles may be different from each other, but are not limited thereto, and may be at least partially the same.

Further, a difference between a minimum angle and a maximum angle of the first to fifth angles may have a first difference value.

Further, angles at which the light rays of the parallel light incident on the lens assembly 3220 are incident on a cross section of the second gap layer 3226 may be at least partially different. For example, of the parallel light incident on the entrance pupil of the lens assembly 3220 at 30 degrees, the first light ray R1 incident on the first portion of the entrance pupil may be incident on the cross section of the second gap layer 3226 at a sixth angle, the second light ray R2 incident on the second portion of the entrance pupil may be incident on the cross section of the second gap layer 3226 at a seventh angle, the third light ray R3 incident on the third portion of the entrance pupil may be incident on the cross section of the second gap layer 3226 at an eighth angle, the fourth light ray R4 incident on the fourth portion of the entrance pupil may be incident on the cross section of the second gap layer 3226 at a ninth angle, and the fifth light ray R5 incident on the fifth portion of the entrance pupil may be incident on the cross section of the second gap layer 3226 at a tenth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the sixth to tenth angles may be different from each other, but are not limited thereto, and may be at least partially the same.

Further, a difference between a minimum angle and a maximum angle of the sixth to tenth angles may have a second difference value.

Further, angles at which the light rays of the parallel light incident on the lens assembly 3220 are incident on a cross section of the third gap layer 3227 may be at least partially different. For example, of the parallel light incident on the entrance pupil of the lens assembly 3220 at 30 degrees, the first light ray R1 incident on the first portion of the entrance pupil may be incident on the cross section of the third gap layer 3227 at an eleventh angle, the second light ray R2 incident on the second portion of the entrance pupil may be incident on the cross section of the third gap layer 3227 at a twelfth angle, the third light ray R3 incident on the third portion of the entrance pupil may be incident on the cross section of the third gap layer 3227 at a thirteenth angle, the fourth light ray R4 incident on the fourth portion of the entrance pupil may be incident on the cross section of the third gap layer 3227 at a fourteenth angle, and the fifth light ray R5 incident on the fifth portion of the entrance pupil may be incident on the cross section of the third gap layer 3227 at a fifteenth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the eleventh to fifteenth angles may be different from each other, but are not limited thereto, and may be at least partially the same.

Further, a difference between a minimum angle and a maximum angle of the eleventh to fifteenth angles may have a third difference value.

Further, angles at which the light rays of the parallel light incident on the lens assembly 3220 are incident on a cross section between the laser detecting array 3210 and the lens assembly 3220 may be at least partially different. For example, of the parallel light incident on the entrance pupil of the lens assembly 3220 at 30 degrees, the first light ray R1 incident on the first portion of the entrance pupil may be incident on the cross section between the laser detecting array 3210 and the lens assembly 3220 at a sixteenth angle, the second light ray R2 incident on the second portion of the entrance pupil may be incident on the cross section between the laser detecting array 3210 and the lens assembly 3220 at a seventeenth angle, the third light ray R3 incident on the third portion of the entrance pupil may be incident on the cross section between the laser detecting array 3210 and the lens assembly 3220 at an eighteenth angle, the fourth light ray R4 incident on the fourth portion of the entrance pupil may be incident on the cross section between the laser detecting array 3210 and the lens assembly 3220 at a nineteenth angle, and the fifth light ray R5 incident on the fifth portion of the entrance pupil may be incident on the cross section between the laser detecting array 3210 and the lens assembly 3220 at a twentieth angle, but the present disclosure is not limited thereto.

In this case, the first portion may be the center portion of the entrance pupil, the second portion may be the end portion of the entrance pupil in the +Y-axis direction, the third portion may be the end portion of the entrance pupil in the −Y-axis direction, the fourth portion may be the end portion of the entrance pupil in the +X-axis direction, and the fifth portion may be the end portion of the entrance pupil in the −X-axis direction, but the present disclosure is not limited thereto.

Further, the sixteenth to twentieth angles may be different from each other, but are not limited thereto, and may be at least partially the same.

Further, a difference between a minimum angle and a maximum angle of the sixteenth to twentieth angles may have a fourth difference value.

Further, the first to fourth difference values may be different from each other. For example, the second difference value may be the smallest among the first to fourth difference values, and the fourth difference value may be the largest among the first to fourth difference values, but the present disclosure is not limited thereto.

FIG. 42 is a diagram for describing incident angles of light rays of parallel light incident on a lens assembly according to one embodiment.

More specifically, FIG. 42A is an exemplary diagram illustrating an angle of each light ray incident on the cross section of each of the second gap layers 3126 and 3226, which are described above, and FIG. 42B is an exemplary diagram illustrating an angle of each light ray incident on the cross section between the laser detecting array and the lens assembly, which are described above.

Referring to FIG. 42A, it is possible to determine angles at which light rays of parallel light, which is incident on a lens assembly at a predetermined angle, are incident on a cross section of at least one gap layer included in the lens assembly. For example, of a parallel light incident on the lens assembly at an angle of 0 degrees, a first light ray R1 may be incident on the cross section of at least one gap layer included in the lens assembly at 0 degrees, a second light ray R2 may be incident on the cross section of at least one gap layer included in the lens assembly at 0.89 degrees, a third light ray R3 may be incident on the cross section of at least one gap layer included in the lens assembly at 0.89 degrees, a fourth light ray R4 may be incident on the cross section of at least one gap layer included in the lens assembly at 0.89 degrees, and a fifth light ray R5 may be incident on the cross section of at least one gap layer included in the lens assembly at 0.89 degrees, but the present disclosure is not limited thereto.

Further, referring to FIG. 42A, it is possible to determine angles at which light rays of parallel lights, which are incident on a lens assembly at various angles, are incident on a cross section of at least one gap layer included in the lens assembly. For example, the first light ray R1 of the parallel light, which is incident on the lens assembly at an angle of 0 degrees, may be incident on the cross section of at least one gap layer included in the lens assembly at 0 degrees, the first light ray R1 of parallel light, which is incident on the lens assembly at an angle of 15 degrees, may be incident on the cross section of at least one gap layer included in the lens assembly at 6.99 degrees, and the first light ray R1 of parallel light, which is incident on the lens assembly at an angle of 30 degrees, may be incident on the cross section of at least one gap layer included in the lens assembly at 13.0 degrees, but the present disclosure is not limited thereto.

Further, although not described, it is possible to determine angles at which the first to fifth light rays R1 to R5 of parallel lights, which are incident on the lens assembly at various angles such as 3 degrees, 6 degrees, 9 degrees, 12 degrees, 15 degrees, 18 degrees, 21 degrees, 24 degrees, 27 degrees, 30 degrees, and the like, are incident on the cross section of at least one gap layer included in the lens assembly.

Further, referring to FIG. 42A, it can be seen that at least some of light rays of a plurality of parallel lights, which are incident on the lens assembly at different angles in a range of x degrees to y degrees, may be incident on the cross section of at least one gap layer included in the lens assembly at angles in a range of a degrees to b degrees.

For example, at least some of light rays of a plurality of parallel lights, which are incident on the lens assembly at different angles in a range of 0 degrees to 30 degrees, may be incident on the cross section of at least one gap layer included in the lens assembly at angles in a range of 0 degrees to 13 degrees, but the present disclosure is not limited thereto.

Further, referring to FIG. 42B, it is possible to determine angles at which light rays of parallel light, which is incident on a lens assembly at a predetermined angle, are incident on a cross section between the lens assembly and the laser detecting array. For example, of a parallel light incident on the lens assembly at an angle of 0 degrees, a first light ray R1 may be incident on the cross section between the lens assembly and the laser detecting array at 0 degrees, a second light ray R2 may be incident on the cross section between the lens assembly and the laser detecting array at 27.87 degrees, a third light ray R3 may be incident on the cross section between the lens assembly and the laser detecting array at 27.87 degrees, a fourth light ray R4 may be incident on the cross section between the lens assembly and the laser detecting array at 27.87 degrees, and a fifth light ray R5 may be incident on the cross section between the lens assembly and the laser detecting array at 27.87 degrees, but the present disclosure is not limited thereto.

In this case, the cross section between the lens assembly and the laser detecting array may refer to a cross section parallel to the laser detecting array.

Further, referring to FIG. 42B, it is possible to determine angles at which light rays of parallel lights, which are incident on a lens assembly at various angles, are incident on the cross section between the lens assembly and the laser detecting array. For example, the first light ray R1 of the parallel light, which is incident on the lens assembly at an angle of 0 degrees, may be incident on the cross section between the lens assembly and the laser detecting array at 0 degrees, the first light ray R1 of parallel light, which is incident on the lens assembly at an angle of 15 degrees, may be incident on the cross section between the lens assembly and the laser detecting array at 1.16 degrees, and the first light ray R1 of parallel light, which is incident on the lens assembly at an angle of 30 degrees, may be incident on the cross section between the lens assembly and the laser detecting array at 5.12 degrees, but the present disclosure is not limited thereto.

Further, although not described, it is possible to determine angles at which the first to fifth light rays R1 to R5 of parallel lights, which are incident on the lens assembly at various angles such as 3 degrees, 6 degrees, 9 degrees, 12 degrees, 15 degrees, 18 degrees, 21 degrees, 24 degrees, 27 degrees, 30 degrees, and the like, are incident on the cross section between the lens assembly and the laser detecting array.

Further, referring to FIG. 42B, it can be seen that at least some of light rays of a plurality of parallel lights, which are incident on the lens assembly at different angles in a range of x degrees to y degrees, may be incident on the cross section between the lens assembly and the laser detecting array at angles in a range of a degrees to b degrees.

For example, at least some of light rays of a plurality of parallel lights, which are incident on the lens assembly at different angles in a range of 0 degrees to 30 degrees, may be incident on the cross section between the lens assembly and the laser detecting array at angles in a range of 0 degrees to 28.90 degrees, but the present disclosure is not limited thereto.

Further, when the filter layer is positioned in the second gap layer, an angular distribution of light rays incident on the filter layer may be smaller than when the filter layer is positioned between the laser detecting array and the lens assembly.

For example, the angular distribution of the light rays incident on the filter layer may range from 0 degrees to 13 degrees when the filter layer is positioned in the second gap layer, the angular distribution of the light rays incident on the filter layer may range from 0 degrees to 28.90 degrees when the filter layer is positioned between the laser detecting array and the lens assembly, but the present disclosure is not limited thereto.

Figure 43:
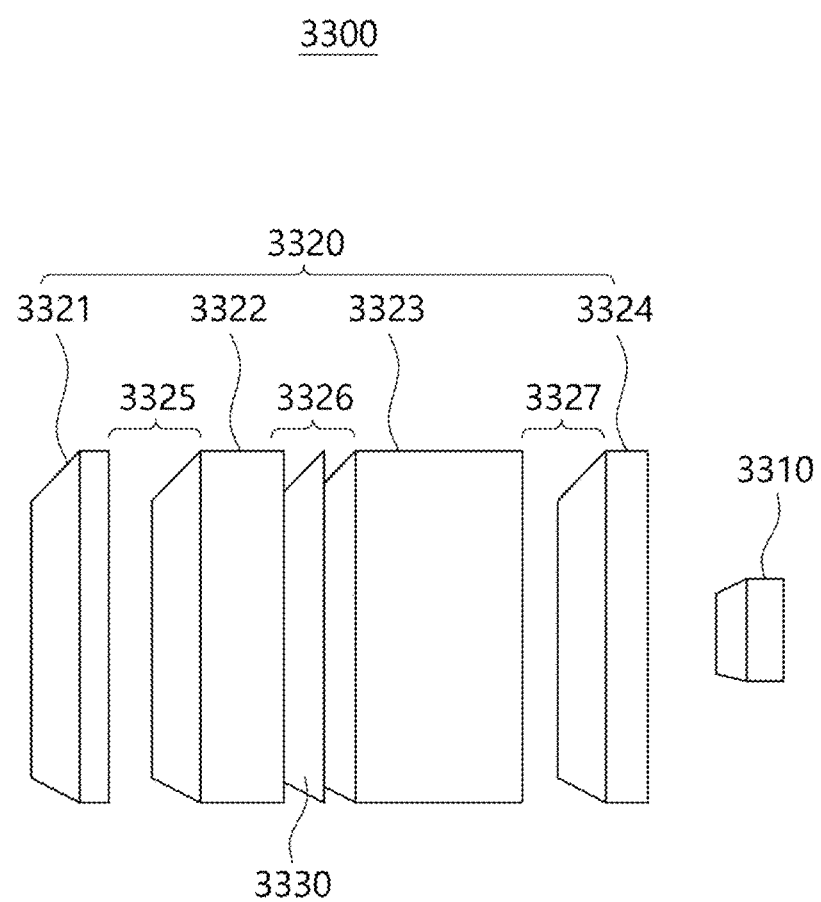
FIG. 43 is a diagram for describing a reception module according to one embodiment.

FIG. 43 is a diagram for describing a reception module according to one embodiment.

Referring to FIG. 43, a reception module 3300 according to one embodiment may include a laser detecting array 3310 and a lens assembly 3320.

Here, the contents of the laser detecting array described above may be equally applied to the laser detecting array 3310, and thus redundant descriptions thereof will be omitted.

Further, the contents of the lens assembly described above may be equally applied to the lens assembly 3320, and thus redundant descriptions thereof will be omitted.

Further, the lens assembly 3320 may include at least two lens layers. For example, as shown in FIG. 43, the lens assembly 3320 may include a first lens layer 3321, a second lens layer 3322, a third lens layer 3323, and a fourth lens layer 3324, but the present disclosure is not limited thereto.

In this case, each of the lens layers may be formed of the same material, but is not limited thereto, and may be formed of different materials.

Further, thicknesses of the lens layers may be different from each other, but are not limited thereto, and at least some thereof may be the same.

Further, the lens assembly 3320 may include at least two gap layers. For example, as shown in FIG. 43, the lens assembly 3320 may include a first gap layer 3325, a second gap layer 3326, and a third gap layer 3327, but the present disclosure is not limited thereto.

In this case, each of the gap layers may include a material different from that of each of the lens layers. For example, each of the gap layers may include air, but the present disclosure is not limited thereto.

Further, each of the gap layers may include the same material, but is not limited thereto, and may include different materials.

Further, each of the gap layers may refer to a space or material between the respective lens layers. For example, the first gap layer 3325 may refer to a space or material between the first lens layer 3321 and the second lens layer 3322, the second gap layer 3326 may refer to a space or material between the second lens layer 3322 and the third lens layer 3323, and the third gap layer 3327 may refer to a space or material between the third lens layer 3323 and the fourth lens layer 3324, but the present disclosure is not limited thereto.

Further, each of the gap layers may be positioned between the respective lens layers. For example, the first gap layer 3325 may be positioned between the first lens layer 3321 and the second lens layer 3322, the second gap layer 3326 may be positioned between the second lens layer 3322 and the third lens layer 3323, and the third gap layer 3327 may be positioned between the third lens layer 3323 and the fourth lens layer 3324, but the present disclosure is not limited thereto.

Further, the lens assembly 3320 may include at least one filter layer 3330.

Here, the contents of the optical filter described above may be equally applied to the at least one filter layer 3330, and thus redundant descriptions thereof will be omitted.

Further, the at least one filter layer 3330 may be positioned in at least one gap layer included in the lens assembly 3320. For example, the filter layer 3330 may be positioned in the second gap layer 3326 included in the lens assembly 3320, but the present disclosure is not limited thereto.

Further, the at least one filter layer 3330 may be positioned in the gap layer that has a small difference in angles at which light rays of parallel light, which is incident on the lens assembly 3320 in a viewing angle range, incident on a cross section.

For example, the at least one filter layer 3330 may be positioned in the second gap layer 3326 among the first to third gap layers 3325 to 3327, which has the cross section having the smallest difference between a maximum value and a minimum value at the angles at which the light rays of the parallel light, which is incident on the lens assembly 3320 in the viewing angle range, incident on the cross section, but the present disclosure is not limited thereto.

Further, an angular distribution of light rays of parallel lights, which are incident on the lens assembly 3320 at different angles in the viewing angle range, incident on the cross section of each the first to third gap layers 3325 to 3327 may be different for each gap layer.

For example, a plurality of light rays of a plurality of parallel lights, which are incident on the lens assembly 3320 at different angles in a range of x degrees to y degrees, may be incident on the cross section of the first gap layer 3325 at angles ranging from a degrees to b degrees, incident on the cross section of the second gap layer 3326 at angles ranging from c degrees to d degrees, and incident on the cross section of the third gap layer 3327 at angles ranging from e degrees to f degrees.

In this case, the difference between the c degrees and the d degrees may be smaller than the difference between the a degrees and the b degrees and the difference between the e degrees and the f degrees, but the present disclosure is not limited thereto.

Further, as shown in FIG. 43, the at least one filter layer 3330 may be positioned in the second gap layer 3326 and may be designed as a band-pass filter having a first central wavelength for light incident at 0 degrees and a second central wavelength for light incident at the d degrees.

Further, the at least one filter layer 3330 may be designed as a band-pass filter having a third central wavelength for light incident at the f degrees.

Hereinafter, the bandwidth and the central wavelength of the filter layer will be described in more detail.

Figure 44:
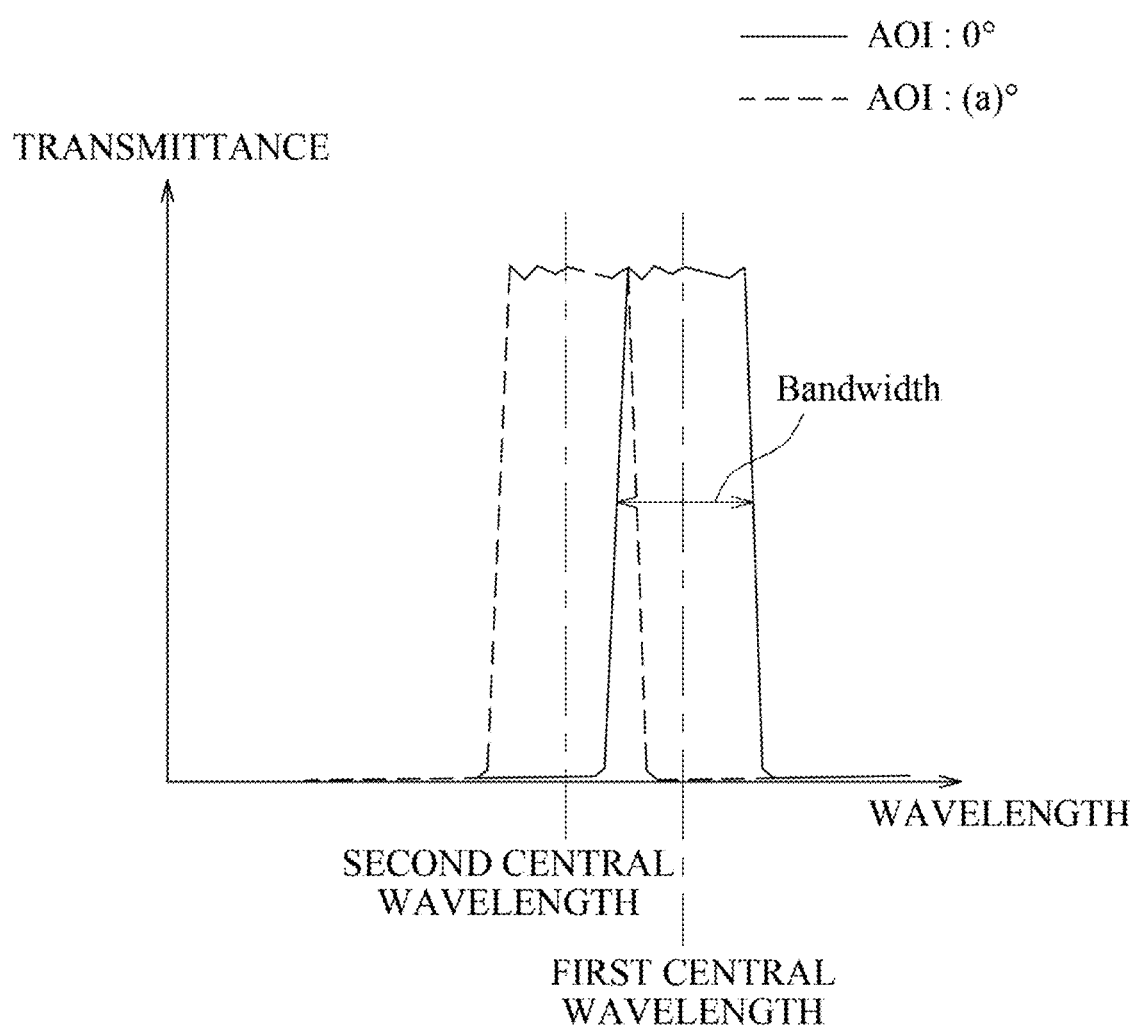
FIG. 44 is a diagram for describing a bandwidth and a central wavelength of a filter layer.

FIG. 44 is a diagram for describing a bandwidth and a central wavelength of a filter layer.

Referring to FIG. 44, a filter layer according to one embodiment may be designed as a band-pass filter that transmits at least a portion of light incident on the filter layer and blocks the remaining portion of the light.

In this case, the filter layer may have a bandwidth at which at least a portion of the light incident on the filter layer transmits, and the bandwidth may be understood as a full width at half maximum, but is not limited thereto, and may be generally understood as a bandwidth of the band-pass filter for light.

Further, for the light incident on the filter layer, the central wavelength of the filter layer may be understood as a central wavelength between wavelengths of 50% of the maximum transmittance, but is not limited thereto, and may be generally understood as a central wavelength of the band-pass filter for light.

Further, the central wavelength of the filter layer may be changed according to an angle of the light incident on the filter layer.

For example, as shown in FIG. 44, the central wavelength of the filter layer may be a first central wavelength for light that is incident on the filter layer at 0 degrees, and the central wavelength of the filter layer may be a second central wavelength for light that is incident on the filter layer at a degrees, but the present disclosure is not limited thereto.

Further, the first central wavelength may be a wavelength greater than the second central wavelength.

Further, when the filter layer is positioned in at least one gap layer of the lens assembly described above, the filter layer may be designed based on angles at which a plurality of light rays of a plurality of parallel lights, which are incident on a lens assembly in a viewing angle range, are incident on a cross section of the gap layer in which the filter layer is positioned.

For example, when the filter layer is positioned in the above-described second gap layer of the lens assembly, and angles at which the plurality of light rays of the plurality of parallel lights, which are incident on the lens assembly in the viewing angle range, are incident on the cross section of the second gap layer, in which the filter layer is positioned, range from 0 degrees to a degrees, the bandwidth of the filter layer may be designed to be greater than or equal to a difference value between the first central wavelength and the second central wavelength, but the present disclosure is not limited thereto.

Further, for example, when the filter layer is positioned in the above-described second gap layer of the lens assembly, and the angles at which the plurality of light rays of the plurality of parallel lights, which are incident on the lens assembly in the viewing angle range, are incident on the cross section of the second gap layer, in which the filter layer is positioned, range from 0 degrees to a degrees, the filter layer may be designed such that a transmission band for light incident at 0 degrees and a transmission band for light incident at a degrees are at least partially overlap each other, but the present disclosure is not limited thereto.

Further, for example, when the filter layer is positioned in the above-described second gap layer of the lens assembly, and the angles at which the plurality of light rays of the plurality of parallel lights, which are incident on the lens assembly in the viewing angle range, are incident on the cross section of the second gap layer, in which the filter layer is positioned, range from 0 degrees to a degrees, the filter layer may be designed such that the transmission band for light incident at 0 degrees and the transmission band for light incident at a degrees share at least one wavelength band, but the present disclosure is not limited thereto.

Thus, when the filter layer is positioned in at least one gap layer of the lens assembly, as the angular distribution of the plurality of light rays incident on the cross section of the gap layer, in which the filter layer is positioned, is reduced, the bandwidth of the filter layer may be designed to be narrow.

At this point, the angular distribution of the plurality of light rays may be defined by a difference between a maximum angle and a minimum angle at which at least some of the light rays included in the plurality of light rays are incident on the cross section of the gap layer, but the present disclosure is not limited thereto.

Further, when the bandwidth of the filter layer is designed to be narrow, noise caused by external light other than the laser emitted from the LiDAR device including the lens assembly may be reduced.

Figure 45:
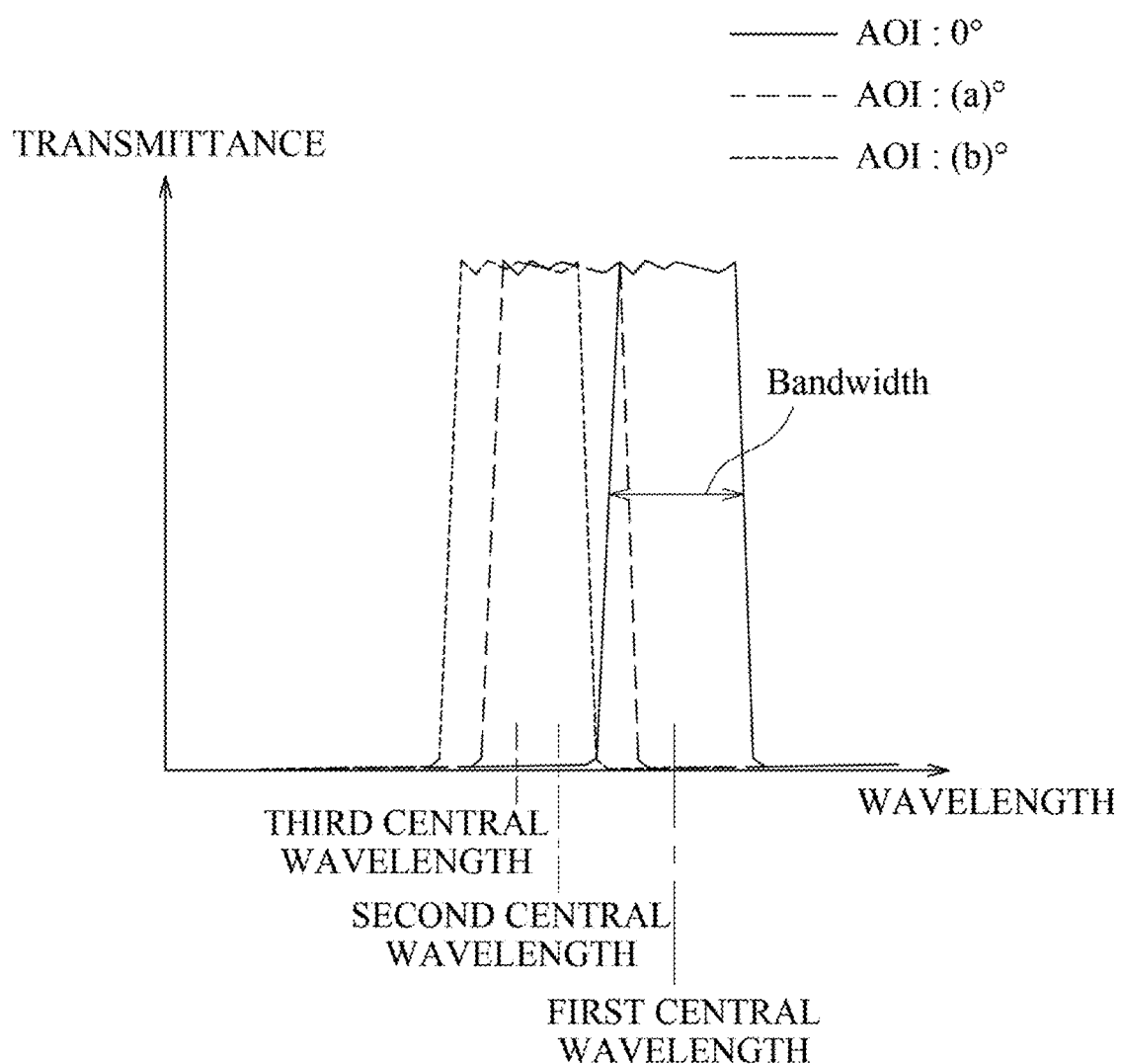
FIG. 45 is a diagram for describing a bandwidth and a central wavelength of a filter layer.

FIG. 45 is a diagram for describing a bandwidth and a central wavelength of a filter layer.

Referring to FIG. 45, the filter layer according to one embodiment may be designed as a band-pass filter that transmits at least a portion of light incident on a filter layer and blocks the remaining portion of the light.

Here, the contents of the filter layer described above may be equally applied, and thus redundant descriptions thereof will be omitted.

The central wavelength of the filter layer may be changed according to an angle of the light incident on the filter layer.

For example, as shown in FIG. 45, the central wavelength of the filter layer may be a first central wavelength for light that is incident on the filter layer at 0 degrees, the central wavelength of the filter layer may be a second central wavelength for light that is incident on the filter layer at a degrees, and the central wavelength of the filter layer may be a third central wavelength for light that is incident on the filter layer at b degrees, but the present disclosure is not limited thereto.

Further, the first central wavelength may be a wavelength greater than the second central wavelength, and the second central wavelength may be a wavelength greater than the third central wavelength.

Further, when the filter layer is positioned in at least one gap layer of the lens assembly described above, the filter layer may be designed based on angles at which a plurality of light rays of a plurality of parallel lights, which are incident on a lens assembly in a viewing angle range, are incident on a cross section of the gap layer in which the filter layer is positioned.

For example, when the filter layer is positioned in the above-described second gap layer of the lens assembly, and the angles at which the plurality of light rays of the plurality of parallel lights, which are incident on the lens assembly in the viewing angle range, are incident on the cross section of the second gap layer, in which the filter layer is positioned, range from 0 degrees to a degrees, the bandwidth of the filter layer may be designed to be greater than or equal to a difference value between the first central wavelength and the second central wavelength.

Further, for example, when the filter layer is positioned in the above-described second gap layer of the lens assembly, and the angles at which the plurality of light rays of the plurality of parallel lights, which are incident on the lens assembly in the viewing angle range, are incident on the cross section of the second gap layer, in which the filter layer is positioned, range from 0 degrees to a degrees, the filter layer may be designed such that a transmission band for light incident at 0 degrees and a transmission band for light incident at a degrees are at least partially overlap each other, but the present disclosure is not limited thereto.

Further, for example, when the filter layer is positioned in the above-described second gap layer of the lens assembly, and the angles at which the plurality of light rays of the plurality of parallel lights, which are incident on the lens assembly in the viewing angle range, are incident on the cross section of the second gap layer, in which the filter layer is positioned, range from 0 degrees to a degrees, the filter layer may be designed such that the transmission band for the light incident at 0 degrees and the transmission band for the light incident at a degrees share at least one wavelength band, but the present disclosure is not limited thereto.

Further, when the angles at which the plurality of light rays of the plurality of parallel lights, which are incident on the lens assembly in the viewing angle range, are incident on the cross section of the third gap layer, in which the filter layer is not positioned, range from 0 degrees to b degrees, the bandwidth of the filter layer may be designed to be less than or equal to a difference value between the first central wavelength and the third central wavelength, but the present disclosure is not limited thereto.

Further, when the angles at which the plurality of light rays of the plurality of parallel lights, which are incident on the lens assembly in the viewing angle range, are incident on the cross section of the third gap layer, in which the filter layer is not positioned, range from 0 degrees to b degrees, the filter layer may be designed such that the transmission band for the light incident at 0 degrees and the transmission band for the light incident at b degrees do not overlap each other, but the present disclosure is not limited thereto.

Further, when the angles at which the plurality of light rays of the plurality of parallel lights, which are incident on the lens assembly in the viewing angle range, are incident on the cross section of the third gap layer, in which the filter layer is not positioned, range from 0 degrees to b degrees, the filter layer may be designed such that the transmission band for the light incident at 0 degrees and the transmission band for the light incident at b degrees do not share at least one wavelength band, but the present disclosure is not limited thereto.

Figure 46:
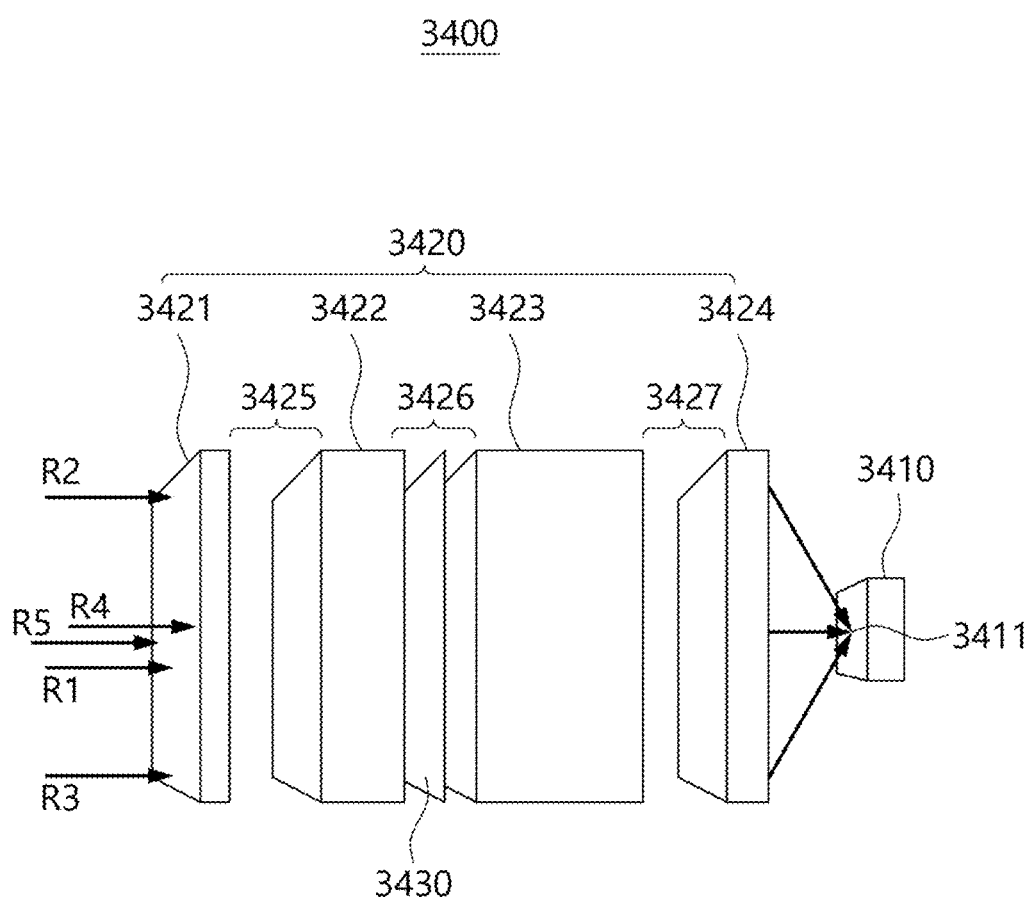
FIGS. 46 and 47 are diagrams for describing a reception module according to one embodiment.
Figure 47:
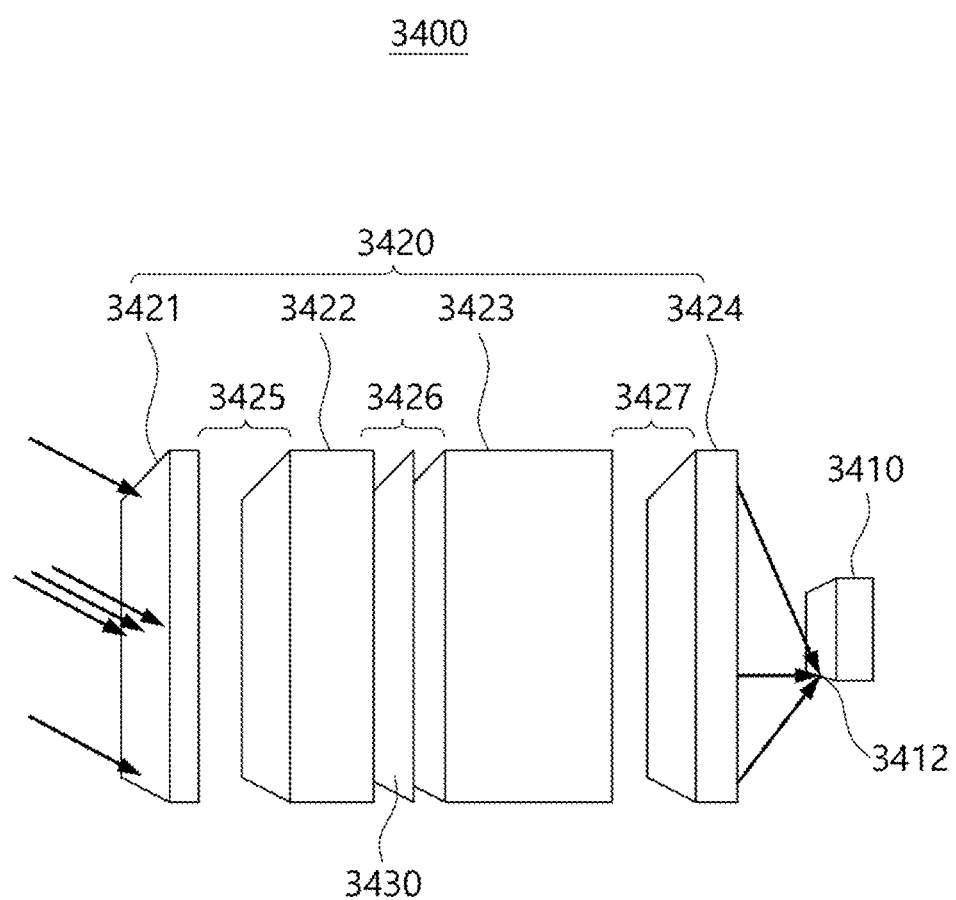

FIGS. 46 and 47 are diagrams for describing a reception module according to one embodiment.

Referring to FIGS. 46 and 47, a reception module 3400 according to one embodiment may include a laser detecting array 3410 and a lens assembly 3420.

Here, the contents of the laser detecting array described above may be equally applied to the laser detecting array 3410, and thus redundant descriptions thereof will be omitted.

Further, the contents of the lens assembly described above may be equally applied to the lens assembly 3420, and thus redundant descriptions thereof will be omitted.

The lens assembly 3420 may include at least two lens layers and at least one filter layer. For example, as shown in FIGS. 46 and 47, the lens assembly 3420 may include a first lens layer 3421, a second lens layer 3422, a third lens layer 3423, a fourth lens layer 3424, and a filter layer 3430, but the present disclosure is not limited thereto.

At this point, the filter layer 3430 may be positioned between the first to fourth lens layers 3421 to 3424. For example, as shown in FIGS. 46 and 47, the filter layer 3430 may be positioned between the second lens layer 3422 and the third lens layer 3423, but the present disclosure is not limited thereto.

Further, the contents of the lens layer and the filter layer described above may be equally applied to the first to fourth lens layers 3421 to 3424 and the filter layer 3430, and thus redundant descriptions thereof will be omitted.

The lens assembly 3420 may be configured by integrally forming at least two lens layers and at least one filter layer, but the present disclosure is not limited thereto.

Further, the lens assembly 3420 may be designed to reduce noise caused by external light while distributing a plurality of parallel lights, which are incident on the lens assembly 3420 at different angles in a viewing angle range, to different detectors.

For example, the lens assembly 3420 may distribute the parallel light incident on the lens assembly 3420 at 0 degrees to a first detector 3411 included in the laser detecting array 3410 as shown in FIG. 46, and may distribute the parallel light incident on the lens assembly 3420 at 30 degrees to a second detector 3412 included in the laser detecting array 3410 as shown in FIG. 47, but the present disclosure is not limited thereto.

Further, for example, as shown in FIG. 46, when angles at which the plurality of light rays of parallel light, which is incident on the lens assembly 3420 at 0 degrees, are incident on a cross section of a second gap layer 3426 in which the filter layer 3430 is positioned, range from a degrees to b degrees, the lens assembly 3420 may block light in a wavelength band other than a transmission band of the filter layer 3430 corresponding the angles in a range of a degrees to b degrees, but the present disclosure is not limited thereto.

Further, for example, as shown in FIG. 47, when angles at which the plurality of light rays of parallel light, which is incident on the lens assembly 3420 at 30 degrees, are incident on the cross section of the second gap layer 3426 in which the filter layer 3430 is positioned, range from c degrees to d degrees, the lens assembly 3420 may block light in a wavelength band other than the transmission band of the filter layer 3430 corresponding the angles in a range of c degrees to d degrees, but the present disclosure is not limited thereto.

Further, for example, as shown in FIGS. 46 and 47, the lens assembly 3420 may be designed to reduce noise caused by external light while distributing a plurality of parallel lights, which are incident on the lens assembly 3420 at different angles in a range of 0 degrees to 30 degrees, to different detectors, but the present disclosure is not limited thereto.

More specifically, as shown in FIGS. 46 and 47, the lens assembly 3420 may block noise in a wavelength band other than the transmission band of the filter layer 3430 corresponding to the angles in a range of a degrees to b degrees while distributing parallel light incident on the lens assembly 3420 at 0 degrees to the first detector, and may block noise in a wavelength band other than the transmission band of the filter layer 3430 corresponding to the angles in a range of c degrees to d degrees while distributing parallel light incident on the lens assembly 3420 at 30 degrees to the second detector, but the present disclosure is not limited thereto.

Figure 48:
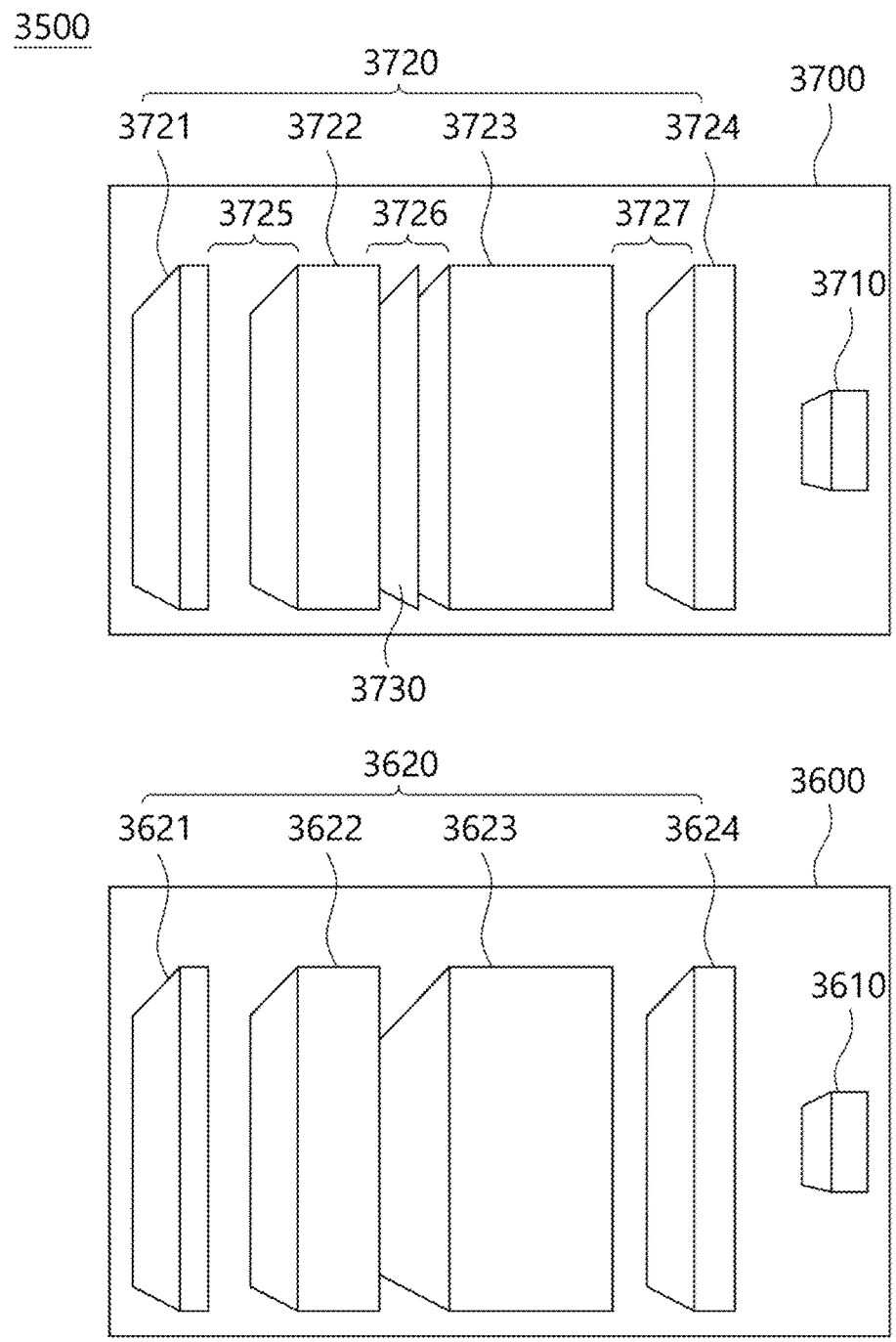
FIG. 48 is a diagram for describing a LiDAR device according to one embodiment.

FIG. 48 is a diagram for describing a LiDAR device according to one embodiment.

Referring to FIG. 48, a LiDAR device 3500 according to one embodiment may include a transmission module 3600 and a reception module 3700.

Further, the transmission module 3600 may include a laser emitting array 3610 and a first lens assembly 3620, but the present disclosure is not limited thereto.

Here, the contents of the laser emitting unit or the like described above may be applied to the laser emitting array 3610, and thus redundant descriptions thereof will be omitted.

Further, the laser emitting array 3610 may emit at least one laser. For example, the laser emitting array 3610 may emit a plurality of lasers, but the present disclosure is not limited thereto.

Further, the laser emitting array 3610 may emit at least one laser at a first wavelength. For example, the laser emitting array 3610 may emit at least one laser at a wavelength of 940 nm, and may emit a plurality of lasers at a wavelength of 940 nm, but the present disclosure is not limited thereto.

In this case, the first wavelength may be a wavelength range including an error range. For example, the first wavelength may refer to a wavelength range of 935 nm to 945 nm as a wavelength of 940 nm in a 5 nm error range, but the present disclosure is not limited thereto.

Further, the first lens assembly 3620 may include at least two lens layers. For example, as shown in FIG. 48, the first lens assembly 3620 may include a first lens layer 3621, a second lens layer 3622, a third lens layer 3623, and a fourth lens layer 3624, but the present disclosure is not limited thereto.

Further, the first lens assembly 3620 may steer a laser emitted from the laser emitting array 3610. For example, the first lens assembly 3620 may steer the first laser emitted from the laser emitting array 3610 in a first direction and steer the second laser emitted from the laser emitting array 3610 in a second direction, but the present disclosure is not limited thereto.

Further, the first lens assembly 3620 may steer a plurality of lasers, which are emitted from the laser emitting array 3610, in order to irradiate the plurality of lasers at different angles within a range of x degrees to y degrees. For example, the first lens assembly 3620 may steer the first laser emitted from the laser emitting array 3610 in the first direction in order to irradiate the first laser at the angle of x degrees, and steer the second laser emitted from the laser emitting array 3610 in the second direction in order to irradiate the second laser at the angle of y degrees, but the present disclosure is not limited thereto.

Further, the reception module 3700 may include a laser detecting array 3710 and a second lens assembly 3720, but the present disclosure is not limited thereto.

Here, the contents of the detecting unit or the like described above may be applied to the laser detecting array 3710, and thus redundant descriptions thereof will be omitted.

Further, the laser detecting array 3710 may detect at least one laser. For example, the laser detecting array 3710 may detect a plurality of lasers.

Further, the laser detecting array 3710 may include a plurality of detectors. For example, the laser detecting array 3710 may include a first detector and a second detector, but the present disclosure is not limited thereto.

Further, each of the plurality of detectors included in the laser detecting array 3710 may receive different lasers. For example, the first detector included in the laser detecting array 3710 may receive a first laser that is received in the first direction, and the second detector may receive a second laser that is received in the second direction, but the present disclosure is not limited thereto.

Further, the second lens assembly 3720 may include at least two lens layers. For example, as shown in FIG. 48, the second lens assembly 3720 may include a fifth lens layer 3721, a sixth lens layer 3722, a seventh lens layer 3723, and an eighth lens layer 3724, but the present disclosure is not limited thereto.

Here, the contents of the lens layer described above may be equally applied, and thus redundant descriptions thereof will be omitted.

Further, the second lens assembly 3720 may include at least two gap layers. For example, as shown in FIG. 48, the second lens assembly 3720 may include a first gap layer 3725, a second gap layer 3726, and a third gap layer 3727, but the present disclosure is not limited thereto.

Here, the contents of the gap layer described above may be equally applied, and thus redundant descriptions thereof will be omitted.

Further, the second lens assembly 3720 may include at least one filter layer. For example, as shown in FIG. 48, the second lens assembly 3720 may include a filter layer 3730, but the present disclosure is not limited thereto.

Further, the second lens assembly 3720 may transmit the laser irradiated from the transmission module 3600 to the laser detecting array 3710. For example, when the first laser, which is irradiated from the transmission module 3600 in the first direction, is reflected from an object positioned in the first direction, the second lens assembly 3720 may transmit the first laser to the laser detecting array 3710, and when the second laser, which is irradiated in the second direction, is reflected from an object positioned in the second direction, the second lens assembly 3720 may transmit the second laser to the laser detecting array 3710, but the present disclosure is not limited thereto.

Further, the second lens assembly 3720 may distribute the lasers irradiated from the transmission module 3600 to at least two different detectors. For example, when the first laser, which is irradiated from the transmission module 3600 in the first direction, is reflected from the object positioned in the first direction, the second lens assembly 3720 may distribute the first laser to the first detector included in the laser detecting array 3710, and when the second laser, which is irradiated in the second direction, is reflected from the object positioned in the second direction, the second lens assembly 3720 may distribute the second laser to the second detector included in the laser detecting array 3710, but the present disclosure is not limited thereto.

Further, the transmission module 3600 may emit a laser at different angles in a viewing angle range, and the second lens assembly 3720 may be designed to reduce noise caused by external light while distributing a plurality of parallel lights, which are incident on the second lens assembly 3720 at different angles in a viewing angle range, to different detectors.

For example, the transmission module 3600) may emit a first laser of a first wavelength at 0 degrees and may emit a second laser of the first wavelength at 30 degrees, the second lens assembly 3720 may distribute the first laser, which is emitted from the transmission module 3600 at 0 degrees and reflected from the object, to the first detector included in the laser detecting array 3710, and the second lens assembly 3720 may distribute the second laser, which is emitted from the transmission module 3600 at 30 degrees and reflected from the object, to the second detector included in the laser detecting array 3710.

In this case, the second lens assembly 3720 may block light in a wavelength band other than a transmission band of the filter layer 3730, and the first wavelength may be included in the transmission band, thereby reducing noise caused by external light.

Hereinafter, a design of a filter layer and a wavelength design of a laser emitting array will be described.

Figure 49:
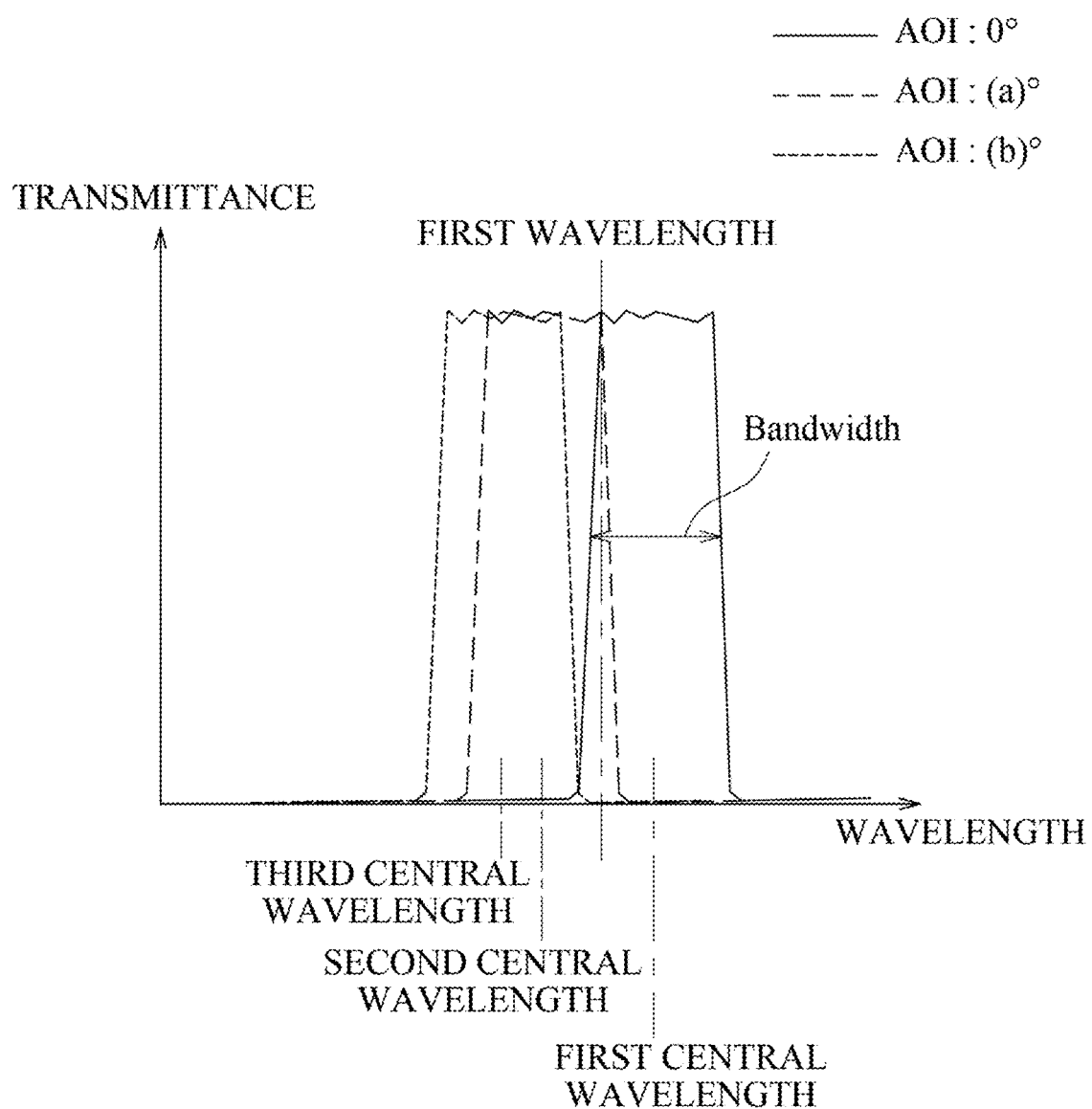
FIG. 49 is a diagram for describing a design of a filter layer and a wavelength design of a laser emitting array, wherein the filter layer and the laser emitting array are included in the LiDAR device according to one embodiment described with reference to FIG. 48.

FIG. 49 is a diagram for describing a design of the filter layer 3730 and a wavelength design of the laser emitting array 3610, wherein the filter layer 3730 and the laser emitting array 3610 are included in the LiDAR device 3500 according to one embodiment described with reference to FIG. 48.

Here, for convenience of description, it may be assumed that the second lens assembly 3720 is designed so that angles at which at least some of a plurality of light rays of a plurality of parallel lights, which are incident on the second lens assembly 3720 in a viewing angle range, are incident on a cross section of the second gap layer 3726 of the second lens assembly 3720, in which the filter layer 3730 is positioned, range from 0 degrees to a degrees, and angles at which at least some of the plurality of light rays of the plurality of parallel lights, which are incident on the second lens assembly 3720 in a viewing angle range, are incident on a cross section of the third gap layer 3727 of the second lens assembly 3720, in which the filter layer 3730 is not positioned, range from 0 degrees to b degrees, but the present disclosure is not limited thereto, and the second lens assembly 3720 may be designed in various ways.

Referring to FIG. 49, the filter layer 3730 according to one embodiment may be designed as a band-pass filter that transmits at least a portion of light incident on the filter layer 3730 and blocks the remaining portion of the light.

In this case, the filter layer 3730 may have a bandwidth that transmits at least a portion of the light incident on the filter layer 3730, and the bandwidth may be understood as a full width at half maximum, but is not limited thereto, and may be generally understood as a bandwidth of the band-pass filter for light.

Further, for the light incident on the filter layer 3730, the central wavelength of the filter layer 3730 may be understood as a central wavelength between wavelengths of 50% of the maximum transmittance, but is not limited thereto, and may be generally understood as a central wavelength of the band-pass filter for light.

Further, the central wavelength of the filter layer 3730 may be changed according to an angle of the light incident on the filter layer 3730.

For example, as shown in FIG. 49, the filter layer 3730 may be designed to have a first central wavelength for light that is incident on the filter layer 3730 at 0 degrees, may be designed to have a second central wavelength for light incident on the filter layer 3730 at a degrees, and may be designed to have a third central wavelength for light incident on the filter layer 3730 at b degrees, but the present disclosure is not limited thereto.

Further, as shown in FIG. 49, the bandwidth of the filter layer 3730 may be designed to be greater than or equal to a difference value between the first central wavelength and the second central wavelength.

Further, as shown in FIG. 49, the filter layer 3730 may be designed such that a transmission band for light incident at 0 degrees and a transmission band for light incident at a degrees at least partially overlap each other, but the present disclosure is not limited thereto.

Further, as shown in FIG. 49, the filter layer 3730 may be designed such that the transmission band for the light incident at 0 degrees and the transmission band for the light incident at a degrees share at least one wavelength band, but the present disclosure is not limited thereto.

Further, as shown in FIG. 49, the bandwidth of the filter layer 3730 may be designed to be less than or equal to a difference value between the first central wavelength and the third central wavelength, but the present disclosure is not limited thereto.

Further, as shown in FIG. 49, the filter layer 3730 may be designed such that the transmission band for the light incident at 0 degrees and the transmission band for the light incident at b degrees do not overlap each other, but the present disclosure is not limited thereto.

Further, as shown in FIG. 49, an emitted wavelength of the laser emitting array 3610 may be designed to be a first wavelength, and the first wavelength may be positioned between the first central wavelength and the second central wavelength, but the present disclosure is not limited thereto.

Further, as shown in FIG. 49, the emitted wavelength of the laser emitting array 3610 may be designed to be a first wavelength, and the first wavelength may be designed to be included in a transmission band of the filter layer 3730 for light incident at 0 degrees, and to be included in the transmission band of the filter layer 3730 for the light incident at a degrees and not included in the filter layer 3730 for the light incident at b degrees, but the present disclosure is not limited thereto.

Further, the bandwidth of the filter layer 3730 may be designed to be at least twice a value obtained from (the first central wavelength–the first wavelength) nm, but the present disclosure is not limited thereto.

The above-described contents are merely one embodiment for the wavelength of the filter layer and the laser emitting array, but the present disclosure is not limited thereto, and the wavelength of the filter layer and the laser emitting array may be designed in various ways to reduce the bandwidth of the filter layer and receive the laser emitted from the laser emitting array without loss as much as possible.

The method according to the embodiment may be implemented in the form of program instructions that can be executed through various computer means and recorded in a computer-readable medium. The computer-readable medium may include program instructions, data files, data structures, etc. alone or in combination. The program instructions recorded in the medium may be specially designed and configured for embodiments, or may be known and usable to those skilled in computer software. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that can be executed by a computer using an interpreter or the like. The above-described hardware device may be configured to operate as one or more software modules to perform the operation of an embodiment, and vice versa.

While the elements and features of the present disclosure have been described with reference to embodiments of the present invention, the present disclosure is not limited thereto. It will be obvious to those skilled in the art that various changes or modifications may be made therein without departing from the spirit and scope of the present disclosure. Accordingly, such changes or modifications are intended to fall within the scope of the appended claims.

Although the present disclosure has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. A LiDAR device comprising:
a transmission module including a laser emitting array and a first lens assembly, wherein the laser emitting array is configured to emit a plurality of lasers at a first wavelength and wherein the first lens assembly is configured to steer the plurality of lasers at different angles within a first angle range;
a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors;
wherein the second lens assembly comprises:
at least four lens layers including a first lens layer, a second lens layer, a third lens layer and a fourth lens layer;
at least two gap layers including a first gap layer and a second gap layer; and
a filter layer located in the first gap layer;
wherein the second lens assembly is designed so that an angle at which at least a portion of a plurality of light rays of a plurality of parallel lights incident on the second lens assembly within the first angle range is incident to a cross section of the first gap layer is 0 to X degree,
wherein the second lens assembly is designed so that an angle at which at least a portion of a plurality of light rays of a plurality of parallel lights incident on the second lens assembly within the first angle range is incident to a cross section of the second gap layer is 0 to Y degree,
wherein the X degree is smaller than the Y degree,
wherein the filter layer is designed to have a first central wavelength for a light incident on the filter layer at the 0 degree, a second central wavelength for a light incident on the filter layer at the X degree, and a third central wavelength for a light incident on the filter layer at the Y degree,
wherein the filter layer is designed to have a bandwidth of at least a first value,
wherein the first value follows a first equation:

first value=the first central wavelength−the second central wavelength, wherein the first wavelength is smaller than the first central wavelength but greater than the second central wavelength.

2. The LiDAR device of claim 1, wherein the first wavelength is greater than a second value,
wherein the second value follows a second equation:

second value=the third central wavelength+the bandwidth/2.

3. The LiDAR device of claim 1, wherein the bandwidth is designed to be at least a third value,
wherein the third value follow a third equation:

third value=(the first central wavelength−the first wavelength)×2.

4. The LiDAR device of claim 3, wherein the bandwidth is designed to be at least the third value or less.

5. The LiDAR device of claim 3, wherein the bandwidth is designed to be at least the third value or more.

6. The LiDAR device of claim 1, wherein the filter layer is designed so that a transmission band for the light incident on the filter layer at the 0 degree overlaps a transmission band for the light incident on the filter layer at the X degree.

7. The LiDAR device of claim 1, wherein the filter layer is designed so that a transmission band for the light incident on the filter layer at the 0 degree does not overlap a transmission band for the light incident on the filter layer at the X degree.

8. The LiDAR device of claim 1, wherein the filter layer is designed so that a transmission band for the light incident on the filter layer at the 0 degree and a transmission band for the light incident on the filter layer at the X degree share at least one wavelength band.

9. The LiDAR device of claim 8, wherein the filter layer is designed so that the transmission band for the light incident on the filter layer at the 0 degree and a transmission band for the light incident on the filter layer at the Y degree do not share at least one wavelength band.

10. The LiDAR device of claim 1, wherein the number of lens layers included in each of the first lens assembly and the second lens assembly is the same.

11. The LiDAR device of claim 1,
wherein a first laser emitted from a first laser emitting unit included in the laser emitting array is irradiated in a first direction through the first lens assembly,
wherein the first laser is received by a first detector included in the laser detecting array through the second lens assembly,
wherein a second laser emitted from a second laser emitting unit included in the laser emitting array is irradiated in a second direction through the first lens assembly,
wherein the second laser is received by a second detector included in the laser detecting array through the second lens assembly.

12. The LiDAR device of claim 11, a wavelength band of ambient light received by the first detector is different from a wavelength band of ambient light received by the second detector.

13. A LiDAR device comprising: a transmission module including a laser emitting array and a first lens assembly, wherein the laser emitting array is configured to emit a plurality of lasers and wherein the first lens assembly is configured to steer the plurality of lasers at different angles; a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors; wherein the second lens assembly comprises: a reception lens layer including at least two of lens layer; and a filter layer located between the at least two of lens layer; wherein the second lens assembly is designed so that a central wavelength of a first transmission band for light incident to an entrance pupil of the second lens assembly at an angle of 30 degrees is shifted by 15 nm or less from a central wavelength of a second transmission band for light incident to the entrance pupil at an angle of 0 degrees.

14. The LiDAR device of claim 13,
wherein the number of the reception lens layer is equal to the number of a transmission lens layer included in the first lens assembly.

15. The LiDAR device of claim 13,
wherein a first laser emitted from a first laser emitting unit included in the laser emitting array is irradiated in a first direction through the first lens assembly,
wherein the first laser is received by a first detector included in the laser detecting array through the second lens assembly,
wherein a second laser emitted from a second laser emitting unit included in the laser emitting array is irradiated in a second direction through the first lens assembly,
wherein the second laser is received by a second detector included in the laser detecting array through the second lens assembly.

16. A LiDAR device comprising:
a transmission module including a laser emitting array and a first lens assembly, wherein the laser emitting array is configured to emit a plurality of lasers and wherein the first lens assembly is configured to steer the plurality of lasers at different angles;
a reception module including a laser detecting array and a second lens assembly, wherein the laser detecting array includes at least two detectors for detecting at least a portion of the plurality of lasers and wherein the second lens assembly is configured to distribute the plurality of lasers to the at least two detectors;
wherein the second lens assembly comprises:
a reception lens layer including at least two of lens layer; and
a filter layer located between the at least two of lens layer;
wherein the second lens assembly is designed so that light incident to an entrance pupil of the second lens assembly at an angle of 20 degrees is received by a first detector,
wherein the second lens assembly is designed so that light incident to the entrance pupil at an angle of 0 degrees is received by a second detector,
wherein the first detector receives light in a first wavelength band including a first wavelength, and the second detector receives light in a second wavelength band including a second wavelength,
wherein the first wavelength is not included in the second wavelength band, and the second wavelength is not included in the first wavelength band,
wherein the first wavelength is shifted to 10 nm or less from the second wavelength.

* * * * *